(12) United States Patent
Alam

(10) Patent No.: US 11,019,183 B2
(45) Date of Patent: May 25, 2021

(54) NETWORK PROVENANCE WITH MULTI-INTERFACE TRANSLATION

(71) Applicant: Intel Corporation, Santa Clara, CA (US)

(72) Inventor: S. M. Iftekharul Alam, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 22 days.

(21) Appl. No.: 16/025,900

(22) Filed: Jul. 2, 2018

(65) Prior Publication Data

US 2019/0045034 A1 Feb. 7, 2019

(51) Int. Cl.
*H04L 29/06* (2006.01)
*H04L 12/935* (2013.01)
(Continued)

(52) U.S. Cl.
CPC ........ *H04L 69/161* (2013.01); *H04L 12/4633* (2013.01); *H04L 12/4645* (2013.01);
(Continued)

(58) Field of Classification Search
CPC . H04W 88/06; H04W 88/10; H04W 72/1215; H04W 48/18; H04B 3/52; H04B 3/54; H04B 3/56; H04B 3/46; H04B 2203/5483; H04B 10/00; H01P 3/10; H01P 3/16; H01P 3/06; H01P 5/087; H01P 5/103; H01P 5/107; H01P 5/12; H01P 5/00;
(Continued)

(56) References Cited

U.S. PATENT DOCUMENTS 6,272,551 B1 * 8/2001 Martin .................. G06F 13/385
370/419
6,625,169 B1 * 9/2003 Tofano .................... H04L 69/08
370/466

(Continued)

OTHER PUBLICATIONS

Wang, C., Zheng, W. & Bertino, E. Data Sci. Eng. (2016) 1: 189. https://doi.org/10.1007/s41019-016-0017-x (Year: 2016).*

(Continued)

*Primary Examiner* — Elton Williams
(74) *Attorney, Agent, or Firm* — Schwabe, Williamson & Wyatt, P.C.

(57) ABSTRACT

Systems, methods, and computer-readable media are provided for network access technology (NAT)-based packet network provenance. In disclosed embodiments, each node in a network encapsulates and/or encodes received packets with network interface information in addition to attestation information. The network interface information indicates a type of NAT used to forward the packet to a next node or hop in a network path. Each node in the network implements protocol stack that includes a multi-interface translation layer below a networking layer and above the layer 2 protocol stacks of various communication protocols. The multi-interface translation layer determines the type of NAT to be used to forward received packets to the next hop, and encapsulates the received packets with an indication of the determined NAT to be used to forward the packet. Other embodiments are disclosed and/or claimed.

25 Claims, 12 Drawing Sheets

(51) Int. Cl.
  *H04L 12/54* (2013.01)
  *H04L 29/08* (2006.01)
  *H04W 40/22* (2009.01)
  *H04W 40/24* (2009.01)
  *H04L 12/46* (2006.01)

(52) U.S. Cl.
  CPC ...... *H04L 12/5692* (2013.01); *H04L 49/3009* (2013.01); *H04L 67/10* (2013.01); *H04L 67/12* (2013.01); *H04L 67/30* (2013.01); *H04L 67/303* (2013.01); *H04L 69/08* (2013.01); *H04L 69/22* (2013.01); *H04W 40/22* (2013.01); *H04W 40/24* (2013.01); *H04L 2212/00* (2013.01)

(58) Field of Classification Search
  CPC ...... H01P 5/1022; H01P 5/18; H04L 41/0677; H01Q 1/46; Y02E 60/7815; Y02E 60/7892; Y04S 40/121; Y04S 40/146
  See application file for complete search history.

(56) References Cited

U.S. PATENT DOCUMENTS

| | | | | |
|---|---|---|---|---|
| 2006/0264172 | A1* | 11/2006 | Izumikawa | H04W 72/1278 455/11.1 |
| 2011/0305193 | A1* | 12/2011 | Grant | H04W 76/16 370/328 |
| 2018/0183855 | A1* | 6/2018 | Sabella | G06F 9/505 |

OTHER PUBLICATIONS

"Scaling in the Linux Networking Stack", retrieved on Jul. 23, 2018, 7 pages, https://www.kernel.org/doc/Documentation/networking/scaling.txt.
Ted Hudek, "Introduction to Receive Side Scaling", Apr. 20, 2017, 4 pages, https://docs.microsoft.com/en-us/windows-hardware/drivers/network/introduction-to-receive-side-scaling.
Ted Hudek, "Non-RSS Receive Processing", Apr. 20, 2017, 2 pages.
Santosh Nagaraj, "Spectrum shaping for backscatter modulation", Sep. 30, 2017, 4 pages.
Ghasem Ahmadeyan Mazhin et al., "Multi-layer architecture for realization of network virtualization using MPLS technology", Jan. 17, 2016, 5 pages.
Yeongjin Kim et al., "Multi-flow management for mobile data offloading", Jul. 25, 2016, 5 pages.
Duncan MacMichael, Receive Side Scaling Version 2 (RSSv2), Oct. 12, 2017, 3 pages, https://docs.microsoft.com/en-us/windows-hardware/drivers/network/receive-side-scaling-version-2-rssv2-.
"The LTE Network Architecture—A comprehensive tutorial", 2009, 26 pages, www.alcatel-lucent.com.
Bon-Hong Koo et al., "Joint assignment of frequency and polarization to minimize the chromatic number", Jul. 21, 2016, 5 pages.
Zhiwei Yan et al., "ISBORD: Internet Searching based on Resource Description", Sep. 19, 2016, 4 pages.
Sanghyun Ahn, "Geographic information-based data delivery in vehicular networks: A survey", Jan. 3, 2017, 5 pages.
Ping Zhang et al., "Cooperative localization in 5G networks: A survey", Feb. 9, 2017, 6 pages.
Rashmi Sharan Sinha et al., "A survey on LPWA technology: LoRa and NB-IoT", Jan. 4, 2017, 8 pages.
Hyeon Min Kim et al., "An efficient beamforming design for multipair full-duplex relaying systems", Jan. 9, 2017, 5 pages.
"3rd Generation Partnership Project; Technical Specification Group Radio Access Network; Study on New Radio Access Technology; Radio Interface Protocol Aspects (Release 14)" Mar. 2017, 57 pages, 3GPP TR 38.804, v14.0.0.
"3rd Generation Partnership Project; Technical Specification Group Radio Access Network; Study on new radio access technology: Radio access architecture and interfaces (Release 14)" Mar. 2017, 91 pages, 3GPP TR 38.801 v14.0.0.
"3rd Generation Partnership Project; Technical Specification Group Radio Access Network; NR; Packet Data Convergence Protocol (PDCP) specification (Release 15)", Mar. 2018. 25 pages, 3GPP TS 38.323 v15.1.0.
"3rd Generation Partnership Project; Technical Specification Group Radio Access Network; NR; Radio Link Control (RLC) protocol specification (Release 15)" Mar. 2018, 33 pages, 3GPP TS 38.322 v15.1.0.
"3rd Generation Partnership Project; Technical Specification Group Radio Access Network; NR; Medium Access Control (MAC) protocol specification (Release 15)", Mar. 2018, 67 pages, 3GPP TS 38.321 v15.1.0.
"3rd Generation Partnership Project; Technical Specification Group Radio Access Network; Evolved Universal Terrestrial Radio Access (E-UTRA); Radio Resource Control (RRC); Protocol specification (Release 15)" Mar. 2018, 786 pages, 3GPP TS 36.331 v15.1.0.
"3rd Generation Partnership Project; Technical Specification Group Radio Access Network; Evolved Universal Terrestrial Radio Access (E-UTRA); Packet Data Convergence Protocol (PDCP) specification (Release 14)" Dec. 2017, 43 pages, 3GPP TS 36.323 v14.5.0.
"3rd Generation Partnership Project; Technical Specification Group Radio Access Network; Evolved Universal Terrestrial Radio Access (E-UTRA); Radio Link Control (RLC) protocol specification (Release 15)", Apr. 2018, 45 pages, 3GPP TS 36.322 v15.0.1.
"3rd Generation Partnership Project; Technical Specification Group Radio Access Network; Evolved Universal Terrestrial Radio Access (E-UTRA); Medium Access Control (MAC) protocol specification (Release 15)", Mar. 2018, 109 pages, 3GPP TS 36.321 v15.1.0.
"3rd Generation Partnership Project; Technical Specification Group Services and System Aspects; Study on Architecture for Next Generation System (Release 14)", Dec. 2016, 522 pages, 3GPP TR 23.99 v14.0.0.
Junseok Kim et al., "3GPP SA2 architecture and functions for 5G mobile communication system", Jan. 16, 2017, 8 pages.
Varun Anand et al., "MIC: Enabling Efficient Concurrent Use of Multiple Network Interfaces on Mobile Systems", 2016 IEEE CSE and IEEE DCABES, 8 pages.
Ang Chen et al., "Data Center Diagnostics with Network Provenance", 2015, 12 pages, Bulletin of IEEE Comp Society Technology Committee on Data Engineering.
Xiang Gao et al., "The Design and Implementation of a Network Provenance System Framework", Jun. 2013, 7 pages, Journal of Software, vol. 8, No. 6.
Minos Garofalakis et al., "Proof Sketches: Verifiable Multi-Party Aggregation", 2006, 13 pages, Technical Report UCB_EECS-2006-20, EECS Dept. UC Berkley.
Hung-Yu Wei, "Lecture 5: IEEE 802.11", retrieved on Jul. 25, 2018, 70 pages, National Taiwan University, http://wmnlab.ee.ntu.edu.tw/951cross/Lec5_802_11.pdf.
Trung Dong Huynh et al., "Provenance Network Analytics—Data Mining and Knowledge Discover", May 2018, 42 pages, vol. 32, Issues 3.
"Part 15.4: Low-Rate Wireless Personal Area Networks (LR-WPANs)" 2011, 314 pages, IEEE Standard for Local and metropolitan area networks, IEEE Computer Society, New York, NY.
Kyle Kuffermann, "An Implementation of the IEEE 1609.4 Wave Standard for Use in a Vehicular Networking Testbed", Dec. 2014, 116 pages, Florida Atlantic University, Boca Raton, FL.
John Lyle et al., "Trusted Computing and Provenance: Better Together", retrieved on Jul. 25, 2018, Oxford University Computing Laboratory, https://www.cs.ox.ac.uk/files/5278/tapp10-cameraready.pdf.
"Wireless Local Area Networks (WLANs) based on IEEE 802.11 Standard aka Wi-Fi", retrieved on Jul. 25, 2018, 94 pages, University of Edinburgh, https://pdfs.semanticscholar.org/presentationf32f/5f680c6ee63b86d91073bd836185a49e41ae.pdf.
"WiFi MAC Protocol", retrieved on Jul. 25, 2018, 25 pages, http://www.cse.unt.edu/~rdantu/FALL_2010_WIRELESS_NETWORKS_AND_PROTOCOLS/WiFi_MAC.ppt.
Wenchao Zhou et al., "Efficient Querying and Maintenance of Network Provenance at Internet-Scale", Jun. 2010, 12 pages.

(56) References Cited

OTHER PUBLICATIONS

Wenchao Zhou et al., "Secure Network Provenance", Oct. 2011, 18 pages, University of Pennsylvania Scholarly Commons, SOSP11 Proceedings of the Twenty-Third ACM Symposium on Operating Systems Principles.

* cited by examiner

NETWORK PROVENANCE WITH MULTI-INTERFACE TRANSLATION

FIELD

Embodiments discussed herein are related to computer networks, and in particular, to network provenance technologies for monitoring communication path and access technologies.

BACKGROUND

As networking and computing technologies advance, the number of "always connected" devices and applications has increased. These always connect applications and devices require usually seamless and ubiquitous access to information. It is difficult to maintain the seamless connection using current mechanisms as these devices move geographically and/or utilize different access technologies. This is because network coverage varies between different access technologies, and thus, managing the mobility of different devices across different access networks becomes challenging.

Network provenance involves tracking the path of data packets in a distributed network so that a source of erroneous data transmission/communication and reason(s) for the error(s) can be identified. The term "provenance" refers to a description of what influenced a generation of a piece of information or data, and "network provenance" refers to tracking and recording data packets as they flow through a network of nodes. Network provenance is the de facto mechanism used to record forwarding paths of data packets, which is embedded as meta-information within each packet. Typical network provenance schemes require each node in a network to encode its own identity (e.g., a node ID) into a received data packet before forwarding the data packet toward a destination node. In this way, the destination node receives the packet along with a series of node IDs attesting to the forwarding path of the packet. However, the existing network provenance schemes for wireless networks only consider attesting packets with node IDs. These schemes are not sufficient in distributed multi-access technology wireless networks as errors may occur in one network interface and propagate to another network technology at the same node.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example, and not by way of limitation, in the figures of the accompanying drawings.

DETAILED DESCRIPTION

Figure 1:
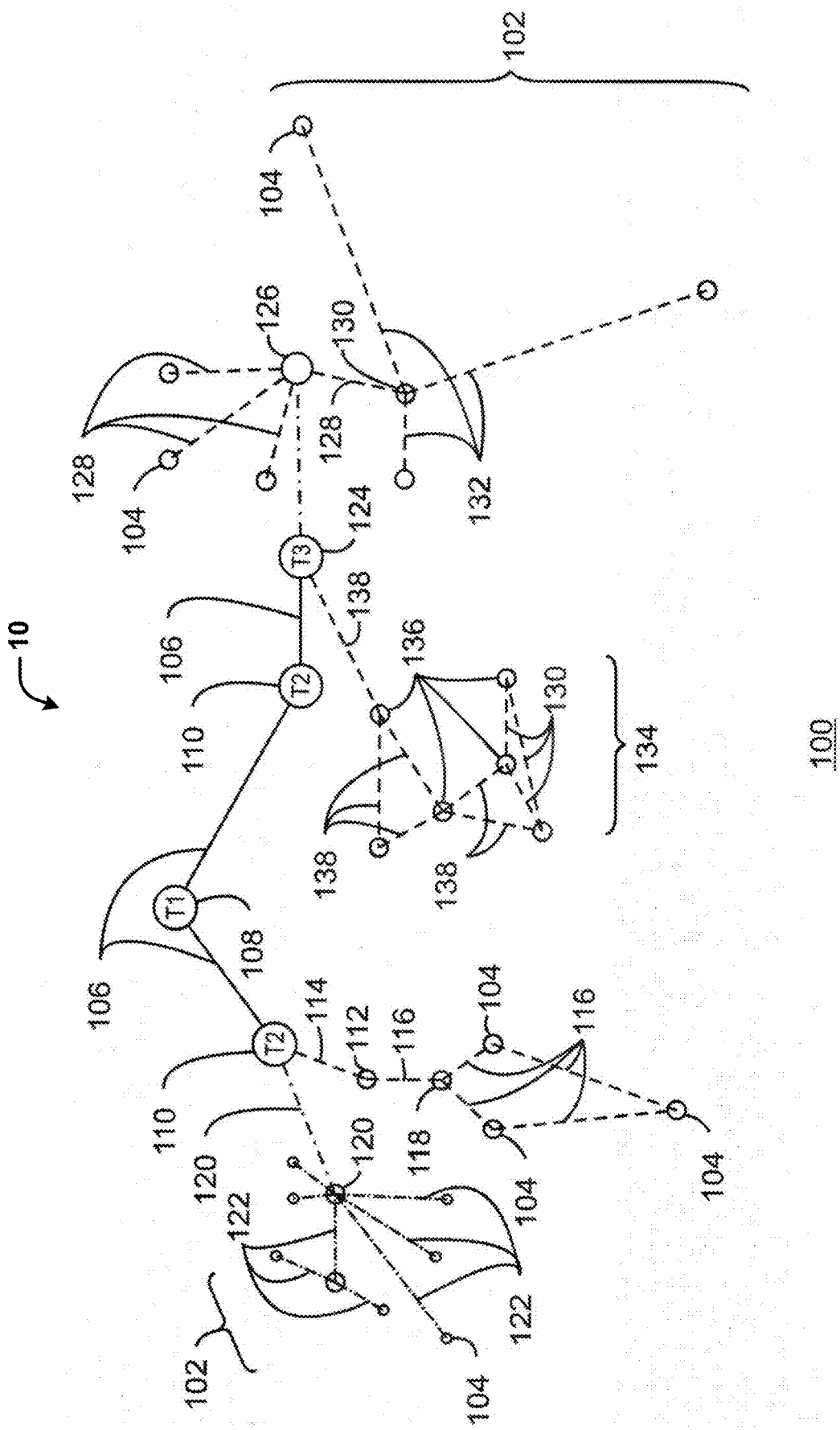
FIG. 1 illustrates an arrangement showing interconnections that may be present between a network and Internet of Things (IoT) networks, in accordance with various embodiments.

Embodiments herein provide mechanisms for network interface-based packet attestation. In disclosed embodiments, each node encapsulates/encodes received packets with network interface information in addition to its node ID. In this way, errors can be diagnosed with finer granularity. Embodiments also include a "multi-interface translation layer" to be implemented at each node below the network layer (e.g., a layer 3 protocol stack) and above the layer 2 protocol stack of various protocols (e.g., above the MAC layer). The multi-interface translation layer (MITL) determines the type of interface to be used to forward a received packet to a next hop, and encapsulates the received packet with an indication of the determined interface to be used to forward the packet. Other embodiments are disclosed and/or claimed.

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc., in order to provide a thorough understanding of the various aspects of the claimed invention. However, it will be apparent to those skilled in the art having the benefit of the present disclosure that the various aspects of the invention claimed may be practiced in other examples that depart from these specific details. In certain instances, descriptions of well-known devices, circuits, and methods are omitted so as not to obscure the description of the present invention with unnecessary detail.

Various aspects of the illustrative embodiments will be described using terms commonly employed by those skilled in the art to convey the substance of their work to others skilled in the art. However, it will be apparent to those skilled in the art that alternate embodiments may be practiced with only some of the described aspects. For purposes of explanation, specific numbers, materials, and configurations are set forth in order to provide a thorough understanding of the illustrative embodiments. However, it will be apparent to one skilled in the art that alternate embodiments may be practiced without the specific details. In other instances, well-known features are omitted or simplified in order not to obscure the illustrative embodiments.

Further, various operations will be described as multiple discrete operations, in turn, in a manner that is most helpful in understanding the illustrative embodiments; however, the order of description should not be construed as to imply that these operations are necessarily order dependent. In particular, these operations need not be performed in the order of presentation.

The phrases "in various embodiments," "in some embodiments," and the like are used repeatedly. These phrases generally do not refer to the same embodiments; however, they may. The terms "comprising," "having," and "including" are synonymous, unless the context dictates otherwise. The phrase "A and/or B" means (A), (B), or (A and B). The phrases "A/B" and "A or B" mean (A), (B), or (A and B), similar to the phrase "A and/or B." For the purposes of the present disclosure, the phrase "at least one of A and B" means (A), (B), or (A and B). The description may use the phrases "in an embodiment," "in embodiments," "in some embodiments," and/or "in various embodiments," which may each refer to one or more of the same or different embodiments. Furthermore, the terms "comprising," "including," "having," and the like, as used with respect to embodiments of the present disclosure, are synonymous. The terms "coupled," "communicatively coupled," along with derivatives thereof are used herein. The term "coupled" may mean two or more elements are in direct physical or electrical contact with one another, may mean that two or more elements indirectly contact each other but still cooperate or interact with each other, and/or may mean that one or more other elements are coupled or connected between the elements that are said to be coupled with each other. The term "directly coupled" may mean that two or more elements are in direct contact with one another. The term "communicatively coupled" may mean that two or more elements may be in contact with one another by a means of communication including through a wire or other interconnect connection, through a wireless communication channel or link, and/or the like.

Example embodiments may be described as a process depicted as a flowchart, a flow diagram, a data flow diagram, a structure diagram, or a block diagram. Although a flowchart may describe the operations as a sequential process, many of the operations may be performed in parallel, concurrently, or simultaneously. In addition, the order of the operations may be re-arranged. A process may be terminated when its operations are completed, but may also have additional operations not included in the figure(s). A process may correspond to a method, a function, a procedure, a subroutine, a subprogram, and the like. When a process corresponds to a function, its termination may correspond to a return of the function to the calling function and/or the main function.

Example embodiments may be described in the general context of computer-executable instructions, such as program code, software modules, and/or functional processes, being executed by one or more of the aforementioned circuitry. The program code, software modules, and/or functional processes may include routines, programs, objects, components, data structures, etc., that perform particular tasks or implement particular data types. The program code, software modules, and/or functional processes discussed herein may be implemented using existing hardware in existing communication networks. For example, program code, software modules, and/or functional processes discussed herein may be implemented using existing hardware at existing network elements or control nodes.

I. Example System Overview

The internet of things (IoT) is a concept in which a large number of computing devices are interconnected to each other and to the Internet to provide functionality and data acquisition at very low levels. As used herein, an IoT device may include a semiautonomous device performing a function, such as sensing or control, among others, in communication with other IoT devices and a wider network, such as the Internet. Often, IoT devices are limited in memory, size, or functionality, allowing larger numbers to be deployed for a similar cost to smaller numbers of larger devices. However, an IoT device may be a smart phone, laptop, tablet, or PC, or other larger device. Further, an IoT device may be a virtual device, such as an application on a smart phone or other computing device. IoT devices may include IoT gateways, used to couple IoT devices to other IoT devices and to cloud applications, for data storage, process control, and the like.

Networks of IoT devices may include commercial and home automation devices, such as water distribution systems, electric power distribution systems, pipeline control systems, plant control systems, light switches, thermostats, locks, cameras, alarms, motion sensors, and the like. The IoT devices may be accessible through remote computers, servers, and other systems, for example, to control systems or access data.

The future growth of the Internet may include very large numbers of IoT devices. Accordingly, as described herein, a number of innovations for the future Internet address the need for all these layers to grow unhindered, to discover and make accessible connected resources, and to support the ability to hide and compartmentalize connected resources. Any number of network protocols and communications standards may be used, wherein each protocol and standard is designed to address specific objectives. Further, the protocols are part of the fabric supporting human accessible services that operate regardless of location, time or space. The innovations include service delivery and associated infrastructure, such as hardware and software. The services may be provided in accordance with the Quality of Service (QoS) terms specified in service level and service delivery agreements. The use of IoT devices and networks present a number of new challenges in a heterogeneous network of connectivity comprising a combination of wired and wireless technologies as depicted in FIGS. 1 and 2.

Figure 2:
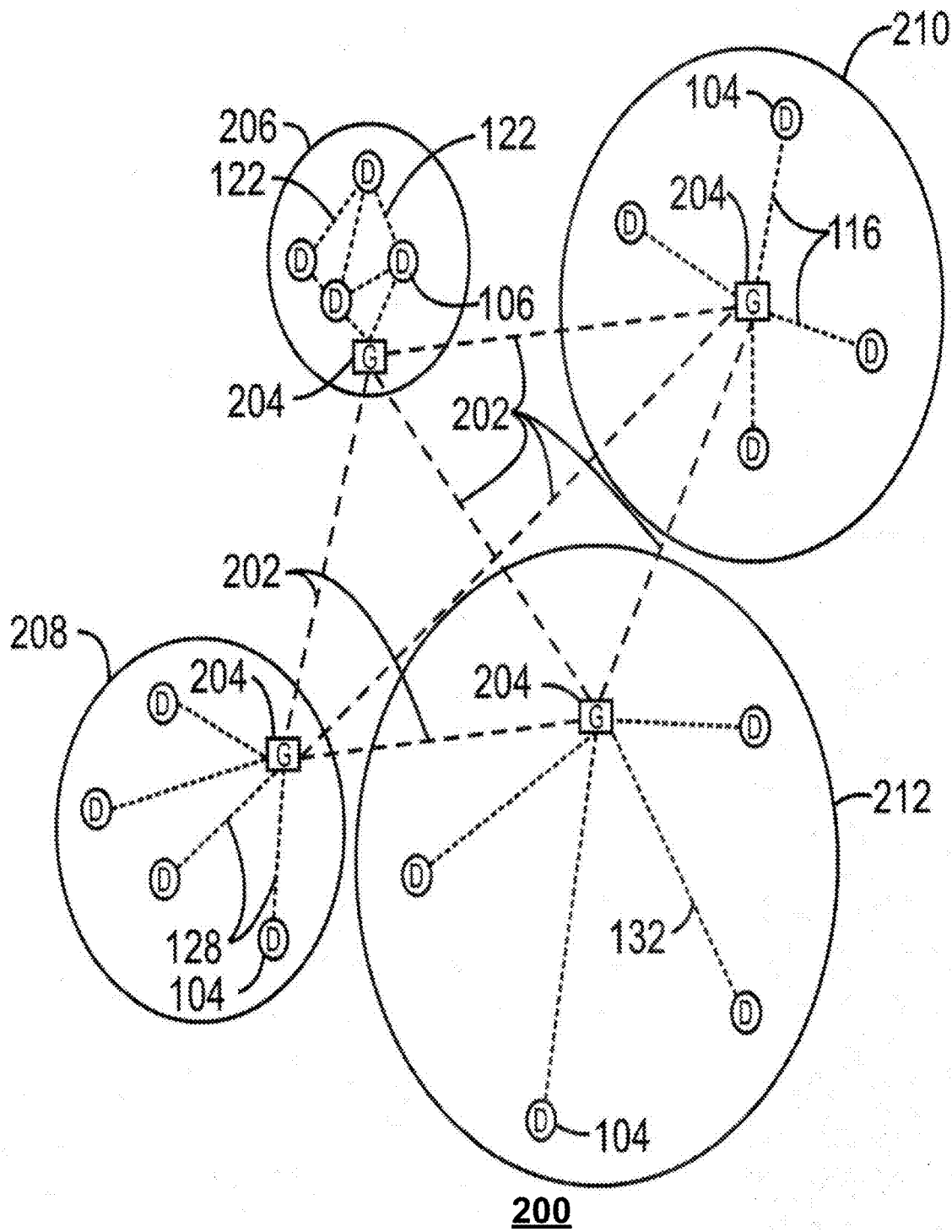
FIG. 2 illustrates an example domain topology, in accordance with various embodiments.

FIG. 1 illustrates an arrangement 10 showing interconnections that may be present between the Internet 100 and IoT networks, in accordance with various embodiments. The interconnections may couple smaller networks 102, down to the individual IoT device 104, to the fiber backbone 106 of the Internet 100. To simplify the drawing, not every device 104, or other object, is labeled.

In FIG. 1, top-level providers, which may be termed tier 1 providers 108, are coupled by the fiber backbone of the Internet to other providers, such as secondary or tier 2 providers 110. In one example, a tier 2 provider 110 may couple to a tower 112 of an LTE cellular network, for example, by further fiber links, by microwave communications 114, or by other communications technologies. The tower 112 may couple to a mesh network including IoT devices 104 through an LTE communication link 116, for example, through a central node 118. The communications between the individual IoT devices 104 may also be based on LTE or NR communication links 116. In another example, a high-speed uplink 120 may couple a tier 2 provider 110 to a gateway (GW) 120. A number of IoT devices 104 may communicate with the GW 120, and with each other through the GW 120, for example, over BLE links 122.

The fiber backbone 106 may couple lower levels of service providers to the Internet, such as tier 3 providers 124. A tier 3 provider 124 may be considered a general Internet service provider (ISP), for example, purchasing access to the fiber backbone 110 from a tier 2 provider 110 and providing access to a corporate GW 126 and other customers. From the corporate GW 126, a wireless local area network (WLAN) can be used to communicate with IoT devices 104 through Wi-Fi® links 128. A Wi-Fi link 128 may also be used to couple to a low power wide area (LPWA) GW 130, which can communicate with IoT devices 104 over LPWA links 132, for example, compatible with the LoRaWan specification promulgated by the LoRa alliance.

The tier 3 provider 124 may also provide access to a mesh network 134 through a coordinator device 136 that communicates with the tier 3 provider 124 using any number of communications links, such as an LTE cellular link, an LPWA link, or a link 138 based on the IEEE 802.15.4 standard, such as Zigbee®. Other coordinator devices 136 may provide a chain of links that forms cluster tree of linked devices.

IoT devices 104 may be any object, device, sensor, or "thing" that is embedded with hardware and/or software components that enable the object, device, sensor, or "thing" capable of capturing and/or recording data associated with an event, and capable of communicating such data with one or more other devices over a network with little or no user intervention. For instance, in various embodiments, IoT devices 104 may be abiotic devices such as autonomous sensors, gauges, meters, image capture devices, microphones, machine-type communications (MTC) devices, machine-to-machine (M2M) devices, light emitting devices, audio emitting devices, audio and/or video playback devices, electro-mechanical devices (e.g., switch, actuator, etc.), and the like. In some embodiments, IoT devices 104 may be biotic devices such as monitoring implants, biosensors, biochips, and the like. In other embodiments, an IoT device 104 may be a computer device that is embedded in a computer system and coupled with communications circuitry of the computer system. In such embodiments, the IoT device 104 may be a system on chip (SoC), a universal integrated circuitry card (UICC), an embedded UICC (eUICC), and the like, and the computer system may be a mobile station (e.g., a smartphone) or user equipment, laptop PC, wearable device (e.g., a smart watch, fitness tracker, etc.), "smart" appliance (e.g., a television, refrigerator, a security system, etc.), and the like. As used herein, the term "computer device" may describe any physical hardware device capable of sequentially and automatically carrying out a sequence of arithmetic or logical operations, equipped to record/store data on a machine readable medium, and transmit and receive data from one or more other devices in a communications network. A computer device may be considered synonymous to, and may hereafter be occasionally referred to, as a computer, computing platform, computing device, etc. The term "computer system" may include any type interconnected electronic devices, computer devices, or components thereof. Additionally, the term "computer system" and/or "system" may refer to various components of a computer that are communicatively coupled with one another. Furthermore, the term "computer system" and/or "system" may refer to multiple computer devices and/or multiple computing systems that are communicatively coupled with one another and configured to share computing and/or networking resources.

Each of the IoT devices 104 may include one or more memory devices and one or more processors to capture and store/record data. Each of the IoT devices 104 may include appropriate communications circuitry (e.g., transceiver(s), modem, antenna elements, etc.) to communicate (e.g., transmit and receive) captured and stored/recorded data. Further, each IoT device 104 may include other transceivers for communications using additional protocols and frequencies. The wireless communications protocols may be any suitable set of standardized rules or instructions implemented by the IoT devices 104 to communicate with other devices, including instructions for packetizing/depacketizing data, instructions for modulating/demodulating signals, instructions for implementation of protocols stacks, and the like. For example, IoT devices 104 may include communications circuitry that is configurable to communicate in accordance with one or more person-to-person (P2P) or personal area network (PAN) protocols (e.g., IEEE 802.15.4 based protocols including ZigBee, IPv6 over Low power Wireless Personal Area Networks (6LoWPAN), WirelessHART, MiWi, Thread, etc.; WiFi-direct; Bluetooth/BLE protocols; ANT protocols; Z-Wave; LTE D2D or ProSe; UPnP; and the like); configurable to communicate using one or more LAN and/or WLAN protocols (e.g., Wi-Fi-based protocols or IEEE 802.11 protocols, such as IEEE 802.16 protocols); one or more cellular communications protocols (e.g., LTE/LTE-A, UMTS, GSM, EDGE, Wi-MAX, etc.); and the like. In embodiments, one or more of tower 112, GW 120, 126, and 130, coordinator device 136, and so forth, may also be incorporated with the embodiments described herein, in particular, with references to FIGS. 5-11.

The technologies and networks may enable the exponential growth of devices and networks. As the technologies grow, the network may be developed for self-management, functional evolution, and collaboration, without needing direct human intervention. Thus, the technologies will enable networks to function without centralized controlled systems. The technologies described herein may automate the network management and operation functions beyond current capabilities.

FIG. 2 illustrates an example domain topology 200 that may be used for a number of IoT networks coupled through backbone links 202 to GWs 204, in accordance with various embodiments. Like numbered items are as described with respect to FIG. 1. Further, to simplify the drawing, not every device 104, or communications link 116, 122, 128, or 132 is labeled. The backbone links 202 may include any number of wired or wireless technologies, and may be part of a local area network (LAN), a wide area network (WAN), or the Internet. Similar to FIG. 1, in embodiments, one or more of IoT devices 104, GW 204, and so forth, may be incorporated with embodiments described herein.

The network topology 200 may include any number of types of IoT networks, such as a mesh network 206 using BLE links 122. Other IoT networks that may be present include a WLAN network 208, a cellular network 210, and an LPWA network 212. Each of these IoT networks may provide opportunities for new developments, as described herein. For example, communications between IoT devices 104, such as over the backbone links 202, may be protected by a decentralized system for authentication, authorization, and accounting (AAA). In a decentralized AAA system, distributed payment, credit, audit, authorization, and authentication systems may be implemented across interconnected heterogeneous infrastructure. This allows systems and networks to move towards autonomous operations.

In these types of autonomous operations, machines may contract for human resources and negotiate partnerships with other machine networks. This may allow the achievement of mutual objectives and balanced service delivery against outlined, planned service level agreements as well as achieve solutions that provide metering, measurements and traceability and trackability. The creation of new supply chain structures and methods may enable a multitude of services to be created, mined for value, and collapsed without any human involvement.

The IoT networks may be further enhanced by the integration of sensing technologies, such as sound, light, electronic traffic, facial and pattern recognition, smell, vibration, into the autonomous organizations. The integration of sensory systems may allow systematic and autonomous communication and coordination of service delivery against contractual service objectives, orchestration and quality of service (QoS) based swarming and fusion of resources.

The mesh network 206 may be enhanced by systems that perform inline data-to-information transforms. For example, self-forming chains of processing resources comprising a multi-link network may distribute the transformation of raw data to information in an efficient manner, and the ability to differentiate between assets and resources and the associated management of each. Furthermore, the proper components of infrastructure and resource based trust and service indices may be inserted to improve the data integrity, quality, assurance and deliver a metric of data confidence.

The WLAN network 208 may use systems that perform standards conversion to provide multi-standard connectivity, enabling IoT devices 104 using different protocols to communicate. Further systems may provide seamless interconnectivity across a multi-standard infrastructure comprising visible Internet resources and hidden Internet resources. Communications in the cellular network 210 may be enhanced by systems that offload data, extend communications to more remote devices, or both. The LPWA network 212 may include systems that perform non-Internet protocol (IP) to IP interconnections, addressing, and routing.

Figure 3:
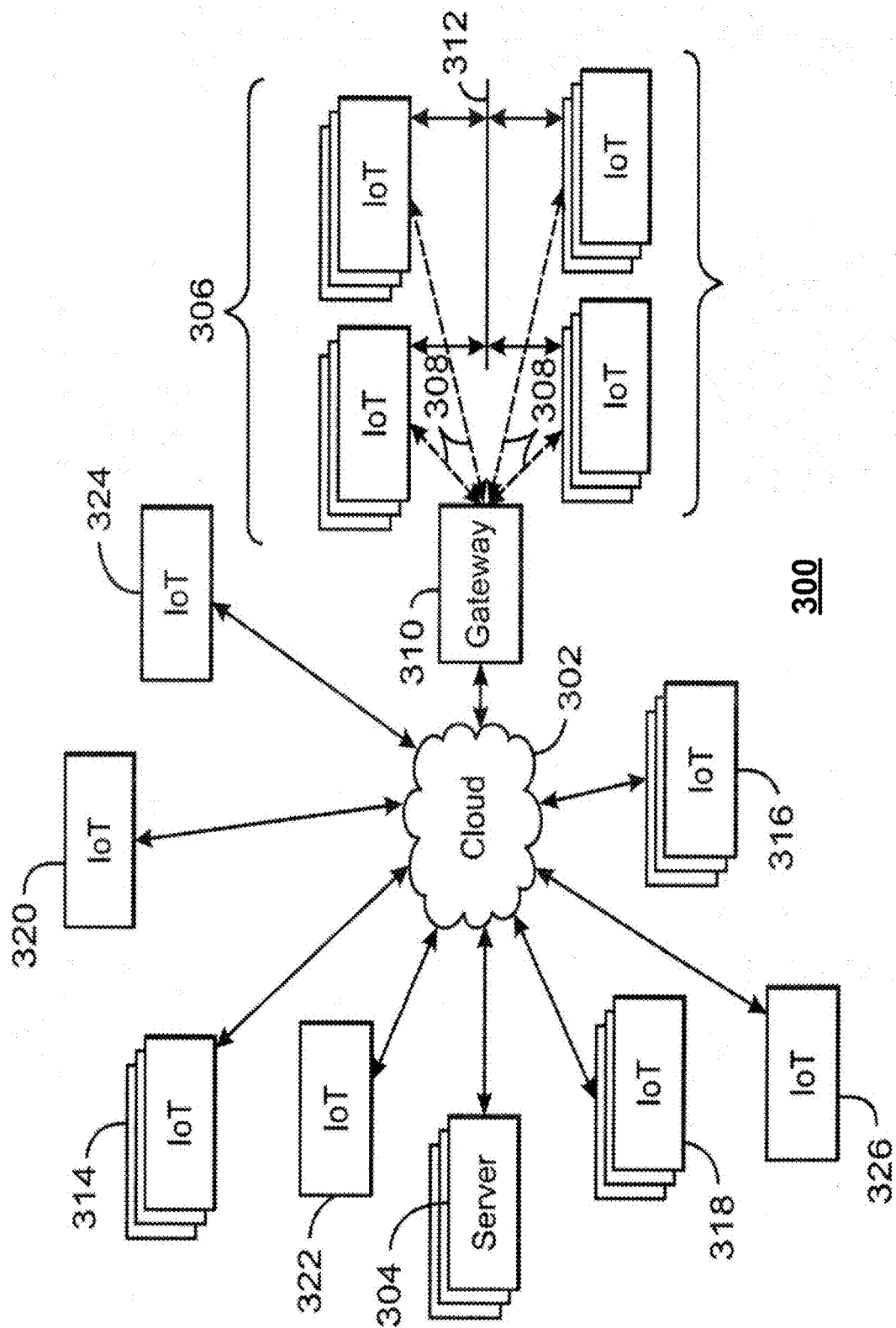
FIG. 3 illustrates an example cloud computing network or cloud in communication with a number of IoT devices, in accordance with various embodiments.

FIG. 3 illustrates an arrangement 300 of example cloud computing network, or cloud 302, in communication with a number of Internet of Things (IoT) devices, in accordance with various embodiments. The cloud 302 may represent the Internet, one or more cellular networks, a local area network (LAN) or a wide area network (WAN) including proprietary and/or enterprise networks for a company or organization, or combinations thereof. Components used for such communications system can depend at least in part upon the type of network and/or environment selected. Protocols and components for communicating via such networks are well known and will not be discussed herein in detail. However, it should be appreciated that cloud 302 may be associated with network operator who owns or controls equipment and other elements necessary to provide network-related services, such as one or more base stations or access points, and one or more servers for routing digital data or telephone calls (for example, a core network or backbone network).

The IoT devices in FIG. 3 may be the same or similar to the IoT devices 104 discussed with regard to FIGS. 1-2. The IoT devices may include any number of different types of devices, grouped in various combinations, such as IoT group 306 that may include IoT devices that provide one or more services for a particular user, customer, organizations, etc. A service provider may deploy the IoT devices in the IoT group 306 to a particular area (e.g., a geolocation, building, etc.) in order to provide the one or more services. In one example, the IoT group 306 may be a traffic control group where the IoT devices in the IoT group 306 may include stoplights, traffic flow monitors, cameras, weather sensors, and the like, to provide traffic control and traffic analytics services for a particular municipality or other like entity. Similar to FIGS. 1-2, in embodiments, one or more of IoT devices 314-324, GW 310, and so forth, may be incorporated with the various embodiments described herein, in particular, with references to FIGS. 5-8. For example, in some embodiments, the IoT group 306, or any of the IoT groups discussed herein, may include the components, devices, systems discussed with regard to FIGS. 7-9.

The IoT group 306, or other subgroups, may be in communication with the cloud 302 through wireless links 308, such as LPWA links, and the like. Further, a wired or wireless sub-network 312 may allow the IoT devices to communicate with each other, such as through a local area network, a wireless local area network, and the like. The IoT devices may use another device, such as a GW 310 to communicate with the cloud 302. Other groups of IoT devices may include remote weather stations 314, local information terminals 316, alarm systems 318, automated teller machines 320, alarm panels 322, or moving vehicles, such as emergency vehicles 324 or other vehicles 326, among many others. Each of these IoT devices may be in communication with other IoT devices, with servers 304, or both.

As can be seen from FIG. 3, a large number of IoT devices may be communicating through the cloud 302. This may allow different IoT devices to request or provide information to other devices autonomously. For example, the IoT group 306 may request a current weather forecast from a group of remote weather stations 314, which may provide the forecast without human intervention. Further, an emergency vehicle 324 may be alerted by an automated teller machine 320 that a burglary is in progress. As the emergency vehicle 324 proceeds towards the automated teller machine 320, it may access the traffic control group 306 to request clearance to the location, for example, by lights turning red to block cross traffic at an intersection in sufficient time for the emergency vehicle 324 to have unimpeded access to the intersection.

In another example, the IoT group 306 may be an industrial control group (also referred to as a "connected factory", an "industry 4.0" group, and the like) where the IoT devices in the IoT group 306 may include machines or appliances with embedded IoT devices, radiofrequency identification (RFID) readers, cameras, client computer devices within a manufacturing plant, and the like, to provide production control, self-optimized or decentralized task management services, analytics services, etc. for a particular manufacturer or factory operator. In this example, the IoT group 306 may communicate with the servers 304 via GW 310 and cloud 302 to provide captured data, which may be used to provide performance monitoring and analytics to the manufacturer or factory operator. Additionally, the IoT devices in the IoT group 306 may communicate among each other, and/or with other IoT devices of other IoT groups, to make decisions on their own and to perform their tasks as autonomously as possible.

Clusters of IoT devices, such as the IoT groups depicted by FIG. 3, may be equipped to communicate with other IoT devices as well as with the cloud 302. This may allow the IoT devices to form an ad-hoc network between the devices, allowing them to function as a single device, which may be termed a fog device. This is discussed further with respect to FIG. 4.

Figure 4:
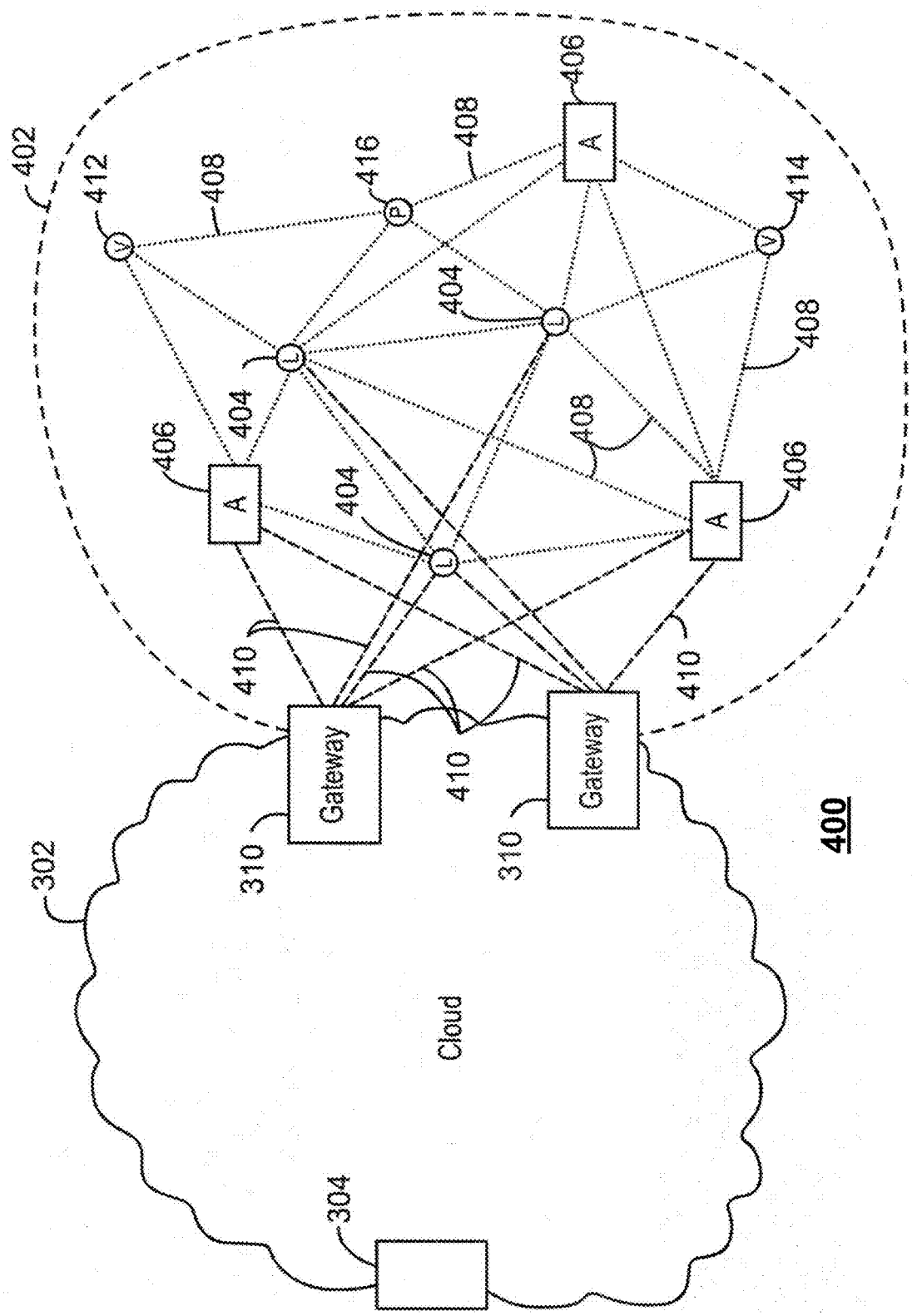
FIG. 4 illustrates an arrangement of a cloud computing network or cloud in communication with a mesh network of IoT devices or IoT fog, in accordance with various embodiments.

FIG. 4 illustrates an arrangement 400 of a cloud computing network, or cloud 302, in communication with a mesh network of IoT devices, which may be termed a fog device 402, operating at the edge of the cloud 302, in accordance with various embodiments. Like numbered items are as described with respect to FIGS. 1-3. In this example, the fog device 402 is a group of IoT devices at an intersection. The fog device 402 may be established in accordance with specifications released by the OpenFog Consortium (OFC), the Open Connectivity Foundation™ (OCF), among others.

In embodiments, fog computing systems, such as fog device 402, may be mechanisms for bringing cloud computing functionality closer to data generators and consumers wherein various network devices run cloud application logic on their native architecture. Fog computing systems may be used to perform low-latency computation/aggregation on the data while routing it to a central cloud computing service for performing heavy computations or computationally burdensome tasks. On the other hand, edge cloud computing consolidates human-operated, voluntary resources such as desktop PCs, tablets, smartphones, nano data centers as a cloud. In various implementations, resources in the edge cloud may be in one to two-hop proximity to the IoT devices 404, which may result in reducing overhead related to processing data and may reduce network delay.

In some embodiments, the fog device 402 may be a consolidation of IoT devices 404 and/or networking devices, such as routers and switches, with high computing capabilities and the ability to run cloud application logic on their native architecture. Fog resources may be manufactured, managed, and deployed by cloud vendors, and may be interconnected with high speed, reliable links. Moreover, Fog resources reside farther from the edge of the network when compared to edge systems but closer than a central cloud infrastructure. Fog devices are used to effectively handle computationally intensive tasks offloaded by edge resources.

In embodiments, the fog device 402 may operate at the edge of the cloud 302. In some embodiments, the fog device 402 operating at the edge of the cloud 302 may overlap or be subsumed into an edge network of the cloud 302. In embodiments, the edge network of the cloud 302 may overlap with the fog device 402, or become a part of the fog device 402. Furthermore, the fog device 402 may be an edge-fog network that includes an edge layer and a fog layer. The edge layer of the edge-fog network includes a collection of loosely coupled, voluntary and human-operated resources (e.g., the aforementioned edge devices). The Fog layer resides on top of the edge layer and is a consolidation of networking devices such as those discussed herein.

Data may be captured, stored/recorded, and communicated among the IoT devices 404. Analysis of the traffic flow and control schemes may be implemented by aggregators 406 that are in communication with the IoT devices 404 and each other through a mesh network. Data may be uploaded to the cloud 302, and commands received from the cloud 302, through GWs 310 that are in communication with the IoT devices 404 and the aggregators 406 through the mesh network. Unlike the traditional cloud computing model, in some implementations, the cloud 302 may have little or no computational capabilities and only serves as a repository for archiving data recorded and processed by the fog device 402. In these implementations, the cloud 302 centralized data storage system and provides reliability and access to data by the computing resources in the fog 402 and/or edge devices. Being at the core of the architecture, the Data Store is accessible by both Edge and Fog layers of the aforementioned edge-fog network.

Similar to FIGS. 1-3, in embodiments, one or more of IoT devices 404, aggregators 406, and so forth, may be incorporated with the various embodiments described herein, in particular, with references to FIGS. 5-8. For example, in some embodiments, the fog device 402, or any of grouping of devices discussed herein, may include the one or more components, devices systems, etc. discussed infra with regard to FIGS. 9-11.

Any number of communications links may be used in the fog device 402. Shorter-range links 408, for example, compatible with IEEE 802.15.4 may provide local communications between IoT devices that are proximate to one another or other devices. Longer-range links 410, for example, compatible with LPWA standards, may provide communications between the IoT devices and the GWs 310. To simplify the diagram, not every communications link 408 or 410 is labeled with a reference number.

The fog device 402 may be considered to be a massively interconnected network wherein a number of IoT devices are in communications with each other, for example, by the communication links 408 and 410. The network may be established using the open interconnect consortium (OIC) standard specification 1.0 released by the Open Connectivity Foundation™ (OCF) on Dec. 23, 2015. This standard allows devices to discover each other and establish communications for interconnects. Other interconnection protocols may also be used, including, for example, the AllJoyn protocol from the AllSeen alliance, the optimized link state routing (OLSR) Protocol, or the better approach to mobile ad-hoc networking (B.A.T.M.A.N), among many others.

Communications from any IoT device may be passed along the most convenient path between any of the IoT devices to reach the GWs 310. In these networks, the number of interconnections may provide substantial redundancy, allowing communications to be maintained, even with the loss of a number of IoT devices.

Not all of the IoT devices may be permanent members of the fog device 402. In the example in the drawing 400, three transient IoT devices have joined the fog device 402, a first mobile device 412, a second mobile device 414, and a third mobile device 416. The fog device 402 may be presented to clients in the cloud 302, such as the server 304, as a single device located at the edge of the cloud 302. In this example, the control communications to specific resources in the fog device 402 may occur without identifying any specific IoT device 404 within the fog device 402. Accordingly, if any IoT device 404 fails, other IoT devices 404 may be able to discover and control a resource. For example, the IoT devices 404 may be wired so as to allow any one of the IoT devices 404 to control measurements, inputs, outputs, etc., for the other IoT devices 404. The aggregators 406 may also provide redundancy in the control of the IoT devices 404 and other functions of the fog device 402.

In some examples, the IoT devices may be configured using an imperative programming style, e.g., with each IoT device having a specific function and communication partners. However, the IoT devices forming the fog device 402 may be configured in a declarative programming style, allowing the IoT devices to reconfigure their operations and communications, such as to determine needed resources in response to conditions, queries, and device failures. This may be performed as transient IoT devices, such as the devices 412, 414, 416, join the fog device 402. As transient or mobile IoT devices enter or leave the fog 402, the fog device 402 may reconfigure itself to include those devices. This may be performed by forming a temporary group of the devices 412 and 414 and the third mobile device 416 to control or otherwise communicate with the IoT devices 404. If one or both of the devices 412, 414 are autonomous, the temporary group may provide instructions to the devices 412, 414. As the transient devices 412, 414, and 416, leave the vicinity of the fog device 402, it may reconfigure itself to eliminate those IoT devices from the network. The fog device 402 may also divide itself into functional units, such as the IoT devices 404 and other IoT devices proximate to a particular area or geographic feature, or other IoT devices that perform a particular function. This type of combination may enable the formation of larger IoT constructs using resources from the fog device 402.

As illustrated by the fog device 402, the organic evolution of IoT networks is central to maximizing the utility, availability and resiliency of IoT implementations. Further, the example indicates the usefulness of strategies for improving trust and therefore security. The local identification of devices may be important in implementations, as the decentralization of identity ensures a central authority cannot be exploited to allow impersonation of objects that may exist within the IoT networks. Further, local identification lowers communication overhead and latency.

Figure 5:
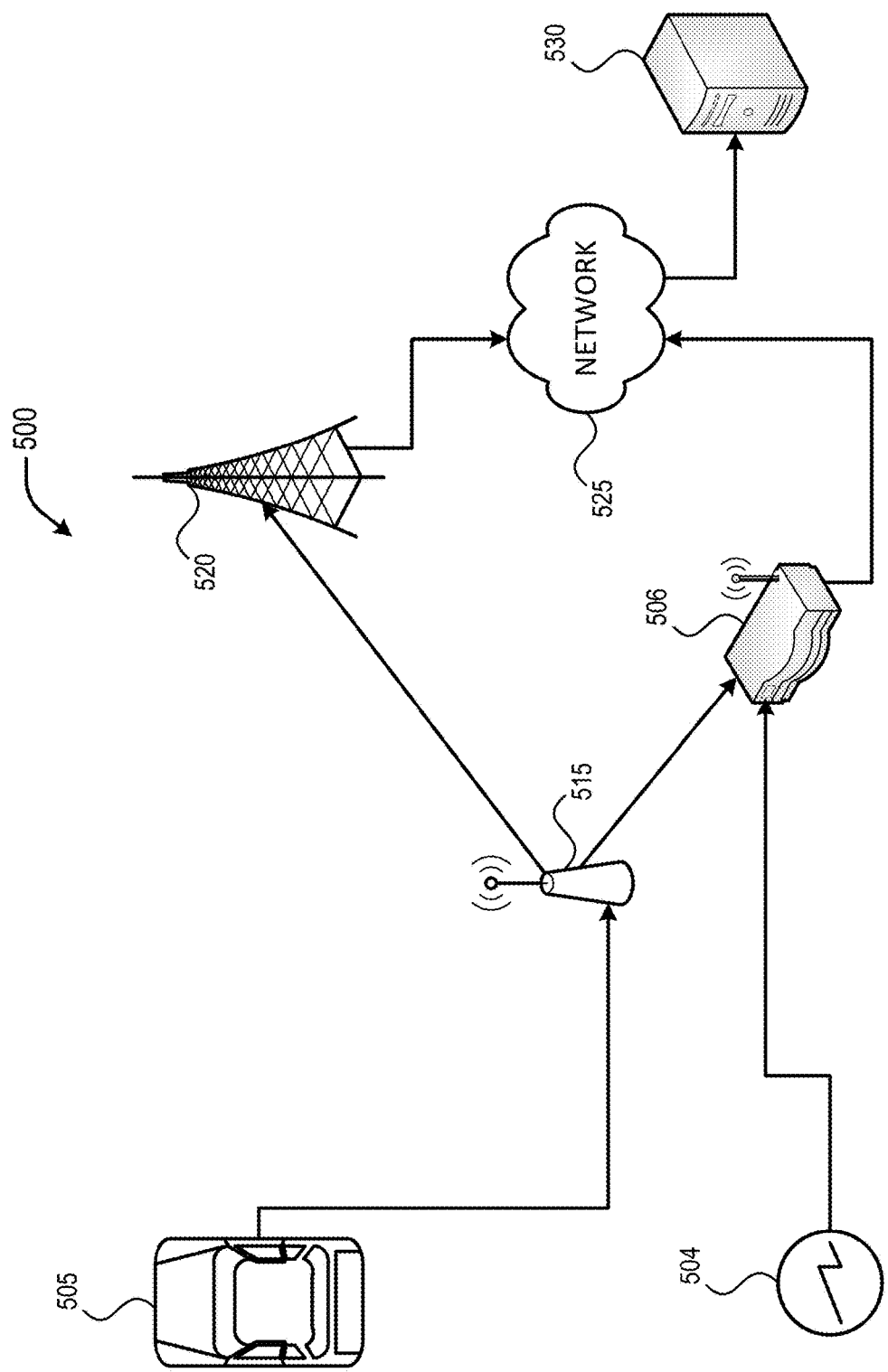
FIG. 5 illustrates an architectural view of the multi-interface translation technology of the present disclosure, according to various embodiments.

FIG. 5 illustrates an architectural view of the multi-interface translation technology of the present disclosure, according to various embodiments. The network 500 shown by FIG. 5 employees a distributed wireless network architecture comprising multi-interface wireless nodes and incorporates network access technology (or "network interface") information into data packets for network provenance. This enables tracking the involvement of certain network interfaces in forwarding data packets throughout the system 500 and may be used to diagnose and locate where data corruption or network failures and errors take place in the system 500.

As illustrated, the system 500 includes user equipment (UE) 504 and 505, access point (AP) 506, access network (AN) nodes 515 and 520, network 525, and an application server 530, each of which are incorporated with the teachings of the present disclosure. The entities in the distributed wireless network 500 may be considered "network nodes" or "nodes" that communicate among themselves in multi-hop fashion. The term "hop" may refer to an individual node or intermediary device through which data packets traverse a path between a source device and a destination device, and a "hop count" may refer to a number of intermediate devices through which data passes between the source device and the destination device. Intermediate nodes (i.e., nodes that are located between a source device and a destination device along a path) are allowed to modify packet contents as sensed data from several vehicles (e.g., vehicle UE 505, vehicles 324, 326) or IoT nodes (e.g., IoT UE 504) can be combined/aggregated/compressed on the way to its final destination (e.g., application server 530). One or more nodes may have multiple wireless network interfaces (e.g., LTE, 5G, DSRC, ZigBee, Bluetooth/BLE, etc.). In one example, the architecture of network 500 may be a de-centralized V2X network comprising vehicle UEs 505 with one or multiple network interfaces, road side units (RSUs) 515, and macrocell base stations 520. As used herein, the terms "vehicle-to-everything" and "V2X" may refer to any communication involving a vehicle as a source or destination of a message. Additionally, the terms "vehicle-to-everything" and "V2X" as used herein may also encompass or be equivalent to vehicle-to-vehicle (V2V communications, vehicle-to-infrastructure (V2I) communications, vehicle-to-network (V2N) communications, vehicle-to-pedestrian (V2P) communications, enhanced V2X (eV2X), or the like. In a second example, the architecture of network 500 may be an IoT network comprising heterogeneous IoT devices 504 with one or more network interfaces, one or more access points 506 and/or gateway devices, and the like. The architecture of network 500 in the second example may be the same or similar to the example embodiments shown and described with regard to FIGS. 1-4.

Figure 7A:
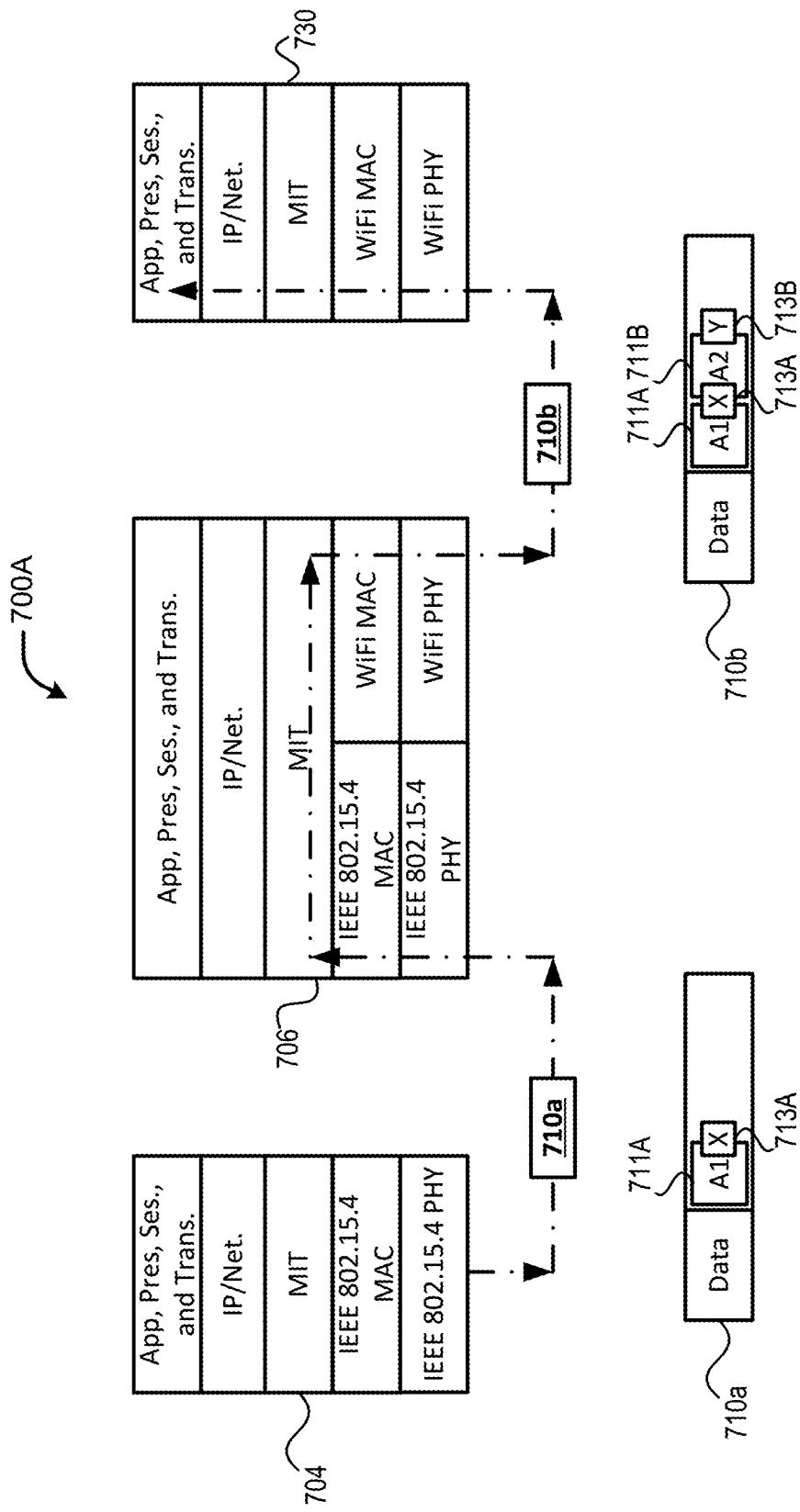
FIGS. 7A and 7B illustrate a first network provenance example and a second network provenance example, respectively, according to various embodiments
Figure 7B:
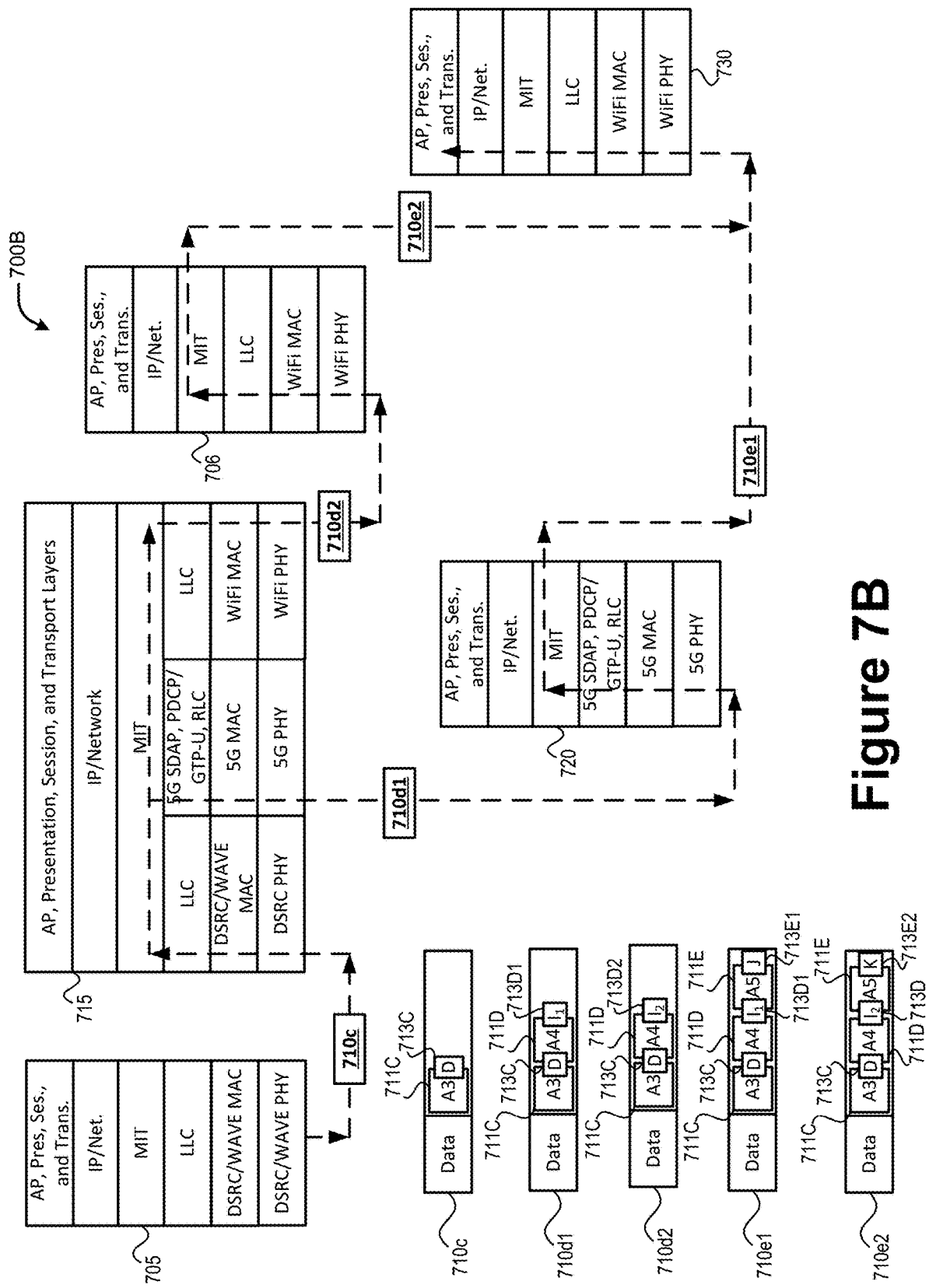

According to various embodiments, each node in the network 500 includes a Multi-interface Translation layer (MIT) between one or more layer 3 (L3) protocols and various layer 2 (L2) protocols for different wireless network interfaces, which is discussed in more detail with respect to FIGS. 7A and 7B. The L3 protocols may be or reside in the network layer of the OSI model. The network layer is responsible for knowing the internetwork path (routing) from a source (sending) device to a destination (receiver) device. The network layer is also responsible for logical addressing schemes that assign logical addresses to network hosts on both sides of the path. L3 protocols send datagrams (or packets) to the L2 entities. The datagrams/packets contain a defined set of data including addressing and control information that is routed between the source and destination devices. Examples of L3 protocols include, inter alia, internet protocol (IP), Internetwork Packet Exchange/Sequenced Packet Exchange (IPX/SPX), AppleTalk, DECnet, Routing Information Protocol (RIP), Interior Gateway Routing Protocol (IGRP), Enhanced IGRP (EIGRP), Open Shortest Path First (OSPF), intermediate system-to-intermediate system (IS-IS), Border Gateway Protocol (BGP), and Exterior Gateway Protocol (EGP). In 3GPP-based networks (e.g., LTE, NR, etc.), L3 includes a Radio Resource Control (RRC) protocol/layer. Typically, the RRC layer communicates data with the L2 protocol entities via one or more service access points (SAPs) and may configure the lower layer entities via corresponding management SAPs (M-SAPs).

The L2 protocols may be or reside in the data link layer of the OSI model. The Data Link Layer is responsible for reliable transmission of data across a physical network link, using specifications that provide different network and protocol characteristics, which includes physical addressing, different network topologies, error notifications, frame (Layer 2 data units) sequences, and frame flow control. L2 is concerned with a specific addressing structure, namely physical addressing, as opposed to the L3 logical addressing scheme. Depending on the interface implementations, the physical addressing generally comes in the form of a MAC addresses that is encoded into the communication interface circuitry of the node. For IEEE-based protocols, the logical link control (LLC) layer may perform L3 multiplexing and demultiplexing operations. On receiving a frame from the media access control (MAC) layer or the physical layer, the LLC layer identifies an L3 protocol type from an LLC header portion and provides the datagram to the correct L3 protocol via a suitable SAP ("de-multiplexing"). When sending data, the LLC layer provides packets from a particular L3 protocol entity to the MAC layer via a MAC SAP after inserting an L3 protocol type in the LLC header portion of the frame ("multiplexing"). The MAC layer of IEEE based interfaces (e.g., IEEE 802.3) specifies a physical MAC address that identifies an interface or node on a network. Each frame (e.g., MAC protocol data unit (MPDU)) sent over the wire contains a MAC address field, and only devices with a specific MAC address can process the frame. A source MAC address field is also included in the frame. Each interface implemented by a node has a corresponding L2 protocol stack. For example, a node comprising an IEEE 802.11 based interface may including an L2 protocol stack comprising LLC and MAC layers, and the node may include a 3GPP-based interface including an L2 protocol stack comprising a service data adaptation protocol (SDAP) layer (e.g., for a 5G interface), a packet data convergence protocol (PDCP) layer, a radio link control (RLC) layer, and a MAC layer. Each of the L2 layers communicate with one another via corresponding SAPs between each layer. According to various embodiments, the MIT is configured to communicate with one or more L3 protocols via the respective SAPs of the L3 protocols/layers, and is also configured to communication with the various L2 protocol entities via the respective SAPs of those layers.

The MIT operated by a node determines or identifies the various network interfaces of the node, and when the node receives data packets to be forwarded to another network node, the MIT inserts or encapsulates the data packets to include a packet attestation. The packet attestation includes an identifier of the node, information of a node from which the data packets have been received, and network interface(s) to be used to transmit the data packets to a next node or hop. The MIT may be or may comprise a multiplexer/demultiplexer module to add the packet attestation to the data packets. In addition, the MIT may be configured by higher layers to transmit the data packets via one or more network interfaces.

As shown by FIG. 5, the system 500 includes the UEs 504 and 505, each of which includes an MIT as discussed herein. As used herein, the term "user equipment" or "UE" may refer to a device with radio communication capabilities and may describe a remote user of network resources in a communications network. The term "user equipment" or "UE" may be considered synonymous to, and may be referred to as client, mobile, mobile device, mobile terminal, user terminal, mobile unit, mobile station, mobile user, subscriber, user, remote station, access agent, user agent, receiver, radio equipment, reconfigurable radio equipment, reconfigurable mobile device, etc. Furthermore, the term "user equipment" or "UE" may include any type of wireless/wired device or any computing device including a wireless communications interface. In the example of FIG. 5, the UE 504 is implemented as an IoT device and the UE 505 is implemented in a vehicle (also referred to as "vehicle computing system," "vehicle embedded computing system," "vehicle UE," or the like). The UEs 504 and 505 may also comprise any other type of mobile or non-mobile computing devices, such consumer electronics devices, cellular phones, feature phones, smartphones (e.g., handheld touchscreen mobile computing devices connectable to one or more cellular networks), tablet computers, wearable computer devices, personal digital assistants (PDAs), pagers, wireless handsets, desktop computers, laptop computers, and/or the like. An example implementation of the UEs 504 and 505 are shown and described with regard to FIG. 8.

The IoT UE 504 may be an IoT device that is the same or similar to the IoT devices 104 and 404 discussed previously. Although only a single IoT UE 504 is shown by FIG. 5, multiple IoT UEs 504 may be present. For example, the multiple IoT UEs 504 may be small and low-cost sensor nodes (nodes) part of a wireless sensor network (WSN), where each node includes sensing, data processing, and communication capabilities. The sensing capabilities may include magnetic, thermal, infrared, acoustic, radar, and/or other like sensing capabilities. For the communication capabilities, the IoT UE(s) 504 may comprise a network access layer designed for low-power IoT applications utilizing short-lived UE connections. The IoT UE(s) 504 can utilize technologies such as machine-to-machine (M2M) or machine-type communications (MTC) devices for exchanging data with an MTC server (e.g., application server 530) or device via a public land mobile network (PLMN), Proximity-Based Service (ProSe) or device-to-device (D2D) communication, sensor networks or WSNs, or IoT networks (such as those discussed previously). The M2M or MTC exchange of data may be a machine-initiated exchange of data, and each IoT device 504 may act as relay nodes to forward data from one IoT UE 504 to application server 530 through a path of relay node IoT UEs 504 and ANs 515 and/or 506 in the IoT network. In addition, the IoT UE(s) 504 may execute background applications (e.g., keep-alive messages, status updates, etc.) to facilitate the connections of the IoT network and/or WSN.

The vehicle UE (vUE) 505 is a computing device that is physically mounted on, built in, embedded or otherwise included in a vehicle. Examples of the vUE 505 may include in-vehicle infotainment (IVI), in-car entertainment (ICE) devices, an Instrument Cluster (IC), head-up display (HUD) devices, onboard diagnostic (OBD) devices, dashtop mobile equipment (DME), mobile data terminals (MDTs), Electronic Engine Management System (EEMS), electronic/engine control units (ECUs), electronic/engine control modules (ECMs), embedded systems, microcontrollers, control modules, engine management systems (EMS), and/or the like. Although only a single vUE 505 is shown by FIG. 5, multiple vUEs 505 may be present, and one or more vUEs 505 may act as relay nodes to forward data from one vUE 505 to application server 530 through a path of relay node UEs 505 and ANs 515 and/or 520.

The vUEs 505 may also directly exchange communication data using DSRC interfaces and/or via 3GPP Proximity Services (ProSe), sidelink (SL), or device-to-device (D2D) interface. The 3GPP interfaces may comprise one or more physical or logical channels, including but not limited to one or more DSRC channels, a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH). The DSRC interfaces may include one or more channels in the 5.9 GHz band (5.850-5.925 GHz). Where DSRC interfaces are used, the vUEs 505 may perform one or more medium-sensing operations and/or carrier-sensing operations in order to determine whether one or more channels is unavailable or otherwise occupied prior to transmitting data packets. The medium/carrier sensing operations may be performed according to a listen-before-talk (LBT) protocol. LBT is a mechanism whereby user equipment or infrastructure equipment senses a medium (e.g., a channel or carrier frequency) and transmits when the medium is sensed to be idle (or when a specific channel in the medium is sensed to be unoccupied). The medium sensing operation may include clear channel assessment (CCA), which utilizes at least energy detection (ED) to determine the presence or absence of other signals on a channel in order to determine if a channel is occupied or clear. To determine the presence or absence of other signals, ED includes sensing radiofrequency (RF) energy across an intended transmission band for a predefined or configured period of time and comparing the sensed RF energy to a predefined or configured threshold.

The UEs 504 and 505 are configured to connect, for example, communicatively couple, with one or more access networks (ANs) or radio access networks (RANs). The (R)ANs can include one or more AN nodes 506, 515, and 520 that enable connections with corresponding networks. As used herein, the terms "access node," "access point," or the like may describe network elements or other like equipment that provides the radio baseband functions and/or wire-based functions for data and/or voice connectivity between a network and one or more users. As used herein, the term "network element" may be considered synonymous to and/or referred to as a networked computer, networking hardware, network equipment, router, switch, hub, bridge, radio network controller, radio access network device, gateway, server, and/or any other like device. The term "network element" may describe a physical computing device of a wired or wireless communication network and be configured to host one or more virtual machines.

The AN nodes 506, 515, and 520 can be referred to as base stations (BS), next Generation NodeBs (gNBs), RAN nodes, evolved NodeBs (eNBs), NodeBs, Road Side Units (RSUs), Transmission Reception Points (TRxPs or TRPs), and so forth, and can comprise ground stations (e.g., terrestrial access points) or satellite stations providing coverage within a geographic area (e.g., a cell). An example implementation of the ANs 506, 515, and 520 is shown and described with regard to FIG. 7.

In the example shown by FIG. 5, the AN node 515 is an RSU, the AN node 520 is a cellular base station, and the AN 506 is an access point (AP). The term "Road Side Unit" or "RSU" may refer to any transportation infrastructure entity implemented in or by an gNB/eNB/TRP/RAN node or a stationary (or relatively stationary) UE. An RSU that is implemented in or by a UE may be referred to as a "UE-type RSU", an RSU implemented in or by an eNB may be referred to as an "eNB-type RSU," and an RSU implemented in or by an gNB may be referred to as an "gNB-type RSU." In this example, the RSU 515 is a computing device coupled with radiofrequency circuitry located on a roadside that provides connectivity support to passing vUEs 505. The RSU 515 may also include internal data storage circuitry to store intersection map geometry, traffic statistics, media, as well as applications/software to sense and control on-going vehicular and pedestrian traffic. The RSU 515 may operate on the 5.9 GHz Direct Short Range Communications (DSRC) band to provide very low latency communications required for high speed events, such as crash avoidance, traffic warnings, and the like. In addition, the RSU 515 may operate as a WiFi hotspot (2.4 GHz band) and/or provide connectivity to one or more cellular networks to provide uplink and downlink communications. The computing device and some or all of the radiofrequency circuitry of the RSU 515 may be packaged in a weatherproof enclosure suitable for outdoor installation, and may include a network interface controller to provide a wired (e.g., Ethernet) connection to a traffic signal controller requiring and/or a backhaul network.

As mentioned previously, the AN node 506 is a AN or a wireless AP (WAP). In this example, the IoT UE 504 and the RSU 515 are configured to access the AP 506 (also referred to as also referred to as "WLAN node 506", "WLAN 506", "WLAN Termination 506" or "WT 506" or the like) via respective connections. These connections can comprise a local wireless connection, such as a connection consistent with any IEEE 802.11 protocol, wherein the AP 506 would comprise a WiFi router with radiofrequency circuitry. In this example, the AP 506 is shown to be connected to the network 525 (e.g., the Internet) without connecting to a core network of a wireless system. In some embodiments, the UEs 504 and 505, ANs 515 and/or 520, and AP 506 may be configured to utilize LTE-WLAN aggregation (LWA) operation and/or WLAN LTE/WLAN Radio Level Integration with IPsec Tunnel (LWIP) operation. The LWA operation may involve a UE 504/505 in RRC CONNECTED being configured by a RAN node 520 to utilize radio resources of LTE and WLAN. LWIP operation may involve such a UE using WLAN radio resources via Internet Protocol Security (IPsec) protocol tunneling to authenticate and encrypt packets (e.g., internet protocol (IP) packets) sent over a WiFi connection. IPsec tunneling may include encapsulating entirety of original IP packets and adding a new packet header thereby protecting the original header of the IP packets.

As mentioned previously, the AN node 520 is a cellular base station. The AN node 520 may be a next generation (NG) RAN node that operates in an NR or 5G system (e.g., a gNB), an Evolved Universal Mobile Telecommunications System (UMTS) Terrestrial Radio Access Network (E-UTRAN) that operates in an LTE or 4G system (e.g., an eNB), a legacy RAN, such as a UMTS Terrestrial Radio Access Network (UTRAN) or GERAN (GSM (Global System for Mobile Communications or Groupe Special Mobile) EDGE (GSM Evolution) Radio Access Network), or some other cellular base station. The AN node 520 may be implemented as one or more of a dedicated physical device such as a macrocell base station and/or a low power (LP) base station for providing femtocells, picocells or other like cells having smaller coverage areas, smaller user capacity, or higher bandwidth compared to macrocells. In other embodiments, the AN node 520 may be implemented as one or more software entities running on server computers as part of a virtual network, which may be referred to as a cloud RAN (CRAN), virtual RAN, virtual baseband (BB) unit, cloud-based or virtual BB pool, and/or the like. In other embodiments, the AN node 520 may represent individual gNB-distributed units (DUs) that are connected to a gNB-centralized unit (CU) via an F1 interface (not shown).

Any of the AN nodes can terminate respective air interface protocols and can be the first point of contact for the UEs 504 and 505. In some embodiments, any of the AN nodes can fulfill various logical functions for a respective RAN including, but not limited to, radio network controller (RNC) functions such as radio bearer management, uplink and downlink dynamic radio resource management and data packet scheduling, and mobility management. The UEs 504, 505 utilize connections (or channels), each of which comprises a physical communications interface or layer (discussed in further detail below). As used herein, the term "channel" may refer to any transmission medium, either tangible or intangible, which is used to communicate data or a data stream. The term "channel" may be synonymous with and/or equivalent to "communications channel," "data communications channel," "transmission channel," "data transmission channel," "access channel," "data access channel," "link," "data link," "carrier," "radiofrequency carrier," and/or any other like term denoting a pathway or medium through which data is communicated. Additionally, the term "link" may refer to a connection between two devices through a Radio Access Technology (RAT) for the purpose of transmitting and receiving information. In this example, the various connections between the illustrated devices are illustrated as air interfaces to enable communicative coupling, and can be consistent with wireless area network (WAN) or wireless local area network (WLAN) protocols (e.g., WiFi, DSRC/WAVE, etc.), cellular communications protocols (e.g., a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a fifth generation (5G) protocol, a New Radio (NR) protocol, etc.), and/or any of the other communications protocols discussed herein.

Network 525 may comprise computers, network connections among the computers, and software routines to enable communication between the computers over network connections. In this regard, the network 525 may comprise one or more network elements, each of which including one or more processors, communications systems (e.g., including network interface controllers, one or more transmitters/receivers connected to one or more antennas, etc.), computer readable media, and other like components. Examples of such network elements may include wireless APs (WAPs), a home/business server (with or without RF communications circuitry), routers, switches, hubs, network appliances, radio beacons, base stations, pico-cells or small cell base stations, and/or any other like network elements. Connection to the network 525 may be via a wired or a wireless connection(s) using the various communication protocols discussed infra. As used herein, a wired or wireless communication protocol may refer to a set of standardized rules or instructions implemented by a communication device/system to communicate with other devices, including instructions for packetizing/depacketizing data, modulating/demodulating signals, implementation of protocols stacks, and the like. More than one network may be involved in a communication session between the illustrated devices. Connection to the network 525 may require that the computers execute software routines which enable, for example, the seven layers of the open systems interconnection (OSI) model of computer networking or equivalent in a wireless network. Network 525 may be used to enable relatively long-range communication and may represent, for example, the Internet, a local area network (LAN), a wireless LAN (WLAN), a wide area network (WAN), and the like including proprietary and/or enterprise networks, or combinations thereof.

The application server 530 comprises one or more network elements, such as server computer devices with rack computing architecture component(s), tower computing architecture component(s), blade computing architecture component(s), and/or the like. The application server 530 may correspond to the server 304 discussed previously. The application server 530 may represent a cluster of servers, a server farm, or other grouping or pool of servers, which may be located in a datacenter. The application server 530 provides functionality (or services) to one or more clients (e.g., UE 504 and 505). Generally, the application server 530 may offer applications or services that use IP/network resources, and can be configured to support one or more communication services (e.g., Voice-over-Internet Protocol (VoIP) sessions, PTT sessions, group communication sessions, social networking services, etc.) for the UEs 504 and 505 via the network 525.

As alluded to previously, the nodes in the network 500 include an MIT that performs packet attestation for data packets to be forwarded from towards a destination device. Attestation of data packets in a multi-hop network involves inserting information into the data packets before forwarding the data packets towards the destination device. Packet attestation performed by a plurality of network nodes may be referred to as "network provenance" or "provenance," and the information to be inserted into the data packets may be referred to as "provenance information." The provenance information includes an "attestation," which is information that results from a process of validating the authenticity, integrity, etc. of a node. Packet attestation and/or provenance is used to record the history of data acquisition and ownership of data packets as well as the actions performed on the data while being processed and transmitted across the network 500. In this way, provenance is useful for assessing the trustworthiness of data and its producers, and is also useful for diagnosing and troubleshooting network faults, failures, errors, and the like.

Provenance typically refers to where a packet is produced and how the packet is delivered, i.e., aggregated and/or forwarded towards network infrastructure or a destination device. Typically, an attestation is calculated by concatenating node identifiers (IDs) involved in producing, modifying, and forwarding the data packet towards a destination device. For example, when a node receives a data packet, the node may insert its node ID (sometimes referred to as a "trace" or "trace data") into the data packet before forwarding the data packet to the next hop or node in the path. Each data packet has a field (as part of metadata) for attestation, which is to be updated as the packet traverses each node along a path from a source device to a destination device.

However, even if individual nodes only record trace data of a data packet, the size of the provenance information may rapidly increase as the number of hops increases. Several compact/lightweight data provenance schemes have been proposed, which may be useful for scenarios that involve nodes with limited communication capabilities and/or with limited processing capabilities (e.g., an IoT network involving IoT UEs 504) or scenarios that involve nodes with limited communication capabilities and that require low latency communications (e.g., V2X networks involving vUEs 505). Most provenance schemes simply transmit node IDs in the data packet, and the provenance is obtained by combining the node IDs and the packet sequence numbers at the destination device. Other provenance schemes may include, inter alia, elementary provenance schemes (e.g., generic Secure Provenance Scheme (SPS) or Message authorization code Provenance (MP)); a distributed provenance scheme (e.g., Coordinated Packet Traceback (CAPTRA) or Contact-based traceback (CTrace)); a block-based provenance scheme (e.g., Pseudo Noise Code (PN) or Probabilistic Provenance Flow (PPF)); lossy provenance compression schemes (e.g., Bloom Filter Provenance (BFP)); lossless provenance schemes (e.g., arithmetic coding provenance (ACP) or a dictionary provenance (DP)); a Secure Network Provenance (SNP) scheme, and/or some other provenance schemes.

In SPS, the provenance of a node with respect to a data item $D_i$ is encoded as $P_i = \langle n_i, \text{hash}(D_i) \| C_i \rangle$, where $n_i$ is the node ID; $\text{hash}(D_i)$ is a cryptographic hash of the data item $D_i$; $C_i = \{\text{hash}(n_i, \text{hash}(D_i) \| C_{i-1})\} k_i$, i.e., $C_i$ is a hash value signed by $n_i$ with its encryption key $k_i$. In MP, a node uses its node ID and a cipher block chaining message authentication code (CBC-MAC) as the provenance information. The CBC-MAC is a chain of blocks, except that the first block at the data source has an initial value, where every successive block is generated based on the previous block and the node ID of the current node in the packet path. CAPTRA and CTrace are a distributed provenance scheme where a node $n_i$ sends a packet p to another node $n_j$, where provenance information is stored by nearby nodes in addition to nodes $n_i$ and $n_j$.

PN is a provenance scheme wherein each node encodes a large provenance into a series of smaller binary blocks through pseudonoise code and then transmits the binary blocks via interpacket delay channels. A sequence of $L_p$ bits are used to represent the node ID, and the medium for provenance transmission is a set of $L_p$ inter-packet delays (IPDs) formed by $L_p+1$ consecutive packets that transmit on the same path. In this scheme, each node in a path from source device to destination device only adds one bit from its PN sequence into the delay sequentially (i.e., only $N \cdot L_p$ bits are transmitted to the destination device). In PPF, each node probabilistically encodes a connected subgraph of a packet path into the packet instead of only the node ID; the probabilistic encoding may include using the rank method, prime method, and/or Rabin fingerprints method.

BFP involves using a Bloom Filter (BF) to generate a randomized data structure for representing a set of node IDs. The BF uses m bits and k independent hash functions for the probabilistic representation of a set of items S= $\{s_1, s_2, \ldots, s_n\}$, wherein si is hashed with all of the k independent hash functions and each hash function $h_i$ maps $s_i$ uniformly to a position within the range [0, m−1], and then the corresponding bit of that position in the array is set to "1". An item $s_i$ may be queried within the set of items S by hasing si with the k hash functions to yield k positions. Under the BFP scheme, the source device/node sets all elements to 0 before transmitting the packet, each intermediary node in the path encodes its node ID into the array through the BF and then appends the array to the packet, and the destination device/node tests every node in the network 500 to obtain the nodes in the path.

The ACP scheme involves generating an attestation that is proportional to the occurrence probability of the packet path in the network 500. In this provenance scheme, an arithmetic coding encoder generates a new message to include one or more symbols, where each symbol corresponds to a node in the network 500. The encoder divides a half-open unit interval into half-open subintervals for each symbol based on the respective occurrence probabilities of each symbol. Each symbol is divided into additional half-open subintervals using the same ratios as the original occurrence probabilities of the symbols, and the combination of the symbols is represented through arithmetic coding. An arithmetic coding decoder recovers a message from an interval [a, b) where $0 \leq a$, $b \leq 1$ according to a procedure that is similar to the encoder. In DP, each node scans a file in the form of a symbol string for sequences of symbols accurring multiple times, and then stores the each sequence of symbols in association with an index. A compressed file is generated by replacing the repetitive sequences of symbols with their indices.

SNP schemes involve confidence and integrity protecting an attestation value using a suitable cryptographic hash function (or a message authentication code generated using a cryptographic hash function) to encode the attestation or provenance information. Examples of such cryptographic hash functions may include MD5, MD6, Secure Hash Algorithm (SHA)-1, SHA-2, a Merkle-DamgUrd construction hash function, or the like. Some security provenance schemes involve generating a data stream sketch, wherein an input of a data stream is presented as a sequence of items and outputs a sketch of the data stream for storage in memory. One example data stream sketch may be an authentication manifest Flajolet-Martin (AM-FM) sketch, which prevents the binding data from growing beyond a range based on an occurrence probability and a sample size of the provenance. Another example SNP scheme includes the SnooPY system, which uses a provenance graph recorder that extracts provenance information securely at runtime, and provides the provenance information to a microquery module when a query is issued for the provenance information.

Regardless of the particular provenance scheme that is used to generate an attestation, the attestation procedure is typically performed at the network layer. In particular, as a packet originates from a source node (e.g., UE 504 or 505) and traverses through the network 500, the packet is attested by the source node and the intermediary (forwarding) nodes. In these cases, the network layer of each node accumulates the individual attestations in the packet, which is then retrieved by the destination node (e.g., the application server 530) for diagnosis and trustworthiness purposes.

As an example, a packet may be produced by vUE 505 and sent to RSU 515, which is then forwarded to base station 520 and AP 506 each of which individually forwards the packet to the application server 530 through the network 525. In this example, the application server 530 may receive packets with attestations<UE-505_ID,RSU-515_ID,BS-520_ID> and <UE-505_ID,RSU-515_ID,AP-506_ID>, respectively. An owner or operator of the application server 530 may use this information to track the forwarding path and take further actions (such as sending queries to a specific node about network state information) to determine reasons for erroneous contents in the received packet. However, this approach does not identify the particular network interfaces or access technologies involved in the data forwarding, which may be useful for scenarios where the network 500 includes nodes with multiple network interfaces. Therefore, it may be difficult to identify interface-related issues and/or to identify errors or faults related to network/protocol translation.

According to various embodiments, each node in network 500 includes an MIT that performs packet attestation using network interface information. In embodiments, the MIT generates provenance information to include an indication of a particular network interface to be used to forward the packet to the next hop in the path. In embodiments, the network interface information may be part of the attestation (and identified during an attestation procedure), or the network interface information may be separate from the attestation. Where more than one network interface is used to forward a packet, individual indicators may be included in the provenance information to indicate each of the network interfaces to be used to forward the packet. In embodiments, the MIT inserts the network interface information into a header of the data packet along with the node ID.

In embodiments, the MIT collects information regarding available network interfaces of a node and orders the available interfaces according to system configuration. For example, where a maximum number of available interfaces Nmax are included in one or more nodes, then a set of bits, b1, b2, b3, . . . bNmax may be used to specify one or more network interfaces that are to be used to transmit a given packet. In various embodiments, a bitmap may be used where each bit position in the bit map indicates an individual network interface. In these embodiments, the MIT encapsulates the bitmap into a header of the packet before forwarding the packet to the next hop. As an example, a IP version 6 (IPv6) packet may be used as the network layer protocol whose header field are encapsulated with the network interface bitmap, as is shown by FIG. 6.

Figure 6:
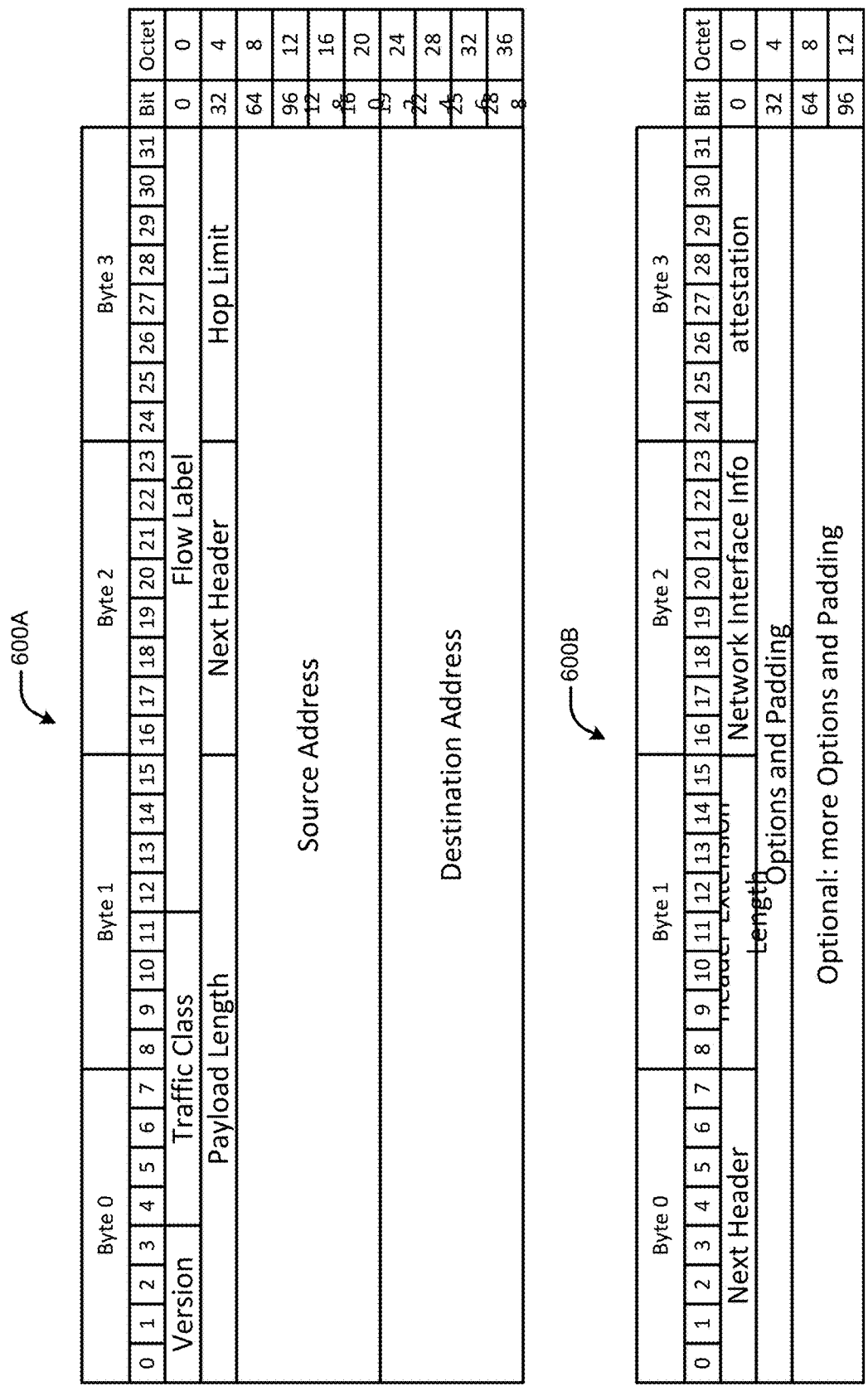
FIG. 6 illustrates an example internet protocol version 6 (IPv6) packet header and an example Multi-interface Header Option packet in accordance with various embodiments.

FIG. 6 illustrates an example IPv6 packet header 600A and a Multi-interface Header Option 600B in accordance with various embodiments. In this example, the packet 600A is a fixed header portion of an IPv6 packet that includes control information for addressing and routing of the packet. A payload portion of the IPv6 packet (not shown) includes user data to be conveyed to a destination device. The payload of an IPv6 packet is typically a datagram or segment of the higher-level Transport Layer protocol, but may be data for an Internet Layer (e.g., ICMPv6) or Link Layer (e.g., OSPF) instead. The IPv6 packet may be transmitted over a link layer protocol (e.g., Ethernet, or the like), which encapsulates each packet in a frame, or may be transmitted using a suitable tunneling protocol.

The IPv6 packet header 600A is the beginning of an IPv6 packet and has a size of 40 octets or 320 bits. The IPv6 packet header 600A comprises a plurality of fields as shown by FIG. 6A. The source address field includes the IPv6 address of the sending node, and the destination address field includes the IPv6 address of the destination node(s). The version field is to include a constant value of 6 or a bit sequence of 0110. The traffic class field holds two values: a differentiated services (DS) field is located in the six most-significant bits of the traffic class field and is used to classify packets; and an Explicit Congestion Notification (ECN) field is located in the remaining two bits of the traffic class field, and is to indicate traffic where the source node provides congestion control and non-congestion control traffic. The flow label field is to include a value to instruct intermediary nodes (e.g., routers, switches, etc.) with multiple outbound paths to keep the packet on the same path and not to reorder the packets. The payload length field indicates the size of the payload in octets, including any extension headers. The hop limit field includes a value that is decremented by one at each intermediate node visited by the packet. The packet is discarded when the number in the hop limit field reaches zero.

The next header field specifies the type of the next header to follow the fixed header 600A. This field usually specifies a transport layer protocol used by a packet payload. When extension headers are present in the packet, the next header field indicates the particular extension header that is to follows. In order to include the aforementioned multi-interface bitmap in the IPv6 packet header, the next header field can be exploited to add an extra header named "Multi-interface Header Option," an example of which is shown by FIG. 6.

The multi-interface header option (MHO) 600B is an example extension header that is used to convey packet attestation information according to various embodiments herein. Extension headers carry optional Internet layer information, and are placed between the fixed header 600A and upper-layer protocol header(s). The MHO 600B may be similar to, or may be a type of, a Hop-by-Hop Options extension header in that the MHO 600B may need to be examined by all nodes that obtain the packet and/or needs to be examined by all nodes in the packet path.

The next header field of the MHO 600B, the fixed header 600A, and any other extension header(s) are used to form a chain of headers. The chain is created first by the next header field in the fixed header 600A, which indicates the type of the first extension header to follow the fixed header 600A. The next header fields of each subsequent extension header indicates a type of extension header to follow that extension header. The next header field of the last extension header in the chain indicates the type of higher layer protocol header that is in the payload of the packet. For example, the next header field of the fixed header 600A, or some other extension header that follows the fixed header 600A, may include a value that is assigned to the MHO 600B to indicate that the MHO 600B is to follow the fixed header 600A or the other extension header. The value in the next header field 600B to indicate the MHO 600B may be any value in the range of 143 to 254 (or 010F to 0xFE in hexadecimal), which are protocol numbers that are unassigned according to the Internet Assigned Numbers Authority (IANA). In addition, the next header field of the MHO 600B may indicate a next extension header to follow the MHO 600B, or may indicate the type of the upper-layer protocol header in the payload of the packet when the MHO 600B is the last extension header. The header extension length field indicates a length of the MHO 600B in 8-octet units, not including the first 8 octets.

In embodiments, the MHO 600B comprises fields to include provenance information, where the provenance information comprises network interface information and an attestation. In this example, a third byte (byte 2) of the MHO 600B comprises a network interface information field that is used to convey network interface information and a fourth byte (byte 4) of the MHO 600B comprises an attestation field that is used to convey the attestation. The attestation may be a node ID, a digital signature, or some other value generated according to a suitable provenance or attestation scheme, such as those discussed previously.

The network interface information field may be used to convey the aforementioned network interface bitmap. This 8-bit field is used to indicate the network interfaces that are to be used to transmit a given packet. In embodiments, an 8 or 4-bit number may be included in the network interface information field to indicate the network interfaces used to transmit the packet. In the example shown by FIG. 6, the network interface information field is located in the third byte (byte 2) of the first octet (octet 0) of the MHO 600B. However, in other embodiments, the network interface information field may be located in another byte of some other octet of the MHO 600B. As mentioned previously, the network interface bitmap is used to convey the interface information of each node, where individual bits in the bitmap correspond to a particular network interface used to forward the packet. A table or other like data structure may be used to associate a particular interface type with a bit position in the bitmap. The MIT of each node in a network may be configured with this table or data structure by higher layers and according to known mechanisms. As an example, the network interface bitmap may be defined or configured as shown by table 1.

TABLE 1

| Bit Position | Network Technology/Interface |
| --- | --- |
| 0 | DSRC/WAVE (IEEE 802.11p) |
| 1 | WiFi (IEEE 802.11n, ad/y, etc.) |
| 2 | 3GPP LTE |
| 3 | 3GPP 5G/New Radio (NR) |
| 4 | Bluetooth/BLE |
| 5 | IEEE 802.15.4 |
| 6 | Z-Wave |
| 7 | WiMAX (IEEE 802.16) |

In the example of table 1, the first bit position (bit 0) may indicate that a DSRC (IEEE 802.11p) or Wireless Access in Vehicular Environments (WAVE) (IEEE 1609.4) interface is used to transmit the packet; the second bit position (bit 1) may indicate that a WiFi (e.g., any version of 802.11) interface is used to transmit the packet; the third bit position (bit 2) may indicate that a 3GPP Long Term Evolution (LTE) or LTE-Advanced (LTE-A) interface is used to transmit the packet; the fourth bit position (bit 3) may indicate that a 3GPP fifth generation (5G) or New Radio (NR) interface is used to transmit the packet; the fifth bit position (bit 4) may indicate that a Bluetooth or Bluetooth Low Energy (BLE) interface is used to transmit the packet; the sixth bit position (bit 5) may indicate that an interface based on the IEEE 802.15.4 protocol for the operation of low-rate wireless personal area networks (LR-WPANs) is used to transmit the packet; the seventh bit position (bit 6) may indicate that a Z-Wave interface is used to transmit the packet; and the eighth bit position (bit 7) may indicate that a WiMAX (IEEE 802.16) interface is used to transmit the packet.

Other interfaces may be indicated using the network interface bitmap, and/or other bit arrangements may be used in other embodiments. In a first example, rather than including the attestation in byte 3 of octet 0 as shown by MHO 600B of FIG. 6, the attestation value may be located in one or more bytes of the next octet(s) (labeled "Options and Padding" and/or "Optional: more Options and Padding"), and byte 3 of octet 0 may be used to indicate network interface information of all available interfaces of the node. In this example, byte 2 of octet 0 may indicate network interface information of interfaces to be used for transmitting/forwarding a packet. In a second example, a 4-bit bitmap may be used to convey networking interface information, as shown by table 2.

TABLE 2

| Bit Position | Network Technology/Interface |
| --- | --- |
| 0 | DSRC/WAVE (IEEE 802.11p) |
| 1 | WiFi (IEEE 802.11n, ad/y, etc.) |
| 2 | 3GPP LTE |
| 3 | 3GPP 5G/New Radio (NR) |

In the example of table 2, the first bit position (bit 0) may indicate that a DSRC (IEEE 802.11p) or WAVE (IEEE 1609.4) interface is used to transmit the packet; the second bit position (bit 1) may indicate that a WiFi (e.g., any version of 802.11) interface is used to transmit the packet; the third bit position (bit 2) may indicate that an LTE/LTE-A interface is used to transmit the packet; the fourth bit position (bit 3) may indicate that a 5G/NR interface is used to transmit the packet. In this example, the four least significant bits (LSBs) of the network interface information field of the MHO 600B can be used to indicate the interface(s) that are to be used to transmit the packet, and the four most significant bits (MSBs) of the network interface information field of the MHO 600B can be used to indicate one or more other available interfaces of the node. Moreover, although the examples of tables 1 and 2 use wireless protocols/radio access technologies, the embodiments herein are also applicable to wired communication protocols/access technologies, such as Ethernet, Universal Serial Bus (USB), Copper Distributed Data Interface (CDDI), Fiber Distributed Data Interface (FDDI), Digital Subscriber Line (DSL), G.hn, Integrated Services Digital Network (ISDN), and the like. Illustrative examples of how the network interface bitmap is utilized is further described with regard to FIGS. 7A-7B.

FIG. 7A illustrates a first network provenance example according to various embodiments. FIG. 7A shows various protocol stacks that may be implemented by the nodes shown and described with regard to FIG. 5. The example of FIG. 7A may represent a data packet path when the network 500 of FIG. 5 comprises an IoT network or WSN as discussed previously. In particular, this example includes protocol stack 704 that is implemented in an IoT device 504, a protocol stack 706 that is implemented in the AP 506, and a protocol stack 730 that is implemented in the application server 530 of FIG. 5.

The protocol stacks 704, 706, and 730 include an application, presentation, session, and transport layers that are above an Internet Protocol (IP) and/or network layer in accordance with the OSI model. In this example, each protocol stack 704, 706, and 730 includes an MIT layer that is located below the IP/network layer and above the MAC layer of various communication protocols. In some embodiments, the MIT layer may be located above a logical link control (LLC) layer that is above the MAC layer(s) (not shown by FIG. 7A), and in other embodiments, the MIT layer may be located between the LLC layer and the MAC layer(s). In alternative embodiments, the MIT layer may be incorporated into the LLC layer (e.g., the MIT layer may be a sublayer of the LLC layer).

In this example, the protocol stack 704 of the IoT device 504 implements the 6LoWPAN, ZigBee, Subnetwork Access Protocol (SNAP), or Thread protocol, each of which comprises, inter alia, physical (PHY) and media access control (MAC) layers that are based on the IEEE 802.15.4 protocol for the operation of LR-WPANs. The MAC layer manages access to physical channels and network beaconing, and the PHY layer provides an interface to the physical channels, modulation and encoding of data for transmission, and demodulation and decoding of signals into data to be provided to upper layers. In this example (and with reference to FIG. 5), the IoT device 504 operates the protocol stack 704 to generate and send a data packet 710a comprising a payload portion (including "data" in FIG. 7A) and a header portion to include provenance information. In particular, the IoT device 504 operates the MIT of protocol stack 704 to encapsulate the packet 710a with provenance information comprising attestation 711A ("1" in FIG. 7A) and interface information 713A. In embodiments, the MIT may generate the attestation 711A according to any suitable attestation/provenance scheme, such as those discussed herein, and may insert the attestation 711A into the attestation field of MHO 600B as discussed previously. Additionally, the interface information 713A may be inserted into the network interface information field of the MHO 600B as discussed previously. In this example, the interface information 713A includes a value X. Continuing with the example network interface bitmap of table 1, the value X in this example is equal to the binary number "00100000" to indicate that an IEEE 802.15.4 interface was used to transmit the packet 710a.

Next, the packet 710a is received by the AP 506 that operates the protocol stack 706. The packet 710a traverses the IEEE 802.15.4 PHY and MAC layers of the protocol stack 706 and is obtained by the MIT layer of the protocol stack 706. The MIT layer of the protocol stack 706 determines the appropriate interface(s) over which to forward the packet 710a, and encapsulates the packet 710a with provenance information of the AP 506 to obtain an updated version of the packet 710a, which is packet 710b. In this example, the MIT layer of protocol stack 706 determines that a WiFi interface is supposed to be used to forward the packet 710a-b to the destination device, application server 530. In some embodiments, the packet 710a-b itself may indicate the particular interface to be used to forward the packet to the destination device, while in other embodiments, the MIT layer may determine or select an appropriate interface to use for forwarding the packet.

As shown by FIG. 7A, the packet 710b includes the provenance information of the source node (attestation 711A and interface information 713A) as well as the provenance information of the intermediary node, AP 506. The provenance information of the AP 506 comprises an attestation 711B ("A2" in FIG. 7A) and interface information 713B. In embodiments, the MIT of protocol stack 706 generates the attestation 711B based on the attestation 711A and/or according to the attestation/provenance scheme used by the source node IoT device 504, and inserts the attestation 711B into the attestation field of MHO 600B as discussed previously. Additionally, the interface information 713B is inserted into the network interface information field of the MHO 600B as discussed previously. In this example, the interface information 713B includes a value Y. Continuing with the example network interface bitmap of table 1, the value Y in this example is equal to the binary number "00000010" to indicate that a WiFi interface was used to transmit the packet 710b.

The packet 710b is then received by the destination device, application server 530, using a corresponding WiFi interface. The packet 710b traverses the protocol stack 730 and is obtained by the application layer of the protocol stack 730. When the application server 530 receives the packet 710b packet from the AP 506, the MIT layer of protocol stack 730 attests the packet with the attestation of the final destination node (i.e., the application server 530) only and saves this attestation in local or remote memory/storage to be used for diagnostic or network planning by a diagnostic application or trust framework.

FIG. 7B illustrates a second network provenance example according to various embodiments. FIG. 7B shows various protocol stacks that may be implemented by the nodes shown and described with regard to FIG. 5. The example of FIG. 7B may represent a data packet path when the network 500 of FIG. 5 comprises a V2V network as discussed previously. In particular, this example includes protocol stack 705 that is implemented by the vUE 505, a protocol stack 715 that is implemented by the RSU 515, a protocol stack 715 that is implemented by a base station 520, and a protocol stack 730 that is implemented in the application server 530 of FIG. 5.

The protocol stacks 705, 715, 706, 720, and 730 include an application, presentation, session, and transport layers that are above an Internet Protocol (IP) and/or network layer, which is above an LLC layer in accordance with the OSI model. In this example, each protocol stack 705, 715, 706, 720, and 730 includes an MIT layer that is located below the IP/network layer and above the LLC layer. In such embodiments where 3GPP-based interfaces are involved, the MIT layer may be below the radio resource control (RRC) layer and above 5G L2 protocol stack (e.g., above the SDAP layer in 5G systems or above the PDCP layer in LTE systems). In other embodiments, the MIT layer may be located below the LLC layer and above the MAC layer(s). In alternative embodiments, the MIT layer may be incorporated into the LLC layer (e.g., the MIT layer may be a sublayer of the LLC layer). In these alternative embodiments where 3GPP-based interfaces are used, the MIT may be located below one of the service data adaptation protocol (SDAP) layer (e.g., for a 5G interface), the packet data convergence protocol (PDCP) layer (e.g., for 5G or LTE interfaces), or the radio link control (RLC) layer (e.g., for 5G or LTE interfaces), or the MIT may be incorporated into one of the SDAP, PDCP, or RLC layers.

In this example, the protocol stack 705 of the vUE 505 implements the DSRC protocol comprising, inter alia, a DSRC/WAVE PHY and MAC layers that are based on the IEEE 802.11p protocol. The DSRC/WAVE PHY layer is responsible for obtaining data for transmitting over the V2X network 500 from higher layers, as well as receiving raw data over the V2X network 500 and providing data to upper layers. The MAC layer organizes the data packets into network frames. The MAC layer may be split into a lower DSRC/WAVE MAC layer based on IEEE 802.11p and an upper WAVE MAC layer (or a WAVE multi-channel layer) based on IEEE 1609.4. IEEE 1609 builds on IEEE 802.11p and defines one or more of the other higher layers. The LLC layer (e.g., IEEE 802.2) allows multiple network L3 protocols to communicate over the same physical link by allowing the L3 protocols to be specified in LLC fields In this example (and with reference to FIG. 5), the vUE 505 operates the protocol stack 705 to generate and send a packet 710c comprising a payload portion (including "data" in FIG. 7B) and a header portion to include provenance information. In particular, the vUE 505 operates the MIT of protocol stack 705 to encapsulate the packet 710c with provenance information comprising attestation 711C ("A3" in FIG. 7B) and interface information 713C. In embodiments, the MIT may generate the attestation 711C according to any suitable attestation/provenance scheme, such as those discussed herein, and may insert the attestation 711C into the attestation field of MHO 600B as discussed previously. Additionally, the interface information 713C may be inserted into the network interface information field of the MHO 600B as discussed previously. In this example, the interface information 713C includes a value D. Continuing with the example network interface bitmap of table 1, the value D in this example is equal to the binary number "00000001" to indicate that a DSRC/WAVE (IEEE 802.11p) interface is to be used to transmit the packet 710c.

Next, the packet 710c is received by a DSRC/WAVE interface of the RSU 515, which operates the protocol stack 715. The packet 710c traverses the DSRC/WAVE PHY layer, DSRC/WAVE MAC layer, and the LLC layer of the protocol stack 715 and is obtained by the MIT layer of the protocol stack 715. The MIT layer of the protocol stack 715 determines the appropriate interface(s) over which to forward the packet 710c, and encapsulates the packet 710c with provenance information of the RSU 515 to obtain an updated version of the packet 710c, which is packet 710d1 and packet 710d2. In this example, the MIT layer of protocol stack 715 determines that the packet 710c-d1-d2 is supposed to be forwarded to two different nodes using corresponding interfaces, i.e., using a 5G interface to forward the packet to the base station 520 and using the WiFi interface to forward the packet to the AP 506. In some embodiments, the packet 710c-d1-d2 itself may indicate the particular interface(s) to be used to forward the packet to or towards the destination device, while in other embodiments, the MIT layer may determine or select the appropriate interface(s) to use for forwarding the packet.

Additionally, in the example of FIG. 7B the MIT of protocol stack 715 generates one attestation 711D and two different network information values, attestation 711D1 and attestation 711D2, to be included in the packets 710d1 and 710d2. As shown by FIG. 7B, the packet 710d1 and packet 710d2 includes the provenance information of the source node (attestation 711C and interface information 713C) as well as the provenance information of the intermediary node, RUS 515. The provenance information of the RSU 515 comprises an attestation 711D ("A4" in FIG. 7B) and interface information 713D1 and 713D2. In embodiments, the MIT of protocol stack 715 generates the attestation 711D based on the attestation 711C and/or according to the attestation/provenance scheme used by the source node vUE 505, and inserts the attestation 711D into the attestation field of MHO 600B of each packet 710d1 and 710d2. Additionally, the interface information 713D1 is inserted into the network interface information field of the MHO 600B of packet 710*d*1, and the interface information 713D2 is inserted into the network interface information field of the MHO 600B of packet 710*d*2. In this example, the interface information 713D1 includes a value $I_1$ and the interface information 713D2 includes a value $I_2$. Continuing with the example network interface bitmap of table 1, the value $I_1$ in this example is equal to the binary number "00001000" to indicate that the 5G interface is to be used to transmit the packet 710*d*1 to the base station 520. Additionally, the value $I_2$ in this example is equal to the binary number "00000010" to indicate that the WiFi interface is to be used to transmit the packet 710*d*1 to the AP 506.

In the example of FIG. 7B, the MIT of protocol stack 715 provides the packet 710*d*1 to the 5G L2 stack (e.g., SDAP, PDCP, RLC, and MAC layers), which is then provided to the 5G PHY layer for transmission to the base station 520. The operation of the SDAP, PDCP, RLC, and MAC layers of the 5G L2 protocol stack are known to persons having ordinary skill in the art and are not described herein for the sake of brevity. The packet 710*d*1 may be transmitted over an air interface, such as where an integrated access and backhaul (IAB) architecture is used, or via a wired connection, such as using an Xn interface between two RAN nodes in 5G systems or using an F1 interface a gNB distributed unit and gNB centralized unit, or the like) depending on the network topology/deployment. Additionally, the MIT of protocol stack 715 provides the packet 710*d*2 to the WiFi L2 stack (e.g., LLC and MAC layers), which is then provided to the WiFi PHY layer for transmission to the AP 506 over the air or via a wired connection depending on the network deployment/topology.

The packet 710*d*2 is received by a WiFi interface of the AP 706, which operates the protocol stack 706. The MIT layer of the protocol stack 706 may operate in a same or similar manner as discussed previously with regard to FIG. 7A to generate and send the packet 710*e*2 to the destination device, application server 530. In this example, the packet 710*e*2 includes provenance information including the attestation 711E and network interface information 713E2. The attestation 711E may be based on the attestations 711D and 711C and/or based on the particular provenance/attestation scheme configured to the MIT of protocol stack 706. The network interface information 713E2 includes the value K, where the value K in this example is equal to the binary number "00000010" to indicate that the WiFi interface is to be used to transmit the packet 710*e*2 to the application server 530.

The packet 710*d*1 is received by a 5G interface of the base station 520, which operates the protocol stack 720. The packet 710*d*1 traverses the 5G L1/PHY and 5G L2 of the protocol stack 720 and is obtained by the MIT layer of the protocol stack 720. The MIT layer of the protocol stack 720 determines the appropriate interface(s) over which to forward the packet 710*d*1, and encapsulates the packet 710*d*1 with provenance information of the base station 520 to obtain an updated version of the packet 710*d*1, which is packet 710*e*1. In this example, the MIT layer of protocol stack 720 determines that the packet 710*c*-*d*1-*e*1 is supposed to be forwarded to the destination device (the application server 530) using the 5G interface. In this example, the appropriate 5G interface may be, for example, an NG control plane interface between a RAN node and Access and Mobility Management Function (AMF) for control plane traffic, an NG control plane interface between a RAN node and user plane function (UPF) for user plane traffic, an Xn interface between two RAN nodes in 5G systems, an F1 interface a gNB distributed unit and gNB centralized unit, or the like. In some embodiments, the packet 710*c*-*d*1-*e*1 itself may indicate the particular interface(s) to be used to forward the packet to or towards the destination device, while in other embodiments, the MIT layer may determine or select the appropriate interface(s) to use for forwarding the packet. In this example, the packet 710*e*1 includes provenance information including the attestation 711E as discussed previously and network interface information 713E1. The network interface information 713E1 includes the value J, where the value J in this example is equal to the binary number "00000000" to indicate that the 5G interface is to be used to transmit the packet 710*e*1 to the application server 530.

The packets 710*e*1 and 710*e*2 are received by the destination device (the application server 530) using a 5G interface and a WiFi interface, respectively. Each of the packets 710*e*1 and 710*e*2 traverse the protocol stack 730 and are obtained by the application layer of the protocol stack 730. When the application server 530 receives the packets 710*e*1 and 710*e*2 from the AP 506 and the base station 520, the MIT layer of protocol stack 730 attests the packet with the attestation of the final destination node (i.e., the application server 530) only and saves this attestation in local or remote memory/storage to be used for diagnostic or network planning by a diagnostic application or trust framework.

The embodiments herein are not limited to the second example shown by FIG. 7B. In alternative embodiments, rather than generating two packets 710*d*1 and 710*d*2, the RSU 515 may generate a single packet 710*d* with a single network interface information 713D value. In these embodiments, the network interface information 713D value may be the binary number "00001010" to indicate that the 5G and WiFi interfaces are to be used to transmit the packet 710*d* to the base station 520 and AP 506, respectively. The MIT of protocol stack 715 may provide the same packet 710*d* to respective L2 protocol stacks of the stack 715 for transmission over respective interfaces.

In another variation, which may be combined with the second example of FIG. 7, each node in the network may be configured with individual bitmap tables/data structures. This variation may be useful where different interfaces may use different message formats or different encapsulation protocols. For example, the RSU 515 may have a first network interface bitmap configuration according to table 1 discussed previously, and the base station 520 may have a second network interface bitmap configuration. The second network interface bitmap configuration may include 5G-specific values where bit positions in the bitmap correspond to different 5G interfaces for sending packets to different RAN elements and/or 5G core network elements (e.g., specific 5G Network Functions and/or network slices).

Figure 8:
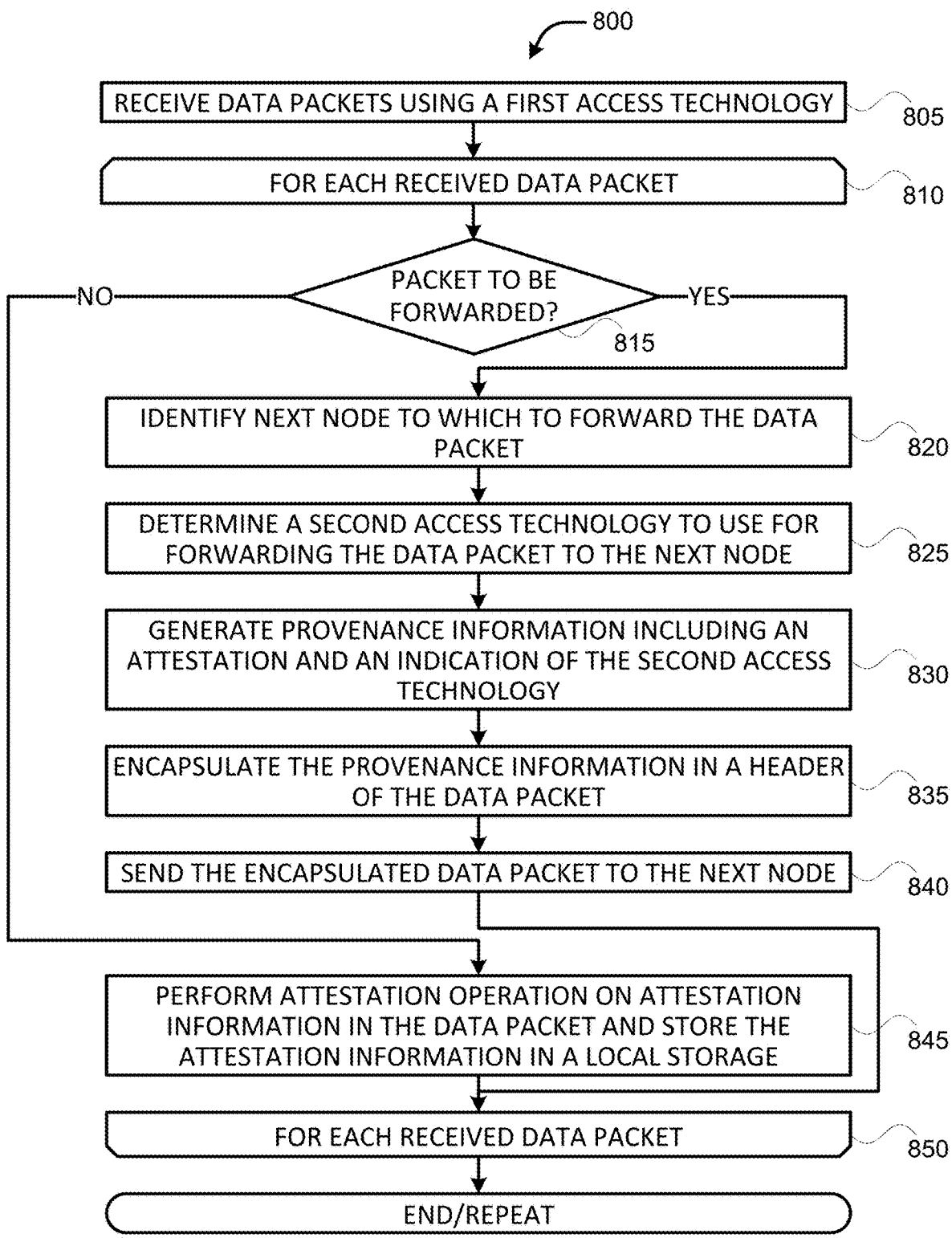
FIG. 8 illustrates an example procedure for practicing aspects of the network provenance embodiments as discussed herein.

FIG. 8 illustrates a process 800 for practicing the network provenance technology of the present disclosure. The process 800 may be practiced by the network nodes shown and/or described with respect to FIGS. 5, 6, 7A, and 7B, the cloud and/or internet of things (IoT) networks shown and described with respect to FIGS. 1-4, and/or the computing devices/systems of FIGS. 9-11 discussed infra. Some operations of process 800 may include communications between one or more components within a device, or between various remote devices, and it should be understood that such communications may be facilitated by the various circuitry as described with regard to FIGS. 1-4 and 9-11 using the various messages, protocols, and protocol (sub)layers discussed with regard to FIGS. 6, 7A, and 7B. In particular, the following discussion of process 800 is described as being performed by a processing device and communication circuitry of a network node, but it should be understood that the processing device may refer to application processor circuitry, baseband or modem circuitry, a controller or FPGA of a network interface circuitry, or some other processing device, and the communication circuitry may refer to the network interface circuitry, radio front end modules, radio control circuitry, or some other suitable device/components to transmit and receive signals over an air interface or over a wired connection. Moreover, while particular examples and orders of operations are illustrated FIG. 8, the depicted orders of operations should not be construed to limit the scope of the embodiments in any way. Rather, the depicted operations may be re-ordered, broken into additional operations, combined, and/or omitted altogether while remaining within the spirit and scope of the present disclosure.

Process 800 begins at operation 805 where communication circuitry of a network node receives data packets using a first access technology. At beginning loop operation 810, the processing device of the network node processes each received data packet in turn. At operation 815, the processing device of the network node determines whether the data packet is to be forwarded to a next node in a data path. In embodiments, the processing device may inspect or otherwise identify a destination address in a header portion of the data packet, and may declare that the packet is not to be forwarded to another node if the destination address in the header portion is a destination address of the network node (e.g., the network node is the destination device). If at operation 815 the processing device of the network node determines that the network node is the destination device, the processing device of the network node proceeds to operation 845 to perform an attestation operation using attestation information included in the data packet, and this information is stored in a local memory of the network node.

If at operation 815 the processing device of the network node determines that the network node is to forward the data packet to a next node, the processing device of the network node proceeds to operation 820 to identify the next node. At operation 825, the processing device determines a second access technology to use to forward the data packet to the next node.

When the network node is a wireless communication device, such as a UE 504, 505, the processing device may control the communication circuitry to perform an attachment procedure with a suitable access network of the second access technology. In these embodiments, the processing device may identify the second access technology based on information in a header portion of the data packet, or using a configuration that indicates a priority or ranking or access technologies implemented by the network node. In other embodiments, the processing device may perform a cell search procedure, an energy detection or LBT operation, or the like, and may utilize an access technology of a first available channel as the second access technology.

When the network node is a network element with or without RF communication capabilities, the network node may use a locally stored routing table (e.g., routing information base (RIB)) and/or a forwarding table (e.g., forwarding information base (FIB). In one example, the network node may store an RIB and an FIB, where the RIB includes entries from the FIB that are relevant to the network node when the network node is to act as a handling node. The FIB may store information that indicates the second access technology to use to forward the data packet, and how the network node is to process the data packet according to the second access technology. The RIB and FIB may be built using any suitable hashing scheme, such as cuckoo hash function, a jHash function, etc. The RIB may comprise a mapping of packet or flow IDs to node IDs and/or a mapping of packet/flow IDs to output ports/interfaces. Upon receipt of a data packet, the processing device may extract or otherwise identify a packet/flow ID (e.g., a media access code (MAC) address of a target node, an IP address of the target node, a 5-tuple flow identifier, an IMSI or MSISDN, etc.) in the packet, and perform a lookup operation on the locally stored RIB to identify an entry in the FIB for processing the packet according to the second access technology. The processing device may obtain a node ID of the next node, identify a second access network to be used to forward the packet, and any necessary information for processing the packet based on a result of the lookup operation. The processing device may then process the packet according to the second access technology, including performance of operations 830 and 835 discussed infra. After the processing device processes the packet, the communication circuitry of the network node may provide the data packet to the next node at operation 840 using an interface of the second access technology.

At operation 830, the processing device of the network node generates provenance information including an attestation and an indication of the second access technology. In embodiments, the attestation may be generated according to any of the aforementioned attestation or provenance schemes discussed previously or some other suitable attestation/provenance scheme. In addition, the interface/access technology indication may be a bitmap where a bit position in the bitmap corresponds to the second access technology. The processing device may generate the interface/access technology indication by setting the second access technology bit at the bit position in the bitmap. The processing device may then insert or encapsulate the data packet to include the attestation and the interface/access technology indication at operation 835. At operation 840, the communication circuitry of the network node sends the data packet to the next node using or otherwise in accordance with the second access technology.

After performance of operation 840 or operation 845, the processing device may proceed to closing loop operation 850 to process a next data packet according to operations 815-845, if any. When there are no remaining data packets left to process, process 800 may end or repeat as necessary.

III. Example Implementations

Figure 9:
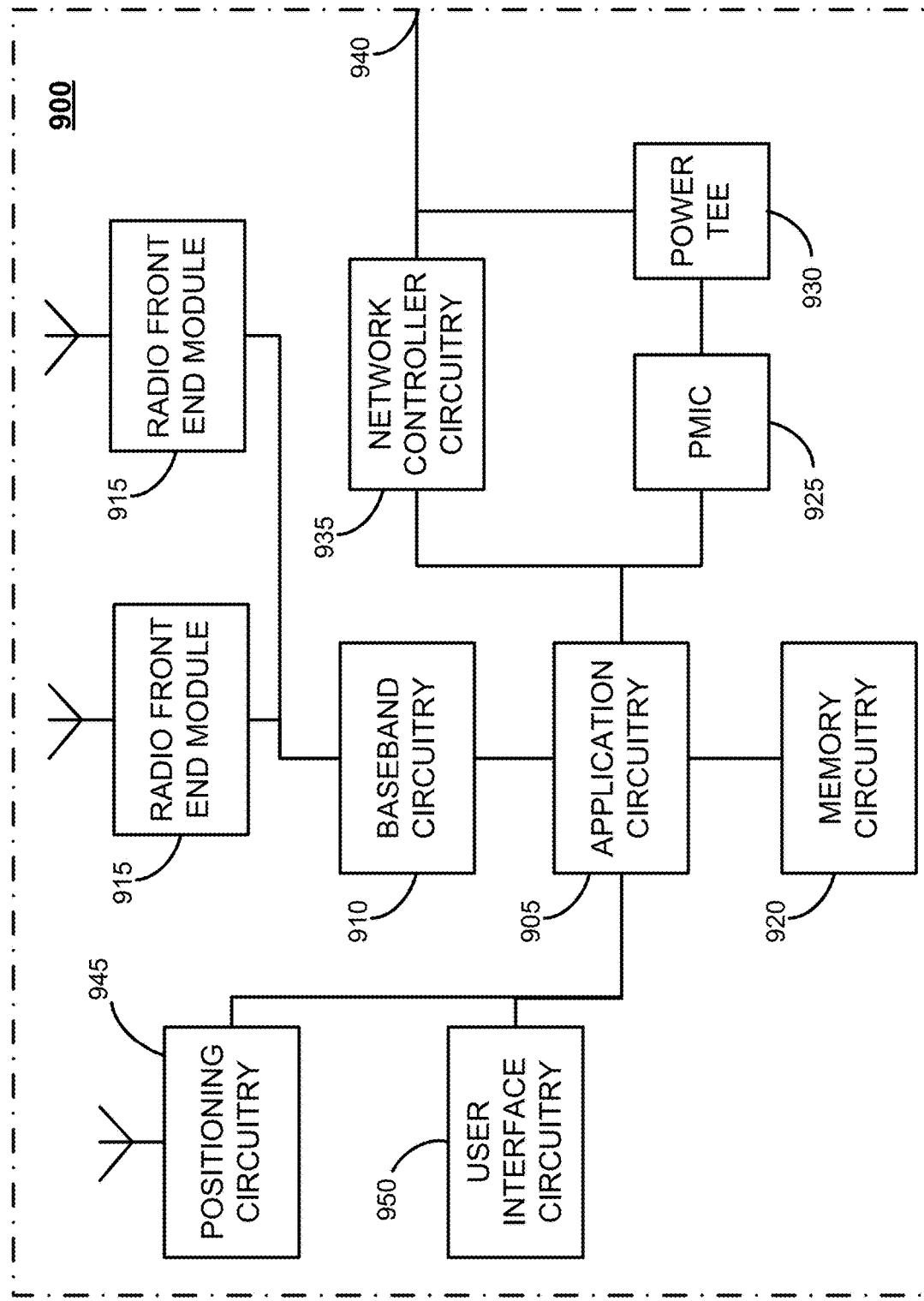
FIG. 9 illustrates an example of infrastructure equipment in accordance with various embodiments.

FIG. 9 illustrates an example of infrastructure equipment 900 in accordance with various embodiments. The infrastructure equipment 900 (or "system 900") may be implemented as GWs 220, 310; access nodes (ANs) 506, 515, and 520; one or more servers, routers, switches, hubs, etc. in network 525 or cloud 302, server 304, and/or application server 530, as shown and described previously, and include components corresponding to and/or implementing various components and methods described previously with regard to FIGS. 1-8. The system 900 may also be implemented as a cellular Radio Access Network (RAN) node, a Wi-Fi access point (e.g., a router, switch, hub, etc.), and/or any other element/device discussed herein. The system 900 may include one or more of application circuitry 905, baseband circuitry 910, one or more radio front end modules 915, memory circuitry 920, power management integrated circuitry (PMIC) 925, power tee circuitry 930, network controller 935, network interface connector 940, satellite positioning circuitry 945, and user interface 950. In some embodiments, the equipment 900 may include additional elements such as, for example, memory/storage, display, camera, sensor, or input/output (I/O) interface.

As used herein, the term "circuitry" may refer to, is part of, or includes hardware components such as an electronic circuit, a logic circuit, a processor (shared, dedicated, or group) and/or memory (shared, dedicated, or group), an Application Specific Integrated Circuit (ASIC), a field-programmable device (FPD), (e.g., a field-programmable gate array (FPGA), a programmable logic device (PLD), a complex PLD (CPLD), a high-capacity PLD (HCPLD), a structured ASIC, or a programmable System on Chip (SoC)), digital signal processors (DSPs), etc., that are configured to provide the described functionality. In some embodiments, the circuitry may execute one or more software or firmware programs to provide at least some of the described functionality. In addition, the term "circuitry" may also refer to a combination of one or more hardware elements (or a combination of circuits used in an electrical or electronic system) with the program code used to carry out the functionality of that program code. In these embodiments, the combination of hardware elements and program code may be referred to as a particular type of circuitry. The terms "application circuitry" and/or "baseband circuitry" may be considered synonymous to, and may be referred to as "processor circuitry." As used herein, the term "processor circuitry" may refer to, is part of, or includes circuitry capable of sequentially and automatically carrying out a sequence of arithmetic or logical operations; recording, storing, and/or transferring digital data. The term "processor circuitry" may refer to one or more application processors, one or more baseband processors, a physical central processing unit (CPU), a single-core processor, a dual-core processor, a triple-core processor, a quad-core processor, and/or any other device capable of executing or otherwise operating computer-executable instructions, such as program code, software modules, and/or functional processes.

Application circuitry 905 may include one or more CPU cores and one or more of cache memory, low drop-out voltage regulators (LDOs), interrupt controllers, serial interfaces such as SPI, I²C or universal programmable serial interface module, real time clock (RTC), timer-counters including interval and watchdog timers, general purpose input/output (I/O or JO), memory card controllers such as Secure Digital (SD/)MultiMediaCard (MMC) or similar, Universal Serial Bus (USB) interfaces, Mobile Industry Processor Interface (MIPI) interfaces and Joint Test Access Group (JTAG) test access ports. As examples, the application circuitry 905 may include one or more Intel Pentium®, Core®, or Xeon® processor(s); Advanced Micro Devices (AMD) Ryzen® processor(s), Accelerated Processing Units (APUs), or Epyc® processors; and/or the like. In some embodiments, the system 900 may not utilize application circuitry 905, and instead may include a special-purpose processor/controller to operate according to the various embodiments herein. The processors of application circuitry 905 may be implemented as one or more integrated circuits, such as a System on Chip (SoC), System-in-Package (SiP), a multi-chip package (MCP), and/or the like.

The memory circuitry 920 includes one or more of volatile memory including dynamic random access memory (DRAM) and/or synchronous dynamic random access memory (SDRAM), and nonvolatile memory (NVM) including high-speed electrically erasable memory (commonly referred to as Flash memory), phase change random access memory (PRAM), resistive memory such as magnetoresistive random access memory (MRAM), etc., and may incorporate the three-dimensional (3D) cross-point (XPOINT) memories from Intel® and Micron®. Memory circuitry 920 may be implemented as one or more of solder down packaged integrated circuits, socketed memory modules and plug-in memory cards. The memory circuitry 920 may also comprise persistent storage devices, which may be temporal and/or persistent storage of any type, including, but not limited to, non-volatile memory, optical, magnetic, and/or solid state mass storage, and so forth. In embodiments, the memory circuitry 920 may be disposed in or on a same die or package as the application circuitry 905 (e.g., a same SoC, a same SiP, or soldered on a same MCP as the application circuitry 905).

The memory circuitry 920 may be employed to store a working copy and a permanent copy of the programming instructions, such as drivers, for the operation of various components of system 900, an operating system of system 900, and/or one or more applications, collectively referred to as "computational logic" or "modules". The various elements may be implemented by assembler instructions supported by one or more processor(s) or high-level languages that may be compiled into such instructions. The permanent copy of the programming instructions may be placed into persistent storage devices in the factory or in the field through, for example, a distribution medium (not shown), through a communication interface (e.g., from a distribution server (not shown)), or over-the-air (OTA). In embodiments, the memory circuitry 920 stores program code, computational logic, one or more modules, etc. to carry out embodiments discussed herein (such as one or more operations of FIG. 8 or 11). In embodiments where processor circuitry 905 includes (e.g., FPGA based) hardware accelerators as well as processor cores, the hardware accelerators (e.g., the FPGA cells) may be pre-configured (e.g., with appropriate bit streams) with the aforementioned computational logic to perform some or all of the functions discussed previously (in lieu of employment of programming instructions to be executed by the processor core(s)).

Additionally or alternatively, at least one processor of the application circuitry 905 and/or the baseband circuitry 910 may be packaged together with a storage medium having all or portions of memory circuitry 920 configured to facilitate aspects of embodiments described herein, such as the program code/modules/computational logic discussed previously. In these implementations, application circuitry 905 may include circuitry such as, but not limited to, one or more a FPDs such as FPGAs, etc.; PLDs such as CPLDs, HCPLDs, etc.; ASICs such as structured ASICs and the like; PSoCs; and the like. The circuitry of application circuitry 905 comprises logic blocks or logic fabric including and other interconnected resources that may be programmed to perform various functions, such as the procedures, methods, functions, etc. of the various embodiments discussed herein, such as the program code/modules/computational logic discussed previously. The circuitry of application circuitry 905 may include memory cells (e.g., EPROM, EEPROM, flash memory, static memory (e.g., SRAM, anti-fuses, etc.) used to store logic blocks, logic fabric, data, etc. in lookup-tables (LUTs) and the like.

The baseband circuitry 910 may be implemented, for example, as a solder-down substrate including one or more integrated circuits, a single packaged integrated circuit soldered to a main circuit board or a multi-chip module containing two or more integrated circuits. Although not shown, baseband circuitry 910 may comprise one or more digital baseband systems, which may be coupled via an interconnect subsystem to a CPU subsystem, an audio subsystem, and an interface subsystem. The digital baseband subsystems may also be coupled to a digital baseband interface and a mixed-signal baseband sub-system via another interconnect subsystem. Each of the interconnect subsystems may include a bus system, point-to-point connections, network-on-chip (NOC) structures, and/or some other suitable bus or interconnect technology, such as those discussed herein. The audio sub-system may include digital signal processing circuitry, buffer memory, program memory, speech processing accelerator circuitry, data converter circuitry such as analog-to-digital and digital-to-analog converter circuitry, analog circuitry including one or more of amplifiers and filters, and/or other like components. In an aspect of the present disclosure, baseband circuitry 910 may include protocol processing circuitry with one or more instances of control circuitry (not shown) to provide control functions for the digital baseband circuitry and/or radio frequency circuitry (e.g., the radio front end modules 915). As used herein, the terms "instantiate", "instantiation", and the like may refer to the creation of an instance, and an "instance" may refer to a concrete occurrence of an object, which may occur, for example, during execution of program code.

The radio front end modules (RFEMs) 915 may comprise a millimeter wave RFEM and one or more sub-millimeter wave radio frequency integrated circuits (RFICs). In some implementations, the one or more sub-millimeter wave RFICs may be physically separated from the millimeter wave RFEM. The RFICs may include connections to one or more antennas or antenna arrays, and the RFEM may be connected to multiple antennas. In alternative implementations, both millimeter wave and sub-millimeter wave radio functions may be implemented in the same physical radio front end module 715. The RFEMs 915 may incorporate both millimeter wave antennas and sub-millimeter wave antennas. The RFEMs 915 may additionally or alternatively include other radio devices, such as infrared transceivers, short-range radio transceivers (e.g., Bluetooth, etc.), and so forth). The RFEMs 915 may include communication chips (not shown) that may be configured to operate in accordance with a Global System for Mobile Communication (GSM), General Packet Radio Service (GPRS), Universal Mobile Telecommunications System (UMTS), High Speed Packet Access (HSPA), Evolved HSPA (E-HSPA), or Long-Term Evolution (LTE) network. The communication chips may also be configured to operate in accordance with Enhanced Data for GSM Evolution (EDGE), GSM EDGE Radio Access Network (GERAN), Universal Terrestrial Radio Access Network (UTRAN), or Evolved UTRAN (E-UTRAN), Code Division Multiple Access (CDMA), Time Division Multiple Access (TDMA), Digital Enhanced Cordless Telecommunications (DECT), Evolution-Data Optimized (EV-DO), IEEE 802.16 based protocols such as Wireless Metropolitan Area Networks (WirelessMAN) and Worldwide Interoperability for Microwave Access (WiMAX), derivatives thereof, as well as any other wireless protocols that are designated as 3G, 4G, 5G, and beyond. The RFEMs 915 may operate in accordance with other wireless protocols in other embodiments, such as IEEE 802.11p and IEEE 1609 protocols such as Wireless Access In Vehicular Environments (WAVE) or Dedicated Short-range Communications (DSRC), a short-range personal area network such as Bluetooth/BLE, 6LoWPAN, ZigBee, Z-Wave, and/or any other PANs such as those discussed herein.

The PMIC 725 may include voltage regulators, surge protectors, power alarm detection circuitry, and one or more backup power sources such as a battery or capacitor. The power alarm detection circuitry may detect one or more of brown out (under-voltage) and surge (over-voltage) conditions. The power tee circuitry 730 may provide for electrical power drawn from a network cable to provide both power supply and data connectivity to the infrastructure equipment 900 using a single cable.

The network controller circuitry 935 may provide connectivity to a network using a standard network interface protocol such as Ethernet, Ethernet over GRE Tunnels, Ethernet over Multiprotocol Label Switching (MPLS), or some other suitable protocol. Network connectivity may be provided to/from the infrastructure equipment 900 via network interface connector 940 using a physical connection, which may be electrical (e.g., a "copper interconnect"), optical, or wireless. The physical connection also includes suitable input connectors (e.g., ports, receptacles, sockets, etc.) and output connectors (e.g., plugs, pins, etc.). The network controller circuitry 935 may include one or more dedicated processors and/or FPGAs to communicate using one or more of the aforementioned protocols. In some implementations, the network controller circuitry 935 may include multiple controllers to provide connectivity to other networks using the same or different protocols.

User interface circuitry 950 may include one or more user interfaces designed to enable user interaction with the system 900 or peripheral component interfaces designed to enable peripheral component interaction with the system 900. User interfaces may include, but are not limited to one or more physical or virtual buttons (e.g., a reset button), one or more indicators (e.g., light emitting diodes (LEDs)), a physical keyboard or keypad, a mouse, a touchpad, a touchscreen, speakers or other audio emitting devices, microphones, a printer, a scanner, a headset, a display screen or display device, etc. Peripheral component interfaces may include, but are not limited to, a non-volatile memory port, a universal serial bus (USB) port, an audio jack, a power supply interface, etc.

The positioning circuitry 945, which may include circuitry to receive and decode signals transmitted by one or more navigation satellite constellations of a global navigation satellite system (GNSS). Examples of navigation satellite constellations (or GNSS) may include United States' Global Positioning System (GPS), Russia's Global Navigation System (GLONASS), the European Union's Galileo system, China's BeiDou Navigation Satellite System, a regional navigation system or GNSS augmentation system (e.g., Navigation with Indian Constellation (NAVIC), Japan's Quasi-Zenith Satellite System (QZSS), France's Doppler Orbitography and Radio-positioning Integrated by Satellite (DORIS), etc.), or the like. The positioning circuitry 945 may comprise various hardware elements (e.g., including hardware devices such as switches, filters, amplifiers, antenna elements, and the like to facilitate the communications over-the-air (OTA) communications) to communicate with components of a positioning network, such as navigation satellite constellation nodes. Nodes or satellites of the navigation satellite constellation(s) ("GNSS nodes") may provide positioning services by continuously transmitting or broadcasting GNSS signals along a line of sight, which may be used by GNSS receivers (e.g., positioning circuitry 945) to determine their GNSS position. The GNSS signals may include a pseudorandom code (e.g., a sequence of ones and zeros) that is known to the GNSS receiver and a message that includes a time of transmission (ToT) of a code epoch (e.g., a defined point in the pseudorandom code sequence) and the GNSS node position at the ToT. The GNSS receivers may monitor/measure the GNSS signals transmitted/broadcasted by a plurality of GNSS nodes (e.g., four or more satellites) and solve various equations to determine a corresponding GNSS position (e.g., a spatial coordinate). The GNSS receivers also implement clocks that are typically less stable and less precise than the atomic clocks of the GNSS nodes, and the GNSS receivers may use the measured GNSS signals to determine the GNSS receivers' deviation from true time (e.g., an offset of the GNSS receiver clock relative to the GNSS node time). In some embodiments, the positioning circuitry 945 may include a Micro-Technology for Positioning, Navigation, and Timing (Micro-PNT) IC that uses a master timing clock to perform position tracking/estimation without GNSS assistance. The GNSS receivers may measure the time of arrivals (ToAs) of the GNSS signals from the plurality of GNSS nodes according to its own clock. The GNSS receivers may determine ToF values for each received GNSS signal from the ToAs and the ToTs, and then may determine, from the ToFs, a three-dimensional (3D) position and clock deviation. The 3D position may then be converted into a latitude, longitude and altitude. The positioning circuitry 945 may provide data to application circuitry 905 which may include one or more of position data or time data. Application circuitry 905 may use the time data to synchronize operations with other radio base stations.

The components shown by FIG. 9 may communicate with one another using interface circuitry. As used herein, the term "interface circuitry" may refer to, is part of, or includes circuitry providing for the exchange of information between two or more components or devices. The term "interface circuitry" may refer to one or more hardware interfaces, for example, buses, input/output (I/O) interfaces, peripheral component interfaces, network interface cards, and/or the like. Any suitable bus technology may be used in various implementations, which may include any number of technologies, including industry standard architecture (ISA), extended ISA (EISA), peripheral component interconnect (PCI), peripheral component interconnect extended (PCIx), PCI express (PCIe), or any number of other technologies. The bus may be a proprietary bus, for example, used in a SoC based system. Other bus systems may be included, such as an I²C interface, an SPI interface, point to point interfaces, and a power bus, among others.

Figure 10:
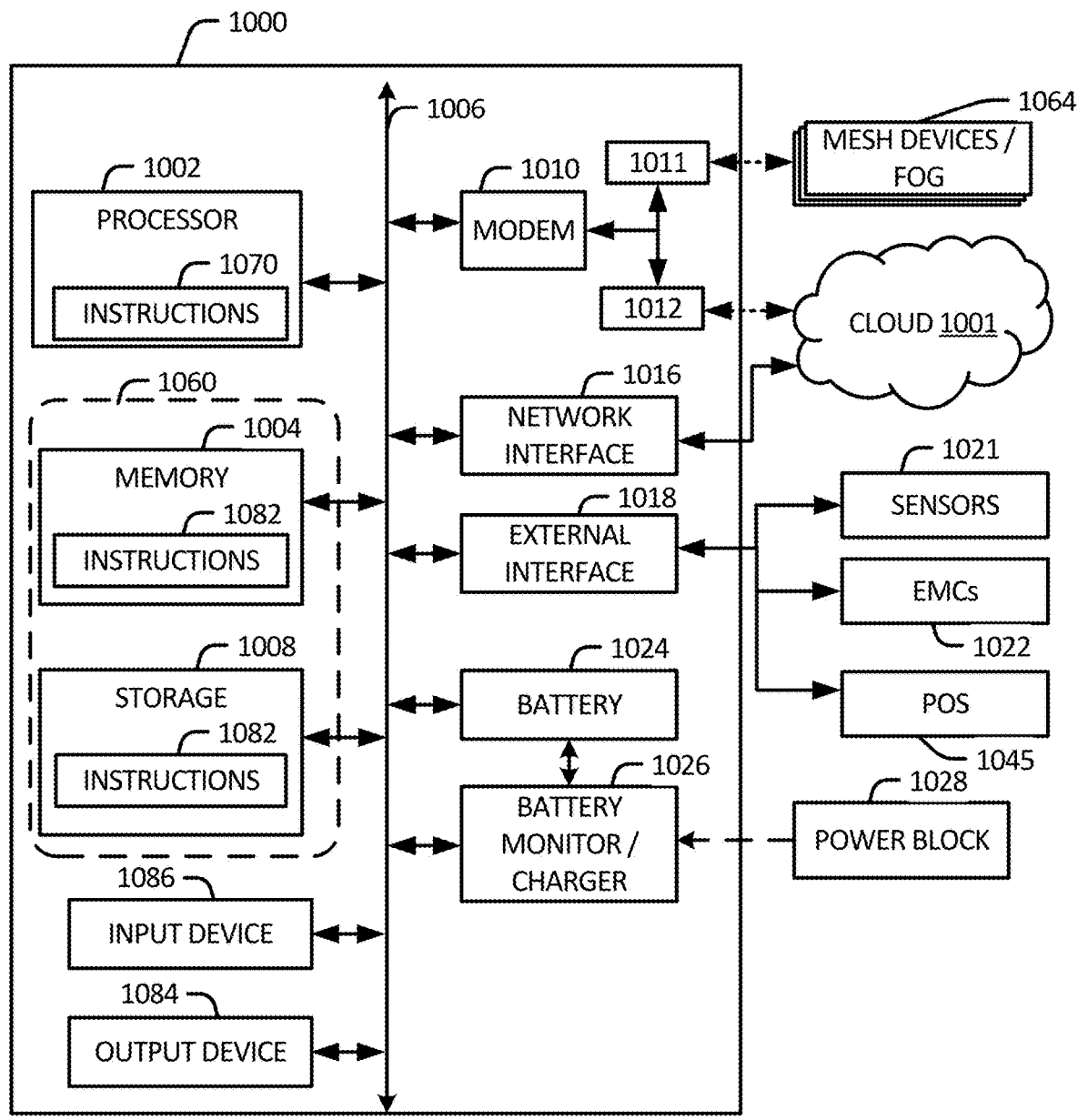
FIG. 10 illustrates an example implementation of a computing platform, in accordance with various embodiments.

FIG. 10 illustrates an example of a platform 1000 (or "device 1000") in accordance with various embodiments. The platform 1000 may be suitable for use as vUE 505, IoT device/UE 504, IoT devices 104/404, and/or any other computer devices discussed herein. Platform 1000 may also be implemented in or as a server computer system or some other element, device, or system discussed herein. The platform 1000 may include any combinations of the components shown in the example. The components of platform 1000 may be implemented as integrated circuits (ICs), portions thereof, discrete electronic devices, or other modules, logic, hardware, software, firmware, or a combination thereof adapted in the computer platform 1000, or as components otherwise incorporated within a chassis of a larger system. The example of FIG. 10 is intended to show a high level view of components of the computer platform 1000. However, some of the components shown may be omitted, additional components may be present, and different arrangement of the components shown may occur in other implementations.

The platform 1000 includes processor circuitry 1002. The processor circuitry includes circuitry such as, but not limited to single-core or multi-core processors and one or more of cache memory, low drop-out voltage regulators (LDOs), interrupt controllers, serial interfaces such as serial peripheral interface (SPI), inter-integrated circuit (I2C) or universal programmable serial interface circuit, real time clock (RTC), timer-counters including interval and watchdog timers, general purpose input-output (IO), memory card controllers such as secure digital/multi-media card (SD/MMC) or similar, universal serial bus (USB) interfaces, mobile industry processor interface (MIPI) interfaces and Joint Test Access Group (JTAG) test access ports. The processor(s) of processor circuitry 1002 may include any combination of general-purpose processors and/or dedicated processors (e.g., graphics processors (GPUs), application processors, etc.), which may be microprocessor(s), multi-core processor(s), multithreaded processor(s), an ultra-low voltage processor(s), embedded processor(s), or other known processing element. The processors (or cores) of the processor circuitry 1002 may be coupled with or may include memory/storage and may be configured to execute instructions stored in the memory/storage to enable various applications or operating systems to run on the platform 1000.

As an example, the processor circuitry 1002 may include an Intel® Architecture Core™ based processor, such as a Quark™, an Atom™, an i3, an i5, an i7, or an MCU-class processor, or another such processor available from Intel® Corporation, Santa Clara, Calif. However, any number other processors may be used, such as one or more of Advanced Micro Devices (AMD) Ryzen® processor(s), Accelerated Processing Units (APUs), MxGPUs, or the like; A5-A9 processor(s) from Apple® Inc., Snapdragon™ processor(s) from Qualcomm® Technologies, Inc., Texas Instruments, Inc.® Open Multimedia Applications Platform (OMAP)™ processor(s); a MIPS-based design from MIPS Technologies, Inc; an ARM-based design licensed from ARM Holdings, Ltd.; or the like. In some implementations, the processor circuitry 1002 may be a part of a system on a chip (SoC) in which the processor circuitry 1002 and other components are formed into a single integrated circuit, or a single package, such as the Edison™ or Galileo™ SoC boards from Intel® Corporation.

Additionally or alternatively, processor circuitry 1002 may include circuitry such as, but not limited to, one or more FPDs such as FPGAs and the like; PLDs such as CPLDs, HCPLDs, and the like; ASICs such as structured ASICs and the like; PSoCs; and the like. In such embodiments, the circuitry of processor circuitry 1002 may comprise logic blocks or logic fabric including and other interconnected resources that may be programmed to perform various functions, such as the procedures, methods, functions, etc. of the various embodiments discussed herein. In such embodiments, the circuitry of processor circuitry 1002 may include memory cells (e.g., EPROM, EEPROM, flash memory, static memory (e.g., SRAM, anti-fuses, etc.) used to store logic blocks, logic fabric, data, etc. in LUTs and the like.

The processor circuitry 1002 may communicate with a system memory circuitry 1004 over an interconnect 1006 (e.g., a bus). Any number of memory devices may be used to provide for a given amount of system memory. As examples, the memory may be random access memory (RAM) in accordance with a Joint Electron Devices Engineering Council (JEDEC) design such as the DDR or mobile DDR standards (e.g., LPDDR, LPDDR2, LPDDR3, or LPDDR4). In various implementations, the individual memory devices may be of any number of different package types such as single die package (SDP), dual die package (DDP) or quad die package (Q17P). These devices, in some examples, may be directly soldered onto a motherboard to provide a lower profile solution, while in other examples the devices are configured as one or more memory modules that in turn couple to the motherboard by a given connector. Any number of other memory implementations may be used, such as other types of memory modules, e.g., dual inline memory modules (DIMMs) of different varieties including but not limited to microDIMMs or MiniDIMMs.

To provide for persistent storage of information such as data, applications, operating systems and so forth, a storage circuitry 1008 may also couple to the processor circuitry 1002 via the interconnect 1006. In an example, the storage circuitry 1008 may be implemented via a solid-state disk drive (SSDD). Other devices that may be used for the storage circuitry 1008 include flash memory cards, such as SD cards, microSD cards, xD picture cards, and the like, and USB flash drives. In low power implementations, the storage circuitry 1008 may be on-die memory or registers associated with the processor circuitry 1002. However, in some examples, the storage circuitry 1008 may be implemented using a micro hard disk drive (HDD). Further, any number of new technologies may be used for the storage circuitry 1008 in addition to, or instead of, the technologies described, such resistance change memories, phase change memories, holographic memories, or chemical memories, among others.

The memory circuitry 1004 and/or storage circuitry 1008 may store program code of an operating system (OS), which may be a general purpose OS or an OS specifically written for and tailored to the computing platform 1000. The OSs may include one or more drivers that operate to control particular devices that are embedded in the platform 1000, attached to the platform 1000, or otherwise communicatively coupled with the platform 1000. The drivers may include individual drivers allowing other components of the platform 1000 to interact or control various input/output (I/O) devices that may be present within, or connected to, the platform 1000. For example, the drivers may include a display driver to control and allow access to a display device, a touchscreen driver to control and allow access to a touchscreen interface of the platform 1000, sensor drivers to obtain sensor readings of sensor circuitry 1021 and control and allow access to sensor circuitry 1021, EMC drivers to obtain actuator positions of the EMCs 1022 and/or control and allow access to the EMCs 1022, a camera driver to control and allow access to an embedded image capture device, audio drivers to control and allow access to one or more audio devices. The OSs may also include one or more libraries, drivers, or APIs, which provide program code and/or software components for one or more applications to obtain and use the data from a secure execution environment (SEE), trusted execution environment (TEE), and/or management engine of the platform 1000 (not shown).

The storage circuitry 1008 may include instructions 1082 in the form of software, firmware, or hardware commands to implement the techniques described herein. Although such instructions 1082 are shown as code blocks included in the memory circuitry 1004 and the storage circuitry 1008, it may be understood that any of the code blocks may be replaced with hardwired circuits, for example, built into an application specific integrated circuit (ASIC).

In an example, the instructions 1082/1070 provided via the memory circuitry 1004, the storage circuitry 1008, or the processor circuitry 1002 may be embodied as a non-transitory, machine-readable medium 1060 including code to direct the processor circuitry 1002 to perform electronic operations in the platform 1000. The processor circuitry 1002 may access the non-transitory machine-readable medium 1060 over the interconnect 1006. For instance, the non-transitory, machine-readable medium 1060 may be embodied by devices described for the storage circuitry 1008 of FIG. 8 or may include specific storage units such as optical disks, flash drives, or any number of other hardware devices. The non-transitory, machine-readable medium 1060 may include instructions 1082 to direct the processor circuitry 1002 to perform a specific sequence or flow of actions, for example, as described with respect to the flowchart(s) and block diagram(s) of operations and functionality depicted previously. In further examples, a machine-readable medium also includes any tangible medium that is capable of storing, encoding or carrying instructions for execution by a machine and that cause the machine to perform any one or more of the methodologies of the present disclosure or that is capable of storing, encoding or carrying data structures utilized by or associated with such instructions. A "machine-readable medium" thus may include, but is not limited to, solid-state memories, and optical and magnetic media. Specific examples of machine-readable media include non-volatile memory, including but not limited to, by way of example, semiconductor memory devices (e.g., EPROM, EEPROM) and flash memory devices; magnetic disks such as internal hard disks and removable disks; magneto-optical disks; and CD-ROM and DVD-ROM disks. The instructions embodied by a machine-readable medium may further be transmitted or received over a communications network using a transmission medium via a network interface device utilizing any one of a number of transfer protocols (e.g., HTTP).

The components may communicate over the interconnect 1006. The interconnect 1006 may include any number of technologies, including industry standard architecture (ISA), extended ISA (EISA), peripheral component interconnect (PCI), peripheral component interconnect extended (PCIx), PCI express (PCIe), or any number of other technologies. The interconnect 1006 may be a proprietary bus, for example, used in a SoC based system. Other bus systems may be included, such as an I$^2$C interface, an SPI interface, point-to-point interfaces, and a power bus, among others.

The interconnect 1006 couples the processor circuitry 1002 to a modem circuitry 1010 (also referred to as "baseband circuitry", "modem", and the like) for communications with other devices. The modem 1010 comprises one or more memory devices and one or more processors (e.g., baseband processors) used to perform various operations to communicate in accordance with one or more wireless communications protocols (e.g., where each processor is dedicated implement a particular protocol stack of a corresponding wireless protocol), one or more audio digital signal processor(s) (DSP) including elements for compression/decompression and echo cancellation, and may include other suitable processing elements in other embodiments. The processors of the modem 1010 may be the same or similar to the processor circuitry 1002 discussed previously. In various embodiments, modem 1010 may interface with the application circuitry of the computing platform 1000 (e.g., processor circuitry 1002, memory circuitry 1004, and storage circuitry 1008) for generation and processing of the signals and for controlling operations of the transceivers 1011, 1012.

The modem 1010 may process signals received from receive signal paths of the transceivers 1011, 1012 and generate signals for transmit signal paths of the transceivers 1011, 1012. The modem 1010 may be used to handle various radio control functions that enable communication with one or more radio networks via the transceivers 1011, 1012 according to one or more particular wireless communications protocols. The radio control functions may include, but are not limited to, signal modulation/demodulation, encoding/decoding, radio frequency shifting, implementing protocol stacks, and the like. In some embodiments, modulation/demodulation by the modem 1010 may include Fast-Fourier Transform (FFT), precoding, and/or constellation mapping/demapping functionality. In some embodiments, encoding/decoding circuitry of the modem 1010 may include convolution, tail-biting convolution, turbo, Viterbi, and/or Low Density Parity Check (LDPC) encoder/decoder functionality. Embodiments of modulation/demodulation and encoder/decoder functionality are not limited to these examples and may include other suitable functionality in other embodiments. The modem 1010 may pass demodulated signals obtained from the transceivers 1011, 1012 to other components of the computing platform 1000, and may pass modulated signals to the transceivers 1011, 1012 for transmission to other devices.

In some embodiments, the modem 1010 may be an SoC, System-in-Package (SiP), multi-chip package (MCP), or other like integrated circuitry that is configurable to access an individual radio access technology (RAT) using a corresponding subscriber identity module (SIM), network access application (NAA), modem profile (MP), or the like. Each of the SIMs/NAAs/MPs may define a flow of digital signals through a digital circuit and/or logical operations performed on those signals. In these embodiments, when the modem 1010 is configured with a particular SIM/NAA/MP, the modem circuitry 1010 may operate a transceiver according to the configured SIM/NAA/MP. The modem circuitry 1010 may comprise a secure storage, such as an in-package memory device, a tamper-resistant chipset, or a universal integrated circuitry card (UICC), a smartcard, or an embedded UICC (eUICC) that stores different SIMs/NAAs/MPs. Additionally or alternatively, the SIMs/NAAs/MPs may be stored and/or implemented by an "integrated UICC" as discussed in commonly assigned and incorporated by reference Int'l App. No. PCT/US2016/037634. In these embodiments, program code of the individual access networks, including the various protocol stacks discussed previously with regard to FIGS. 7A-7B (including the MIT sublayer), may be stored in memory circuitry of the modem 1010 and operated by one or more baseband processors of the modem 1010 to perform the various embodiments discussed herein. Where the modem 1010 is formed from one or more FPDs and one or more memory cells lookup-tables (LUTs), logic blocks, etc., the SIMs/NAAs/MPs may be configured or otherwise defined using a hardware description language (HDL), such as register-transfer logic (RTL), very high speed integrated circuit (VHSIC) HDL (VHDL), Verilog, and the like. In these embodiments, the SIMs/NAAs/MPs may be provisioned into the modem circuitry 1010 to cause the modem circuitry 1010 to operate the various embodiments discussed herein, The transceiver 1011 (also referred to as a "mesh transceiver" and the like) is used for communications with other mesh devices 1064. The mesh transceiver 1011 may use any number of frequencies and protocols, such as 2.4 Gigahertz (GHz) transmissions under the IEEE 802.15.4 standard, using the Bluetooth® low energy (BLE) standard, as defined by the Bluetooth® Special Interest Group, or the ZigBee® standard, among others. Any number of radios, configured for a particular wireless communication protocol, may be used for the connections to the mesh devices 1064. For example, a WLAN unit may be used to implement Wi-Fi™ communications in accordance with the Institute of Electrical and Electronics Engineers (IEEE) 802.11 standard. In addition, wireless wide area communications, for example, according to a cellular or other wireless wide area protocol, may occur via a WWAN unit.

The mesh transceiver 1011 may communicate using multiple standards or radios (e.g., including hardware devices such as switches, filters, amplifiers, antenna elements, and the like to facilitate the communications over the air) for communications at different range. For example, the platform 1000 may communicate with close devices, e.g., within about 10 meters, using a local transceiver based on BLE, or another low power radio, to save power. More distant mesh devices 1064, e.g., within about 50 meters, may be reached over ZigBee or other intermediate power radios. Both communications techniques may take place over a single radio at different power levels, or may take place over separate transceivers, for example, a local transceiver using BLE and a separate mesh transceiver using ZigBee.

A wireless network transceiver 1012 (also referred to as a "cloud transceiver" and the like) may be included to communicate with devices or services in the cloud 1001 via local or wide area network protocols. The wireless network transceiver 1012 includes one or more radios (e.g., including hardware devices such as switches, filters, amplifiers, antenna elements, and the like to facilitate the communications over the air) to communicate with devices in the cloud 1001. The cloud 1001 may be the same or similar to cloud 302 discussed previously. The wireless network transceiver 1012 may be a LPWA transceiver that follows the IEEE 802.15.4, or IEEE 802.15.4g standards, among others, such as those discussed herein. The platform 1000 may communicate over a wide area using LoRaWAN™ (Long Range Wide Area Network) developed by Semtech and the LoRa Alliance. The techniques described herein are not limited to these technologies, but may be used with any number of other cloud transceivers that implement long range, low bandwidth communications, such as Sigfox, and other technologies. Further, other communications techniques, such as time-slotted channel hopping, described in the IEEE 802.15.4e specification may be used.

Any number of other radio communications and protocols may be used in addition to the systems mentioned for the mesh transceiver 1011 and wireless network transceiver 1012, as described herein. For example, the radio transceivers 1011 and 1012 may include an LTE or other cellular transceiver that uses spread spectrum (SPA/SAS) communications for implementing high-speed communications. Further, any number of other protocols may be used, such as Wi-Fi® networks for medium speed communications and provision of network communications.

The radio transceivers 1011 and 1012 may include radios that are compatible with, and/or may operate according to any one or more of the following radio communication technologies and/or standards including but not limited to: a Global System for Mobile Communications (GSM) radio communication technology, a General Packet Radio Service (GPRS) radio communication technology, an Enhanced Data Rates for GSM Evolution (EDGE) radio communication technology, and/or a Third Generation Partnership Project (3GPP) radio communication technology, for example Universal Mobile Telecommunications System (UMTS), Freedom of Multimedia Access (FOMA), 3GPP Long Term Evolution (LTE), 3GPP Long Term Evolution Advanced (LTE Advanced), Code division multiple access 2000 (CDM2000), Cellular Digital Packet Data (CDPD), Mobitex, Third Generation (3G), Circuit Switched Data (CSD), High-Speed Circuit-Switched Data (HSCSD), Universal Mobile Telecommunications System (Third Generation) (UMTS (3G)), Wideband Code Division Multiple Access (Universal Mobile Telecommunications System) (W-CDMA (UMTS)), High Speed Packet Access (HSPA), High-Speed Downlink Packet Access (HSDPA), High-Speed Uplink Packet Access (HSUPA), High Speed Packet Access Plus (HSPA+), Universal Mobile Telecommunications System-Time-Division Duplex (UMTS-TDD), Time Division-Code Division Multiple Access (TD-CDMA), Time Division-Synchronous Code Division Multiple Access (TD-CDMA), 3rd Generation Partnership Project Release 8 (Pre-4th Generation) (3GPP Rel. 8 (Pre-4G)), 3GPP Rel. 9 (3rd Generation Partnership Project Release 9), 3GPP Rel. 10 (3rd Generation Partnership Project Release 10), 3GPP Rel. 11 (3rd Generation Partnership Project Release 11), 3GPP Rel. 12 (3rd Generation Partnership Project Release 12), 3GPP Rel. 13 (3rd Generation Partnership Project Release 13), 3GPP Rel. 14 (3rd Generation Partnership Project Release 14), 3GPP Rel. 15 (3rd Generation Partnership Project Release 15), 3GPP Rel. 16 (3rd Generation Partnership Project Release 16), 3GPP Rel. 17 (3rd Generation Partnership Project Release 17) and subsequent Releases (such as Rel. 18, Rel. 19, etc.), 3GPP 5G, 3GPP LTE Extra, LTE-Advanced Pro, LTE Licensed-Assisted Access (LAA), MuLTEfire, UMTS Terrestrial Radio Access (UTRA), Evolved UMTS Terrestrial Radio Access (E-UTRA), Long Term Evolution Advanced (4th Generation) (LTE Advanced (4G)), cdmaOne (2G), Code division multiple access 2000 (Third generation) (CDM2000 (3G)), Evolution-Data Optimized or Evolution-Data Only (EV-DO), Advanced Mobile Phone System (1st Generation) (AMPS (1G)), Total Access Communication System/Extended Total Access Communication System (TACS/ETACS), Digital AMPS (2nd Generation) (D-AMPS (2G)), Push-to-talk (PTT), Mobile Telephone System (MTS), Improved Mobile Telephone System (IMTS), Advanced Mobile Telephone System (AMTS), OLT (Norwegian for Offentlig Landmobil Telefoni, Public Land Mobile Telephony), MTD (Swedish abbreviation for Mobiltelefonisystem D, or Mobile telephony system D), Public Automated Land Mobile (Autotel/PALM), ARP (Finnish for Autoradiopuhelin, "car radio phone"), NMT (Nordic Mobile Telephony), High capacity version of NTT (Nippon Telegraph and Telephone) (Hicap), Cellular Digital Packet Data (CDPD), Mobitex, DataTAC, Integrated Digital Enhanced Network (iDEN), Personal Digital Cellular (PDC), Circuit Switched Data (CSD), Personal Handy-phone System (PHS), Wideband Integrated Digital Enhanced Network (WiDEN), iBurst, Unlicensed Mobile Access (UMA), also referred to as also referred to as 3GPP Generic Access Network, or GAN standard), Bluetooth(r), Bluetooth Low Energy (BLE), IEEE 802.15.4 based protocols (e.g., IPv6 over Low power Wireless Personal Area Networks (6LoWPAN), WirelessHART, MiWi, Thread, IS100.11a, etc.) WiFi-direct, ANT/ANT+, Z-Wave, 3GPP device-to-device (D2D) or Proximity Services (ProSe), Universal Plug and Play (UPnP), Low-Power Wide-Area-Network (LPWAN), Long Range Wide Area Network (LoRA) or LoRaWAN™ developed by Semtech and the LoRa Alliance, Sigfox, Wireless Gigabit Alliance (WiGig) standard, mmWave standards in general (wireless systems operating at 10-300 GHz and above such as WiGig, IEEE 802.11ad, IEEE 802.11ay, etc.), technologies operating above 300 GHz and THz bands, (3GPP/LTE based or IEEE 802.11p and other) Vehicle-to-Vehicle (V2V) and Vehicle-to-X (V2X) and Vehicle-to-Infrastructure (V2I) and Infrastructure-to-Vehicle (I2V) communication technologies, 3GPP cellular V2X, DSRC (Dedicated Short Range Communications) communication systems such as Intelligent-Transport-Systems and others, the European ITS-G5 system (i.e. the European flavor of IEEE 802.11p based DSRC, including ITS-G5A (i.e., Operation of ITS-G5 in European ITS frequency bands dedicated to ITS for safety related applications in the frequency range 5,875 GHz to 5,905 GHz), ITS-G5B (i.e., Operation in European ITS frequency bands dedicated to ITS non-safety applications in the frequency range 5,855 GHz to 5,875 GHz), ITS-G5C (i.e., Operation of ITS applications in the frequency range 5,470 GHz to 5,725 GHz)), etc. In addition to the standards listed above, any number of satellite uplink technologies may be used for the transceivers 1011, 1012 including, for example, radios compliant with standards issued by the ITU (International Telecommunication Union), or the ETSI (European Telecommunications Standards Institute), among others. The examples provided herein are thus understood as being applicable to various other communication technologies, both existing and not yet formulated.

A network interface circuitry/controller (NIC) 1016 may be included to provide a wired communication to the cloud 1001 or to other devices, such as the mesh devices 1064. The wired communication may provide an Ethernet connection, or may be based on other types of networks, such as Controller Area Network (CAN), Local Interconnect Network (LIN), DeviceNet, ControlNet, Data Highway+, PROFIBUS, or PROFINET, among many others. An additional NIC 1016 may be included to allow connect to a second network, for example, a NIC 1016 providing communications to the cloud over Ethernet, and a second NIC 1016 providing communications to other devices over another type of network. The NIC 1016 comprises one or more dedicated processors and/or FPGAs to communicate using one or more of the aforementioned protocols. In some implementations, the NIC 1016 may include multiple controllers to provide connectivity to other networks using the same or different protocols.

The interconnect 1006 may couple the processor circuitry 1002 to an external interface 1018 (also referred to as "I/O interface circuitry" or the like) that is used to connect external devices or subsystems. As used herein, the term "interface circuitry" may refer to, is part of, or includes circuitry providing for the exchange of information between two or more components or devices. The term "interface circuitry" may refer to one or more hardware interfaces, for example, buses, input/output (I/O) interfaces, peripheral component interfaces, network interface cards, and/or the like. In some implementations, the interface circuitry 1018 may connect the platform 1000 with positioning circuitry 1045, which may be the same or similar as the positioning circuitry 945 discussed with regard to FIG. 9. The external devices may include sensor circuitry 1021, such as accelerometers, level sensors, flow sensors, optical light sensors, camera sensors, temperature sensors, pressure sensors, barometric pressure sensors, and the like. The external interface 1018 connects the platform 1000 to electro-mechanical devices (EMCs) 1024, allow platform 1000 to change its state, position, and/or orientation, or move or control a mechanism or system. The EMCs 1022 may include one or more power switches, relays including electromechanical relays (EMRs) and/or solid state relays (SSRs), actuators (e.g., valve actuators, etc.), an audible sound generator, a visual warning device, motors (e.g., DC motors, stepper motors, etc.), wheels, thrusters, propellers, claws, clamps, hooks, and/or other like electro-mechanical components. In embodiments, platform 1000 may be configured to operate one or more EMCs 1022 based on one or more captured events and/or instructions or control signals received from a service provider and/or various client systems. In some embodiments, the aforementioned sensor circuitry 1021 and EMCs 1022 may correspond to the sensors 428 discussed with regard to FIG. 4. In other embodiments, the platform 1000 that utilizes the sensor circuitry 1021 and EMCs 1022 may correspond to the sensors 428 discussed with regard to FIG. 4.

In some examples, various input/output (I/O) devices may be present within, or connected to, the platform 1000, which are referred to as input device circuitry 1086 and output device circuitry 1084 in FIG. 10. The input device circuitry 1086 and output device circuitry 1084 include one or more user interfaces designed to enable user interaction with the platform 1000 and/or peripheral component interfaces designed to enable peripheral component interaction with the platform 1000. Input device circuitry 886 may include any physical or virtual means for accepting an input including, inter alia, one or more physical or virtual buttons (e.g., a reset button), a physical keyboard, keypad, mouse, touchpad, touchscreen, microphones, scanner, headset, and/or the like.

The output device circuitry 1084 may be included to show information or otherwise convey information, such as sensor readings, actuator position(s), or other like information. Output device circuitry 1084 may include any number and/or combinations of audio or visual display, including, inter alia, one or more simple visual outputs/indicators (e.g., binary status indicators (e.g., light emitting diodes (LEDs)) and multi-character visual outputs, or more complex outputs such as display devices or touchscreens (e.g., Liquid Chrystal Displays (LCD), LED displays, quantum dot displays, projectors, etc.), with the output of characters, graphics, multimedia objects, and the like being generated or produced from the operation of the platform 1000. The output device circuitry 1084 may also include speakers or other audio emitting devices, printer(s), and/or the like. In some embodiments, the sensor circuitry 1021 may be used as the input device circuitry 1086 (e.g., an image capture device, motion capture device, or the like) and one or more EMCs 1022 may be used as the output device circuitry 1084 (e.g., an actuator to provide haptic feedback or the like). In another example, near-field communication (NFC) circuitry comprising an NFC controller coupled with an antenna element and a processing device may be included to read electronic tags and/or connect with another NFC-enabled device. Peripheral component interfaces may include, but are not limited to, a non-volatile memory port, a universal serial bus (USB) port, an audio jack, a power supply interface, etc.

A battery 1024 may power the platform 1000, although in examples in which the platform 1000 is mounted in a fixed location, it may have a power supply coupled to an electrical grid. The battery 1024 may be a lithium ion battery, or a metal-air battery, such as a zinc-air battery, an aluminum-air battery, a lithium-air battery, and the like. When the platform 1000 is implemented as a vUE 505, the battery 1024 may be a typical lead-acid automotive battery, although in some embodiments, such as when vUE 505 is a hybrid vehicle, the battery 1024 may be a lithium ion battery, a metal-air battery, such as a zinc-air battery, an aluminum-air battery, a lithium-air battery, a lithium polymer battery, and/or the like.

A battery monitor/charger 1026 may be included in the platform 1000 to track the state of charge (SoCh) of the battery 1024. The battery monitor/charger 1026 may be used to monitor other parameters of the battery 1024 to provide failure predictions, such as the state of health (SoH) and the state of function (SoF) of the battery 1024. The battery monitor/charger 1026 may include a battery monitoring integrated circuit, such as an LTC4020 or an LTC2990 from Linear Technologies, an ADT7488A from ON Semiconductor of Phoenix Ariz., or an IC from the UCD90xxx family from Texas Instruments of Dallas, Tex. The battery monitor/charger 1026 may communicate the information on the battery 1024 to the processor circuitry 1002 over the interconnect 1006. The battery monitor/charger 1026 may also include an analog-to-digital (ADC) convertor that allows the processor circuitry 1002 to directly monitor the voltage of the battery 1024 or the current flow from the battery 1024. The battery parameters may be used to determine actions that the platform 1000 may perform, such as transmission frequency, mesh network operation, sensing frequency, and the like.

A power block 1028, or other power supply coupled to a grid, may be coupled with the battery monitor/charger 1026 to charge the battery 1024. In some examples, the power block 1028 may be replaced with a wireless power receiver to obtain the power wirelessly, for example, through a loop antenna in the platform 1000. A wireless battery charging circuit, such as an LTC4020 chip from Linear Technologies of Milpitas, Calif., among others, may be included in the battery monitor/charger 1026. The specific charging circuits chosen depend on the size of the battery 1024, and thus, the current required. The charging may be performed using the Airfuel standard promulgated by the Airfuel Alliance, the Qi wireless charging standard promulgated by the Wireless Power Consortium, or the Rezence charging standard, promulgated by the Alliance for Wireless Power, among others.

Figure 11:
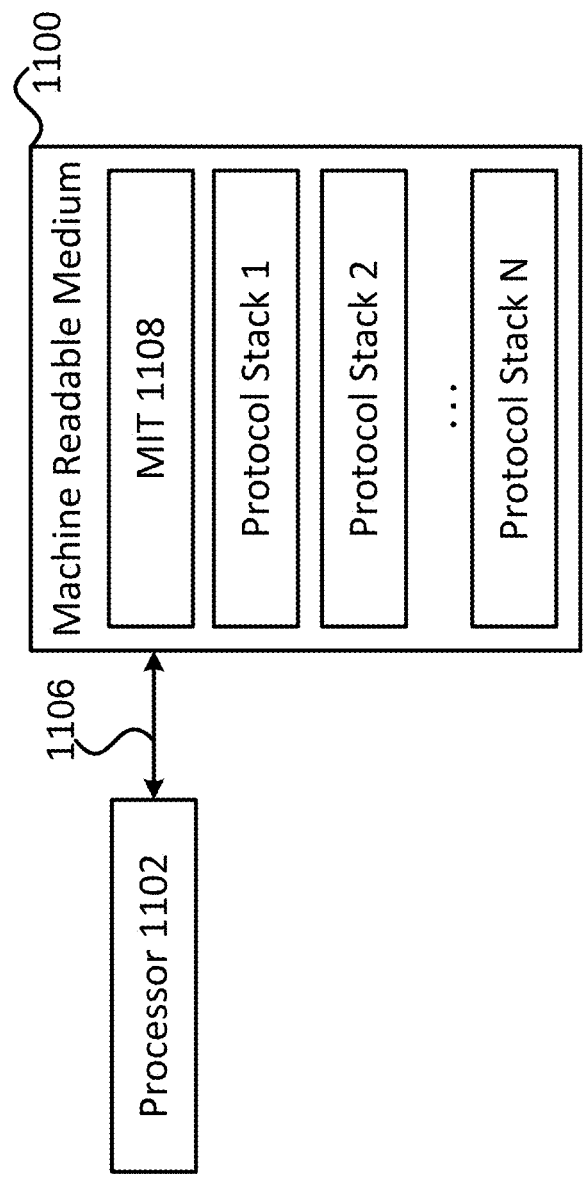
FIG. 11 illustrates example of computer-readable non-transitory storage media that may be suitable for use to store instructions that cause an apparatus, in response to execution of the instructions by the apparatus, to practice selected aspects of the present disclosure.

FIG. 11 illustrates examples of computer-readable non-transitory storage media that may be suitable for use to store instructions that cause an apparatus, in response to execution of the instructions by the apparatus, to practice selected aspects of the present disclosure. The non-transitory computer-readable storage media may include a number of programming instructions that may be configured to enable a computer system/device (e.g., equipment 900, platform 1000, or the like), in in response to execution of the programming instructions, to implement (aspects of) various modules and/or protocol stacks discussed previously. In alternate embodiments, the programming instructions may be disposed on multiple computer-readable non-transitory storage media instead. In still other embodiments, the programming instructions may be disposed on computer-readable transitory storage media, such as, signals.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. In the context of this document, a computer-usable or computer-readable medium may be any medium that can contain, store, communicate, propagate, or transport the program for use by or in connection with the instruction execution system, apparatus, or device. The computer-readable medium may include a propagated data signal with the computer-readable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present disclosure may be written in any combination of one or more programming languages, including an object oriented programming language such as Python, Ruby, Scala, Smalltalk, Java™, C++, C #, or the like; a procedural programming languages, such as the "C" programming language, the Go (or "Golang") programming language, or the like; a scripting language such as JavaScript, Server-Side JavaScript (SSJS), JQuery, PHP, Pearl, Python, Ruby on Rails, Accelerated Mobile Pages Script (AMPscript), Mustache Template Language, Handlebars Template Language, Guide Template Language (GTL), PHP, Java and/or Java Server Pages (JSP), Node.js, ASP.NET, and/or the like; a markup language such as Hypertext Markup Language (HTML), Extensible Markup Language (XML), Java Script Object Notion (JSON), Apex®, Cascading Stylesheets (CSS), JavaServer Pages (JSP), MessagePack™, Apache® Thrift, Abstract Syntax Notation One (ASN.1), Google® Protocol Buffers (protobuf), or the like; some other suitable programming languages including proprietary programming languages and/or development tools. The computer program code for carrying out operations of the present disclosure may also be written in any combination of the programming languages discussed herein. The program code may execute entirely on the user's wearable device, partly on the user's wearable device, as a stand-alone software package, partly on the user's wearable device and partly on a remote computer or entirely on the remote computer or server. In the latter scenario, the remote computer may be connected to the user's wearable device through any type of network, including a local area network (LAN) or a wide area network (WAN), or the connection may be made to an external computer (for example, through the Internet using an Internet Service Provider).

FIG. 11 is a block diagram of a non-transitory, machine readable medium 1100 including code to direct a processor(s) 1102 to perform various functions delineated by the embodiments discussed herein. In embodiments, the non-transitory, machine readable medium 1100 may be implemented in a computer system, such as the system 900, the platform 1000, or any of the aforementioned IoT devices. The processor(s) 1102 may access the non-transitory, machine readable medium 1100 over a bus 1106. The processor(s) 1102 may be the same or similar as described with respect to the application circuitry 905 or the baseband circuitry 910 of FIG. 9, or the processor circuitry 1002 of FIG. 8. Additionally, the bus 1106 may be the same or similar as described with respect to the interconnect 1006 of FIG. 10. The non-transitory, machine readable medium 1100 may include devices described for the memory circuitry 920 of FIG. 9, or the non-transitory machine-readable medium 1060 of FIG. 10.

The non-transitory, machine readable medium 1100 may include code of protocol stacks 1–N (where N is a number) to direct the processor(s) 1102 to perform various operations according to a corresponding communication protocol.

The non-transitory, machine readable medium 1100 may include code of MIT 1108 to direct the processor(s) 1102 to control receipt of a first data packet from a first other network node using a first network interface; generate provenance information, the provenance information comprising an attestation of the network node and network interface information, wherein the network interface information is to indicate a second network interface to be used to transmit the first data packet to a next hop; generate a second data packet to include the provenance information and information of the first data packet; and control transmission of the second data packet to a second other network node using the second network interface.

To generate the network interface information of the provenance information, the code of MIT 1108 is to direct the processor(s) 1102 to identify one or more network interfaces of the network node, wherein the one or more network interfaces include the first network interface and the second network interface; and select the second network interface from among the one or more network interface capabilities. Each network interface of the one or more network interfaces corresponds to a bit position in a bitmap, and the code of MIT 1108 is to direct the processor(s) 1102 to identify a bit position that corresponds to the second network interface; and set the identified bit at the bit position in a field in the header portion of the second data packet. The code of MIT 1108 is to direct the processor(s) 1102 to: identify an attestation or provenance scheme to be used to generate the attestation; determine the attestation based on a node identifier (ID) of the network node; and insert the determined attestation of the network node into a second field in the header portion of the second data packet. The code of the MIT 1108 may also direct the processor(s) 1102 to perform one or more other functions, operations, procedures, processes, etc. as discussed herein.

Some non-limiting example as provided infra. The following examples pertain to further embodiments. Specifics in the examples may be used anywhere in one or more embodiments. All optional features of the apparatus(es) described herein may also be implemented with respect to a method or process.

Example 1 includes an apparatus to be employed as a network node, the apparatus comprising: radio control circuitry configured to receive a data packet from a first other network node using a first access technology (AT), and transmit the data packet to a second other network node using a second AT; and baseband circuitry communicatively coupled with the radio control circuitry, the baseband circuitry configured to encapsulate the data packet to include an indicator in a header portion of the data packet, wherein the indicator is to indicate that the data packet is to be transmitted using the second AT.

Example 2 includes the apparatus of example 1 and/or some other examples herein, wherein the baseband circuitry is configured to: identify one or more AT capabilities of the network node, wherein the one or more AT capabilities comprise the first AT and the second AT; and select the second AT from among the one or more AT capabilities, wherein the first AT is different than the second AT or the first AT is a same AT as the second AT.

Example 3 includes the apparatus of example 2 and/or some other examples herein, wherein each AT capability of the one or more AT capabilities corresponds to a bit position in the indicator, and the baseband circuitry is configured to: identify a bit position that corresponds to the second AT; and set a bit at the identified bit position in a field of the header portion.

Example 4 includes the apparatus of example 3 and/or some other examples herein, wherein the field is a first field, and the baseband circuitry is configured to: determine an attestation of the network node based on a node identifier (ID) of the network node; and insert the attestation of the network node into a second field of the header portion of the data packet.

Example 5 includes the apparatus of examples 3-4 and/or some other examples herein, wherein: the baseband circuitry is configured to select a third AT from among the one or more AT capabilities, and encapsulate the data packet to include an indication of the third AT in the header portion of the data packet, wherein the third AT is different than the second AT; and the radio control circuitry is configured to transmit the data packet to a third other network node using the third AT, wherein the third other network node is different than the second other network node.

Example 6 includes the apparatus of example 5 and/or some other examples herein, wherein the bit position is a first bit position, the data packet is a first version of the data packet, and the indicator is a first indicator, and the baseband circuitry is configured to: encapsulate a second version of the data packet to include a second indicator in a header portion of the second version of the data packet, wherein the second indicator is to indicate that the second version of the data packet is to be transmitted using the third AT.

Example 7 includes the apparatus of example 5 and/or some other examples herein, wherein the bit position is a first bit position, and the baseband circuitry is configured to: identify a second bit position that corresponds to the third AT; and set the first bit position and the second bit position in the field prior to transmission of the data packet to the second other network node and prior to transmission of the data packet to the third other network node.

Example 8 includes the apparatus of examples 3-7 and/or some other examples herein, wherein the data packet is an internet protocol (IP) packet, the header portion is a Multi-Interface Header Option extension header of the IP packet, and the field is a network interface information field.

Example 9 includes the apparatus of example 8 and/or some other examples herein, wherein the Multi-Interface Header Option extension header of the IP packet comprises an attestation field to include attestation information generated by the network node.

Example 10 includes the apparatus of examples 1-9, wherein the data packet includes another indicator in the header portion of the data packet, wherein the other indication is to indicate one or more available ATs of the node.

Example 11 includes one or more non-transitory computer-readable media (NTCRM) comprising instructions, wherein execution of the instructions by one or more processors of a first network node is to cause the first network node to: control receipt of a first data packet from a first other network node using a first network interface; generate provenance information, the provenance information comprising an attestation of the network node and network interface information, wherein the network interface information is to indicate a second network interface to be used to transmit the first data packet to a next hop; generate a second data packet to include the provenance information and information of the first data packet; and control transmission of the second data packet to a second other network node using the second network interface.

Example 12 includes the one or more NTCRM of example 11 and/or some other examples herein, wherein, to generate the network interface information of the provenance information, execution of the instructions is to cause the network node to: identify one or more network interfaces of the network node, wherein the one or more network interfaces include the first network interface and the second network interface; and select the second network interface from among the one or more network interface capabilities.

Example 13 includes the one or more NTCRM of example 12 and/or some other examples herein, wherein each network interface of the one or more network interfaces corresponds to a bit position in a bitmap, and wherein, to generate the network interface information of the provenance information, execution of the instructions is to cause the network node to: identify a bit position that corresponds to the second network interface; and set the identified bit at the bit position in a field in the header portion of the second data packet.

Example 14 includes the one or more NTCRM of example 13 and/or some other examples herein, wherein the field is a first field, and wherein, to generate the attestation of the provenance information, execution of the instructions is to cause the network node to: identify an attestation or provenance scheme to be used to generate the attestation; determine the attestation based on a node identifier (ID) of the network node; and insert the determined attestation of the network node into a second field in the header portion of the second data packet.

Example 15 includes the one or more NTCRM of examples 11-14 and/or some other examples herein, wherein execution of the instructions is to cause the network node to: determine the second network interface based on information included in the first data packet or based on information stored in a local routing table, wherein the information stored in the local routing table is stored in association with a node ID of the second other network node.

Example 16 includes the one or more NTCRM of examples 11-15 and/or some other examples herein, wherein execution of the instructions is to cause the network node to: identify the second other network node and a third other network to which the first data packet is to be forwarded; determine the second network interface based on information included in the first data packet or based on information stored in a local routing table, wherein the information stored in the local routing table is stored in association with a node ID of the second other network node; and determine a third network interface to be used to forward the first data packet to the third other network node based on information included in the first data packet or based on information stored in association with a node ID of the third other network node in the local routing table.

Example 17 includes the one or more NTCRM of example 16 and/or some other examples herein, wherein execution of the instructions is to cause the network node to: generate other provenance information, the other provenance information comprising the attestation of the network node and other network interface information, wherein the other network interface information is to indicate the third network interface to be used to transmit the first data packet to the third other network node; generate a third data packet to include the provenance information and the information of the first data packet; and control transmission of the third data packet to the third other network node using the third RAT.

Example 18 includes the one or more NTCRM of example 17 and/or some other examples herein, wherein the third network interface is different than the second network interface or the third network interface is different than the second network interface.

Example 19 includes the one or more NTCRM of examples 11-18 and/or some other examples herein, wherein the first network interface is different than the second network interface or the first network interface is a same network interface as the second network interface.

Example 20 includes a system comprising: a plurality of network node, wherein each network node of the plurality of network nodes comprises one or more network access technology (NAT) devices, and wherein each network node is to operate a multi-interface translation entity to: generate an attestation according to a provenance scheme in response to receipt of a data packet using a reception (Rx) NAT device of the one or more NAT devices; generate NAT information to indicate one or more transmission (Tx) NAT devices to be used to forward the data packet to another network node of the plurality of network nodes; insert the attestation and the NAT information into the data packet; and control the second NAT device to forward the data packet to the other network node.

Example 21 includes the system of example 20 and/or some other examples herein, wherein each network node is to operate a multi-interface translation entity to identify, based on a NAT bitmap configuration, a bit position within a NAT bitmap that corresponds with each Tx NAT of the one or more Tx NATs.

Example 22 includes the system of example 21 and/or some other examples herein, wherein each network node is to operate a multi-interface translation entity to insert the NAT bitmap into a header field of the data packet.

Example 23 includes the system of examples 20-22 and/or some other examples herein, wherein the multi-interface translation entity to is located above a layer 2 protocol stack of each NAT of the one or more NAT devices.

Example 24 includes the system of examples 20-23 and/or some other examples herein, wherein the plurality of network nodes comprises one or more user equipment or one or more network elements.

Example 25 includes the system of examples 20-24 and/or some other examples herein, wherein the provenance scheme comprises an elementary provenance scheme, a distributed provenance scheme, a block-based provenance scheme, a lossy provenance compression scheme, a lossless provenance scheme, or a Secure Network Provenance (SNP) scheme.

Example 26 includes a method to be performed by a network node, the method comprising: receiving or causing to receive, by the network node, a data packet from a first other network node using a first access technology (AT); encapsulating or causing to encapsulate, by the network node, the data packet to include an indicator in a header portion of the data packet, wherein the indicator is to indicate that the data packet is to be transmitted using the second AT; and transmitting or causing to transmit, by the network node, the data packet to a second other network node using a second AT.

Example 27 includes the method of example 26 and/or some other examples herein, further comprising: identifying or causing to identify, by the network node, one or more AT capabilities of the network node, wherein the one or more AT capabilities comprise the first AT and the second AT; and selecting or causing to select, by the network node, the second AT from among the one or more AT capabilities, wherein the first AT is different than the second AT or the first AT is a same AT as the second AT.

Example 28 includes the method of example 27 and/or some other examples herein, wherein each AT capability of the one or more AT capabilities corresponds to a bit position in the indicator, and the method comprises: identifying or causing to identify, by the network node, a bit position that corresponds to the second AT; and setting or causing to set, by the network node, a bit at the identified bit position in a field of the header portion.

Example 29 includes the method of example 28 and/or some other examples herein, wherein the field is a first field, and the method comprises: determining or causing to determine, by the network node, an attestation of the network node based on a node identifier (ID) of the network node; and inserting or causing to insert, by the network node, the attestation of the network node into a second field of the header portion of the data packet.

Example 30 includes the method of examples 28-29 and/or some other examples herein, further comprising: selecting or causing to select, by the network node, a third AT from among the one or more AT capabilities, and encapsulate the data packet to include an indication of the third AT in the header portion of the data packet, wherein the third AT is different than the second AT; and transmitting or causing to transmit, by the network node, the data packet to a third other network node using the third AT, wherein the third other network node is different than the second other network node.

Example 31 includes the method of example 30 and/or some other examples herein, wherein the bit position is a first bit position, the data packet is a first version of the data packet, and the indicator is a first indicator, and the method comprises: encapsulating or causing to encapsulate, by the network node, a second version of the data packet to include a second indicator in a header portion of the second version of the data packet, wherein the second indicator is to indicate that the second version of the data packet is to be transmitted using the third AT.

Example 32 includes the method of examples 30-31 and/or some other examples herein, wherein the bit position is a first bit position, and the baseband circuitry is configured to: identifying or causing to identify, by the network node, a second bit position that corresponds to the third AT; and setting or causing to set, by the network node, the first bit position and the second bit position in the field prior to transmission of the data packet to the second other network node and prior to transmission of the data packet to the third other network node.

Example 33 includes the method of examples 28-32 and/or some other examples herein, wherein the data packet is an internet protocol (IP) packet, the header portion is a Multi-Interface Header Option extension header of the IP packet, and the field is a network interface information field.

Example 34 includes the method of example 33 and/or some other examples herein, wherein the Multi-Interface Header Option extension header of the IP packet comprises an attestation field to include attestation information generated by the network node.

Example 35 includes the method of examples 26-34 and/or some other examples herein, wherein the data packet includes another indicator in the header portion of the data packet, wherein the other indication is to indicate one or more available ATs of the node.

Example 36 includes a method to be performed by a multi-interface translation (MIT) entity of a network node, the method comprising: obtaining or causing to obtain, by the MIT entity, a first data packet from a first other network node using a first network interface; generating or causing to generate, by the MIT entity, provenance information comprising an attestation of the network node and network interface information, wherein the network interface information is to indicate a second network interface to be used to transmit the first data packet to a next hop; generating or causing to generate, by the MIT entity, a second data packet to include the provenance information and information of the first data packet; and sending or causing to send, by the MIT entity, the second data packet to a second other network node using the second network interface.

Example 37 includes the method of example 36 and/or some other examples herein, wherein generating the network interface information of the provenance information comprises: identifying or causing to identify, by the MIT entity, one or more network interfaces of the network node, wherein the one or more network interfaces include the first network interface and the second network interface; and selecting or causing to select, by the MIT entity, the second network interface from among the one or more network interface capabilities.

Example 38 includes the method of example 37 and/or some other examples herein, wherein each network interface of the one or more network interfaces corresponds to a bit position in a bitmap, and wherein generating the network interface information of the provenance information comprises: identifying or causing to identify, by the MIT entity, a bit position that corresponds to the second network interface; and setting or causing to set, by the MIT entity, the identified bit at the bit position in a field in the header portion of the second data packet.

Example 39 includes the method of example 38 and/or some other examples herein, wherein the field is a first field, and wherein generating the attestation of the provenance information comprises: identifying or causing to identify, by the MIT entity, an attestation or provenance scheme to be used to generate the attestation; determining or causing to determine, by the MIT entity, the attestation based on a node identifier (ID) of the network node; and inserting or causing to insert, by the MIT entity, the determined attestation of the network node into a second field in the header portion of the second data packet.

Example 40 includes the method of examples 36-39 and/or some other examples herein, further comprising: determining or causing to determine, by the MIT entity, the second network interface based on information included in the first data packet or based on information stored in a local routing table, wherein the information stored in the local routing table is stored in association with a node ID of the second other network node.

Example 41 includes the method of examples 36-40 and/or some other examples herein, further comprising: identifying or causing to identify, by the MIT entity, the second other network node and a third other network to which the first data packet is to be forwarded; determining or causing to determine, by the MIT entity, the second network interface based on information included in the first data packet or based on information stored in a local routing table, wherein the information stored in the local routing table is stored in association with a node ID of the second other network node; and determining or causing to determine, by the MIT entity, a third network interface to be used to forward the first data packet to the third other network node based on information included in the first data packet or based on information stored in association with a node ID of the third other network node in the local routing table.

Example 42 includes the method of example 41 and/or some other examples herein, further comprising: generating or causing to generate, by the MIT entity, other provenance information, the other provenance information comprising the attestation of the network node and other network interface information, wherein the other network interface information is to indicate the third network interface to be used to transmit the first data packet to the third other network node; generating or causing to generate, by the MIT entity, a third data packet to include the provenance information and the information of the first data packet; and sending or causing to send, by the MIT entity, the third data packet to the third other network node using the third RAT.

Example 43 includes the method of example 42 and/or some other examples herein, wherein the third network interface is different than the second network interface or the third network interface is different than the second network interface.

Example 44 includes the method of example 36 and/or some other examples herein, wherein the first network interface is different than the second network interface or the first network interface is a same network interface as the second network interface.

Example 45 includes a method to be performed by a network node in a system comprising a plurality of network node, wherein each network node of the plurality of network nodes comprises one or more network access technology (NAT) devices, and wherein the method comprising: generating or causing to generate, by a multi-interface translation (MIT) layer of the network node, an attestation according to a provenance scheme in response to receipt of a data packet using a reception (Rx) NAT device of the one or more NAT devices; generating or causing to generate, by the MIT layer, NAT information to indicate one or more transmission (Tx) NAT devices to be used to forward the data packet to another network node of the plurality of network nodes; inserting or causing to insert, by the MIT layer, the attestation and the NAT information into the data packet; and controlling or causing to control, by the MIT layer, the second NAT device to forward the data packet to the other network node.

Example 46 includes the method of example 45 and/or some other examples herein, further comprising: identifying or causing to identify, by the MIT layer, a bit position within a NAT bitmap that corresponds with each Tx NAT of the one or more Tx NATs based on a NAT bitmap configuration.

Example 47 includes the method of example 46 and/or some other examples herein, further comprising: inserting or causing to insert, by the MIT layer, the NAT bitmap into a header field of the data packet.

Example 48 includes the method of examples 45-47 and/or some other examples herein, wherein the multi-interface translation entity is located above a layer 2 protocol stack of each NAT of the one or more NAT devices.

Example 49 includes the method of examples 45-48 and/or some other examples herein, wherein the plurality of network nodes comprises one or more user equipment or one or more network elements.

Example 50 includes the method of examples 45-49 and/or some other examples herein, wherein the provenance scheme comprises an elementary provenance scheme, a distributed provenance scheme, a block-based provenance scheme, a lossy provenance compression scheme, a lossless provenance scheme, or a Secure Network Provenance (SNP) scheme.

Example 61 includes an apparatus comprising means to perform one or more elements of a method described in or related to any of examples 1-60, or any other method or process described herein.

Example 62 includes one or more non-transitory computer-readable media comprising instructions to cause an electronic device, upon execution of the instructions by one or more processors of the electronic device, to perform one or more elements of a method described in or related to any of examples 1-60, or any other method or process described herein.

Example 63 includes an apparatus comprising logic, modules, or circuitry to perform one or more elements of a method described in or related to any of examples 1-60, or any other method or process described herein.

Example 64 includes a method, technique, or process as described in or related to any of examples 1-60, or portions or parts thereof.

Example 65 includes an apparatus comprising: one or more processors and one or more computer readable media comprising instructions that, when executed by the one or more processors, cause the one or more processors to perform the method, techniques, or process as described in or related to any of examples 1-60, or portions thereof.

Example 66 includes a signal as described in or related to any of examples 1-60, or portions or parts thereof.

Example 67 includes a signal in a wireless network as shown and described herein.

Example 68 includes a message, a datagram, a frame, a packet, and/or a protocol data unit (PDU) as described in or related to any of examples 1-60, or portions or parts thereof.

Example 69 includes a method of communicating in a wireless network as shown and described herein.

Example 70 includes a system for providing wireless communication as shown and described herein.

Example 71 includes a device for providing wireless communication as shown and described herein The foregoing description of one or more implementations provides illustration and description of various example embodiment, but is not intended to be exhaustive or to limit the scope of embodiments to the precise form disclosed. Modifications and variations are possible in light of the above teachings or may be acquired from practice of various embodiments. Where specific details are set forth in order to describe example embodiments of the disclosure, it should be apparent to one skilled in the art that the disclosure can be practiced without, or with variation of, these specific details. The description is thus to be regarded as illustrative instead of limiting.

What is claimed is:

1. An apparatus to be employed as a first network node, the apparatus comprising: first radio access technology (RAT) circuitry to: receive a first data packet from a second network node using a first RAT, the first data packet including a first packet header, the first packet header including an attestation of the second network node and an indicator indicating that the first RAT was used to convey the first data packet to the first network node; and baseband circuitry communicatively coupled with the first RAT circuitry, the baseband circuitry to generate a second data packet by encapsulation of an entirety of the first data packet for transmission to a third network node, the encapsulation including addition of a second packet header to the first data packet, the second packet header to include an attestation of the first network node and a second indicator, the second indicator indicating that a second RAT is to be used to transmit the second data packet; and second RAT circuitry communicatively coupled with the baseband circuitry, the second RAT circuitry to transmit the second data packet to a third network node using the second RAT.

2. The apparatus of claim 1, wherein the baseband circuitry is to: identify one or more access technology (AT) capabilities of the first network node, wherein the one or more AT capabilities comprise the first RAT and the second RAT; and select the second RAT from among the one or more AT capabilities, wherein the first RAT is different than the second RAT or the first RAT is a same AT as the second RAT.

3. The apparatus of claim 2, wherein each AT capability of the one or more AT capabilities corresponds to a bit position in the indicator, and the baseband circuitry is to: identify a bit position that corresponds to the second RAT; and set a bit at the identified bit position in a field of the second packet header.

4. The apparatus of claim 3, wherein the field is a first field, and the baseband circuitry is to: determine the attestation of the first network node based on a node identifier (ID) of the first network node; and insert the attestation of the first network node into a second field of the second packet header.

5. The apparatus of claim 3, wherein the baseband circuitry is to: select a third RAT from among the one or more AT capabilities; generate a third packet by encapsulation of an entirety of the first data packetpacket. the encapsulation includes addition of a third packet header to the first data packet. the third packet header to include an attestation of the first network node and a third indicator, the third indicator indicates that the third RAT is to be used to transmit the third data packet, wherein the third AT is different than a second RAT, and the third RAT is a wired or wireless communication access technology; and send the third data packet to a fourth network node using the third RAT, wherein the fourth network node is different than the third network node.

6. The apparatus of claim 5, wherein the bit position is a first bit position, the first data packet is a first version of the first data packet, and the indicator is a first indicator, and the baseband circuitry is to: encapsulate a second version of the first data packet to include another second indicator in a packet header of the second version of the first data packet, the other second indicator to indicate that the second version of the first data packet is to be transmitted using the third RAT.

7. The apparatus of claim 5, wherein the bit position is a first bit position, and the baseband circuitry is to: identify a second bit position that corresponds to the third RAT; and set the first bit position and the second bit position in the field prior to transmission of the second data packet to the third network node and prior to transmission of the third data packet to the fourth network node.

8. The apparatus of claim 3, wherein the data packet is an internet protocol (IP) packet, the second packet header is a Multi-Interface Header Option extension header of the IP packet, and the field is a network interface information field.

9. The apparatus of claim 8, wherein the Multi-Interface Header Option extension header of the IP packet comprises an attestation field to include attestation information generated by the first network node.

10. The apparatus of claim 1, wherein the second data packet includes another indicator in the second packet header, wherein the other indication is to indicate one or more available ATs of the first network node.

11. One or more non-transitory computer-readable media (NTCRM) comprising instructions, wherein execution of the instructions by one or more processors of a first network node is to cause the first network node to: receive a first data packet from a second network node using a first network interface operating according to a first radio access technology (RAT), the first data packet including provenance information of the second network node, the provenance information of the second network node comprising an attestation of the second network node and network interface information indicating the first network interface used to transmit the first data packet to the first network node; generate provenance information of the first network node, the provenance information of the first network node comprising an attestation of the first network node and network interface information indicating a second network interface of the first network node to be used to transmit the first data packet to a next hop; generate a second data packet to include the provenance information and encapsulating the first data packet; and control transmission of the second data packet to a third network node using the second network interface operating according to a second RAT.

12. The one or more NTCRM of claim 11, wherein, to generate the network interface information of the provenance information, execution of the instructions is to cause the first network node to: identify one or more network interfaces of the first network node, wherein the one or more network interfaces operate according to respective access technologies (ATs) and include the first network interface and the second network interface; and select the second network interface from among one or more network interface capabilities.

13. The one or more NTCRM of claim 12, wherein each network interface of the one or more network interfaces corresponds to a bit position in a bitmap, and wherein, to generate the network interface information of the provenance information, execution of the instructions is to cause the first network node to: identify a bit position that corresponds to the second network interface; and set the identified bit at the bit position in a field in a header portion of the second data packet.

14. The one or more NTCRM of claim 13, wherein the field is a first field, and wherein, to generate the attestation of the provenance information, execution of the instructions is to cause the first network node to: identify an attestation or provenance scheme to be used to generate the attestation; determine the attestation based on a node identifier (ID) of the first network node; and insert the determined attestation of the first network node into a second field in the header portion of the second data packet.

15. The one or more NTCRM of claim 11, wherein execution of the instructions is to cause the first network node to: determine the second network interface based on information included in the first data packet or based on information stored in a local routing table, wherein the information stored in the local routing table is stored in association with a node ID of the third network node.

16. The one or more NTCRM of claim 11, wherein execution of the instructions is to cause the first network node to: identify the third network node and a fourth network node to which the first data packet is to be forwarded; determine the second network interface based on information included in the first data packet or based on information stored in a local routing table, and the information stored in the local routing table is stored in association with a node ID of the third network node; and determine a third network interface to be used to forward the first data packet to the fourth network node based on information included in the first data packet or based on information stored in association with a node ID of the fourth network node in the local routing table, the third network interface to operate according to a wired or wireless AT.

17. The one or more NTCRM of claim 16, wherein execution of the instructions is to cause the first network node to: generate other provenance information, the other provenance information comprising the attestation of the first network node and other network interface information, wherein the other network interface information is to indicate the third network interface to be used to transmit the first data packet to the fourth network node; generate a third data packet to include the provenance information and the information of the first data packet; and control transmission of the third data packet to the fourth network node using the third network interface.

18. The one or more NTCRM of claim 17, wherein the third network interface is different than the second network interface or the third network interface is different than the second network interface, and wherein the first network interface is different than the second network interface or the first network interface is a same network interface as the second network interface.

19. The one or more NTCRM of claim 11, wherein the first data packet includes second provenance information of the second network node comprising an attestation of the second network node and network interface information indicating a network interface of the second network node used to transmit the first data packet to the first network node, and the information of the first data packet in the second data packet includes the second provenance information.

20. A system comprising: a plurality of network nodes, wherein each network node of the plurality of network nodes comprises one or more network access technology (NAT) devices, and at least one network node of the plurality of network nodes includes at least two NAT devices, each of the one or more NAT devices configured to communicate using one of a wireless NAT or a wired NAT, and each network node is to operate a multi-interface translation entity to: generate an attestation according to a provenance scheme in response to receipt of a data packet using a reception (Rx) NAT device of the one or more NAT devices; for each network node of the plurality of network nodes to which the data packet is to be forwarded, generate NAT information to indicate a transmission (Tx) NAT device to be used to forward the data packet; insert the generated attestation and the generated NAT information into the data packet to be forwarded such that the data packet to be forwarded includes the generated attestation, the generated NAT information, and attestation and NAT information of each network node that previously forwarded the data packet; and control the indicated Tx NAT device to forward the data packet.

21. The system of claim 20, wherein each network node is to operate a multi-interface translation entity to identify, based on a NAT bitmap configuration, a bit position within a NAT bitmap that corresponds with each Tx NAT of the one or more Tx NATs.

22. The system of claim 21, wherein each network node is to operate a multi-interface translation entity to insert the NAT bitmap into a header field of the data packet.

23. The system of claim 20, wherein the multi-interface translation entity is located above a layer 2 protocol stack of each NAT of the one or more NAT devices.

24. The system of claim 20, wherein the plurality of network nodes comprises one or more user equipment or one or more network elements.

25. The system of claim 20, wherein the provenance scheme comprises an elementary provenance scheme, a distributed provenance scheme, a block-based provenance scheme, a lossy provenance compression scheme, a lossless provenance scheme, or a Secure Network Provenance (SNP) scheme.

* * * * *

UNITED STATES PATENT AND TRADEMARK OFFICE
CERTIFICATE OF CORRECTION

PATENT NO. : 11,019,183 B2  
APPLICATION NO. : 16/025900  
DATED : May 25, 2021  
INVENTOR(S) : Alam Page 1 of 1

It is certified that error appears in the above-identified patent and that said Letters Patent is hereby corrected as shown below:

In the Claims

Column 54  
Line 7, Claim 5 "...packetpacket. the..." should read – "...packet, the..."  
Line 9, Claim 5 "...packet. the..." should read – "...packet, the..."

Signed and Sealed this  
Tenth Day of August, 2021

Drew Hirshfeld  
*Performing the Functions and Duties of the*  
*Under Secretary of Commerce for Intellectual Property and*  
*Director of the United States Patent and Trademark Office*